United States Patent
Nakagami

(10) Patent No.: US 10,425,662 B2
(45) Date of Patent: *Sep. 24, 2019

(54) IMAGE PROCESSING APPARATUS AND METHOD

(71) Applicant: SONY CORPORATION, Tokyo (JP)

(72) Inventor: Ohji Nakagami, Tokyo (JP)

(73) Assignee: SONY CORPORATION, Tokyo (JP)

(*) Notice: Subject to any disclaimer, the term of this patent is extended or adjusted under 35 U.S.C. 154(b) by 272 days.

This patent is subject to a terminal disclaimer.

(21) Appl. No.: 14/402,200

(22) PCT Filed: Jun. 18, 2013

(86) PCT No.: PCT/JP2013/066668
§ 371 (c)(1),
(2) Date: Nov. 19, 2014

(87) PCT Pub. No.: WO2014/002822
PCT Pub. Date: Jan. 3, 2014

(65) Prior Publication Data
US 2015/0288986 A1    Oct. 8, 2015

(30) Foreign Application Priority Data
Jun. 27, 2012   (JP) ................................ 2012-144217

(51) Int. Cl.
*H04N 19/70*   (2014.01)
*H04N 19/146*   (2014.01)
(Continued)

(52) U.S. Cl.
CPC ........... *H04N 19/70* (2014.11); *H04N 19/117* (2014.11); *H04N 19/146* (2014.11);
(Continued)

(58) Field of Classification Search
CPC .... H04N 19/70; H04N 19/117; H04N 19/146; H04N 19/174; H04N 19/187;
(Continued)

(56) References Cited

U.S. PATENT DOCUMENTS 7,593,598 B2 *   9/2009   Chang .................... G06T 5/004
                                                        348/606
8,675,978 B2 *   3/2014   Sato ....................... G06T 9/004
                                                        382/238
(Continued)

FOREIGN PATENT DOCUMENTS

| EP | 2 299 720 A1 | 3/2011 |
|---|---|---|
| WO | WO 2010/001999 A1 | 1/2010 |
| WO | WO 2011/127961 A1 | 10/2011 |

OTHER PUBLICATIONS

International Search Report dated Aug. 6, 2013 in PCT/JP2013/066668.

(Continued)

*Primary Examiner* — Christopher Braniff
(74) *Attorney, Agent, or Firm* — Xsensus, LLP

(57) ABSTRACT

An image processing apparatus and a method capable of reducing an amount of codes in encoding or decoding. A type setting unit uses a deblocked pixel value to set a type of a filter which is common between components of Y, Cb, Cr in units of LCUs, and provides the type to a syntax write unit. An offset setting unit uses a deblocked pixel value to set an offset independent for each of components of Y, Cb, Cr in units of LCUs. An SAO control information setting unit provides the offset or a merge flag, which is set by referring to the offset given by the offset setting unit, to the syntax write unit. The present disclosure can be applied to, for example, an image processing apparatus.

15 Claims, 31 Drawing Sheets

(51) Int. Cl.
| | |
|---|---|
| H04N 19/44 | (2014.01) |
| H04N 19/80 | (2014.01) |
| H04N 19/187 | (2014.01) |
| H04N 19/174 | (2014.01) |
| H04N 19/117 | (2014.01) |
| H04N 19/46 | (2014.01) |
| H04N 19/463 | (2014.01) |
| H04N 19/186 | (2014.01) |
| H04N 19/597 | (2014.01) |
| H04N 19/30 | (2014.01) |

(52) U.S. Cl.
CPC ......... *H04N 19/174* (2014.11); *H04N 19/187* (2014.11); *H04N 19/44* (2014.11); *H04N 19/46* (2014.11); *H04N 19/80* (2014.11); *H04N 19/186* (2014.11); *H04N 19/30* (2014.11); *H04N 19/463* (2014.11); *H04N 19/597* (2014.11)

(58) Field of Classification Search
CPC ........ H04N 19/44; H04N 19/46; H04N 19/80; H04N 19/186; H04N 19/30; H04N 19/463; H04N 19/597
See application file for complete search history.

(56) References Cited

U.S. PATENT DOCUMENTS

| | | | | |
|---|---|---|---|---|
| 9,001,883 | B2* | 4/2015 | Tsai | H04N 19/136 375/240 |
| 9,219,918 | B2* | 12/2015 | Alshina | H04N 19/86 |
| 9,380,302 | B2* | 6/2016 | Kim | H04N 19/91 |
| 9,414,057 | B2* | 8/2016 | Terada | H04N 19/463 |
| 2008/0181522 | A1 | 7/2008 | Hosaka et al. | |
| 2011/0150080 | A1 | 6/2011 | Watanabe et al. | |
| 2011/0227887 | A1* | 9/2011 | Dallas | G02F 1/133553 345/205 |
| 2011/0243248 | A1 | 10/2011 | Alshin et al. | |
| 2013/0034159 | A1 | 2/2013 | Siekmann et al. | |
| 2013/0259118 | A1* | 10/2013 | Fu | H04N 19/00066 375/240.02 |
| 2013/0294705 | A1* | 11/2013 | Kondo | G06T 5/001 382/238 |
| 2014/0092958 | A1 | 4/2014 | Sato | |
| 2014/0314159 | A1 | 10/2014 | Sakurai et al. | |
| 2014/0328413 | A1* | 11/2014 | Esenlik | H04N 19/197 375/240.29 |
| 2014/0334559 | A1* | 11/2014 | Kim | H04N 19/91 375/240.29 |
| 2015/0098513 | A1* | 4/2015 | Fu | H04N 19/91 375/240.25 |
| 2015/0288856 | A1* | 10/2015 | Vanam | G06T 5/002 348/624 |
| 2016/0156938 | A1* | 6/2016 | Fu | H04N 19/70 375/240.02 |

OTHER PUBLICATIONS

Elena Alshina et al., "Non-CE1 : On SAO Type Sharing Between Color Component", Joint Collaborative Team on Video Coding (JCT-VC) of ITU-T SG16 WP3 and ISO/IEC JTC1/SC29/WG11, 9thMeeting: Geneva, Document: JCTVC-0590, Apr. 2012, 11 pages.
Andrew Segall et al., "Unified Deblocking and SAO", Joint Collaborative Team on Video Coding (JCT-VC) of ITU-T SG16 WP3 and ISO/IEC JTC1/SC29/WG11 7th Meeting: Geneva, Document:JCTVC-G608, Nov. 21-30, 2011, 5 pages.
Woo-Shik Kim et al., "Non-CE1: LCU SAO Enable Flag Coding", Joint Collaborative Team on Video Coding (JCT-VC) of ITU-T SG 16 WP 3 and ISO/IEC JTC 1/SC 29IWG 11, Document: JCTVC-H1003, 9th Meeting: Geneva, Apr. 27-May 7, 2012, 10 pages.
Benjamin Bross et al., "High Efficiency Video Coding (HEVC) Text Specification Draft 6", Joint Collaborative Team on Video Coding (JCT-VC) of ITU-T SG16 WP3 and ISO/IEC JTC1/SC29/WG11, 7th Meeting: Geneva, Nov. 21-30, 2011, 259 pages.
Benjamin Bross et al., "High Efficiency Video Coding (HEVC) Text Specification Draft 7", Joint Collaborative Team on Video Coding (JCT-VC) of ITU-T SG16 WP3 and ISO/IEC JTC1/SC29/WG11, Document: JCTVC-I1003_d98, 9th Meeting: Geneva, Apr. 27-May 7, 2012, 280 pages.
Benjamin Bross et al., "High Efficiency Video Coding (HEVC) Text Specification Draft 7", Joint Collaborative Team on Video Coding (JCT-VC) of ITU-T SG16 WP3 and ISO/IEC JTC1/SC29/WG11, Document: JCTVC-I1003_d21, 9th Meeting: Geneva, Apr. 27-May 7, 2012, 286 pages.
Written Opinion dated May 12, 2016 in Singaporean Patent Application No. 11201408555U.
Benjamin Bross, et al., "High efficiency video coding (HEVC) text specification draft 6", Joint Collaborative Team on Video Coding (JCT-VC) of ITU-T SG16 WP3 and ISO/IEC JTC1/SC29/WG11, 8th Meeting, JCTVC-H1003, 2012, 259 Pages.
U.S. Appl. No. 14/123,616, filed Dec. 3, 2013, 2014-0092958, Sato.
U.S. Appl. No. 14/362,527, filed Jun. 3, 2014, 2014-0314159, Sakurai, et al.
U.S. Appl. No. 14/402,188, filed Nov. 19, 2014, Nakagami.
Extended Search Report dated Oct. 16, 2015 in European Patent Application No. 13809141.8.
Search Report dated Sep. 3, 2015 in Singaporean Patent Application No. 11201408555U.
Guillaume Laroche, et al., "Non-CE1: On SAO parameters reduction for Chroma", Joint Collaborative Team on Video Coding (JCT-VC) of ITU-T SG 16 WP 3 and ISO/IEC JTC 1/SC 29/WG 1, 9th Meeting: Geneva, CH, Apr. 27-May 7, 2012, Document JCTVC-I0183, Canon Research Centre France, 6 pages.
Chinese Office Action issued in Application No. 201380032453.6, dated Jun. 2, 2017. With English translation (20 pages).
Notification of Reason(s) for Refusal issued in Japanese Application No. 2014-522552 dated May 23, 2017. With English translation (14 pages).
Notification of Reason(s) for Refusal issued in Japanese Application No. 2014-522553 dated May 23, 2017. With English translation (13 pages).
Chinese Office Action issued in Application No. 201380032425.4, dated Apr. 19, 2017, With English translation (30 pages).
Benjamin Bross, "high Efficiency Video Coding (HEVC) Text Specification Draft 6", Joint Collaborative Team on Video Coding (JCT-VC), 8th Meeting: San Jose, CA, USA, Feb. 1-10, 2012, Abstract only (4 pages).
Office Action dated Nov. 21, 2017 in Japanese Patent Application No. 2014-522552 (with English language translation).
Office Action dated Nov. 21, 2017 in Japanese Patent Application No. 2014-522553 (with English language translation).
Singapore Search Report and Written Opinion dated Oct. 10, 2018 in Singapore Application No. 10201504069Y. 10 Pages.
McCann K., "HM6: High Efficiency Video Coding (HEVC) Test Model 6 Encoder Description", Joint Collaborative Team on Video Coding (JCT-VC) of ITU-T SG16 WP3 and ISO/IEC JTC1/SC29/WG11, 8th Meeting: San Jose, CA, USA, JCTVC-H1002. Feb. 10, 2012. 42 Pages.

* cited by examiner

FIG. 7

| Category | Condition |
|---|---|
| 1 | C < 2 neighboring pixels |
| 2 | C < 1 neighbor && c == 1 neighbor |
| 3 | C > 1 neighbor && c == 1 neighbor |
| 4 | C > 2 neighbors |
| 0 | None of the above |

A Classification rule for 1-D patterns

| Category | Condition |
|---|---|
| 1 | C < 4 neighbors |
| 2 | C < 3 neighbors && C = $4^{th}$ neighbor |
| 3 | C < 3 neighbors && C > $4^{th}$ neighbor |
| 4 | C > 3 neighbors && C < $4^{th}$ neighbor |
| 5 | C > 3 neighbors && C = $4^{th}$ neighbor |
| 6 | C > 4 neighbors |
| 0 | None of the above |

B Classification rule for 2-D patterns

IMAGE PROCESSING APPARATUS AND METHOD

TECHNICAL FIELD

The present disclosure relates to an image processing apparatus and a method, and more particularly, to an image processing apparatus and a method capable of reducing the amount of codes required for controlling a sample adaptive offset filter.

BACKGROUND ART

In recent years, image information is treated as digital information, and at that occasion, an apparatus is becoming widely prevalent that compresses and encodes an image by employing a coding method for performing compression by orthogonal transformation and motion compensation such as discrete cosine transform using redundancy unique to image information for the purpose of highly efficient transmission and accumulation of information. Examples of the coding methods include MPEG (Moving Picture Experts Group), H.264 and MPEG-4 Part 10 (Advanced Video Coding, hereinafter referred to as H.264/AVC), and the like.

Currently, for the purpose of further improving the encoding efficiency as compared with the H.264/AVC, a coding method called HEVC (High Efficiency Video Coding) is being standardized by JCTVC (Joint Collaboration Team-Video Coding) which is a joint standards organization of the ITU-T and the ISO/IEC (for example, see Non-Patent Document 1).

In the current draft of HEVC, sample adaptive offset (SAO) filter is employed. In the sample adaptive offset filter, control signals between components of Y, Cb, Cr are all transmitted independently.

In contrast, Non-Patent Document 2 suggests transmission upon replacing an ON/OFF control signal between components with a single syntax and transmitting the type of the filter and coefficients independently between components.

CITATION LIST

Non-Patent Document

Non-Patent Document 1: Benjamin Bross, Woo-Jin Han, Jens-Rainer Ohm, Gary J. Sullivan, Thomas Wiegand, "High efficiency video coding (HEVC) text specification draft 7", JCTVC-I1003 vera, 2012.6.1

Non-Patent Document 2: Woo-Shik Kim, Do-Kyoung Kwon, In Suk Chong, Marta Karczewicz, "LCU SAO Enable Flag Coding", JCTVC-I0193, Joint Collaborative Team on Video Coding (JCT-VC) of ITU-T SG16 WP3 and ISO/IEC JTC1/SC29/WG11 9th Meeting: Geneva, CH, 27 Apr.-7 May, 2012

SUMMARY OF THE INVENTION

Problems to be Solved by the Invention

However, in the above suggestion, the type information is transmitted independently between the components of Y, Cb, Cr, and therefore, there is a high amount of codes required for controlling the sample adaptive offset filter.

The present disclosure is made in view of such circumstances, and the amount of codes required for controlling the sample adaptive offset filter can be reduced.

Solutions to Problems

According to a first aspect of the present disclosure, an image processing apparatus includes: a setting unit configured to set a type of a sample adaptive offset filter which is common between components of an image; a sample adaptive offset filter unit configured to apply sample adaptive offset filter to an image which is locally decoded when the image is encoded, in accordance with the type of the sample adaptive offset filter which is set by the setting unit; and an encoding unit configured to use the image, to which the sample adaptive offset filter is applied by the sample adaptive offset filter unit, to perform encoding processing on the image to generate an encoded stream.

The setting unit sets the type of the sample adaptive offset filter which is common to a brightness component and a color difference component of the image.

The setting unit sets the type of the sample adaptive offset filter which is common to color difference components of the image.

The setting unit sets the type of the sample adaptive offset filter which is common to a first color difference component and a second color difference component.

When the setting unit sets the type of the sample adaptive offset filter corresponding to the first color difference component to a band offset, the setting unit sets the type of the sample adaptive offset filter corresponding to the second color difference component to the band offset.

When the setting unit sets the type of the sample adaptive offset filter corresponding to the first color difference component to an edge offset, the setting unit sets the type of the sample adaptive offset filter corresponding to the second color difference component to the edge offset.

When the setting unit sets the type of the sample adaptive offset filter to an edge offset, the setting unit sets a pattern rule of the edge offset which is common to color difference components of the image.

When the setting unit sets the type of the sample adaptive offset filter to an edge offset, the setting unit sets a pattern rule of the edge offset which is common to color difference components of the image.

When the setting unit sets the type of the offset filter corresponding to the first color difference component to a type for not applying an offset, the setting unit sets the type of the offset filter corresponding to the second color difference component to a type for not applying an offset.

The image processing apparatus further includes a deblock filter unit configured to apply deblock filter to the image locally decoded, wherein the sample adaptive offset filter unit applies sample adaptive offset filter to the image to which the deblock filter is applied by the deblock filter unit.

In a case of a same offset as an adjacent coding unit adjacent to a current coding unit, the setting unit sets the offset of the adjacent coding unit as the current coding unit.

According to the first aspect of the present disclosure, an image processing method includes: setting a type of a sample adaptive offset filter which is common between components of an image; applying sample adaptive offset filter to an image which is locally decoded when the image is encoded, in accordance with the type of the sample adaptive offset filter which is set; and using the image, to which the sample adaptive offset filter is applied, to perform encoding processing on the image to generate an encoded stream.

According to a second aspect of the present disclosure, an image processing apparatus includes: a setting unit configured to set type information indicating a type of a sample adaptive offset filter which is common between components of an image; a sample adaptive offset filter unit configured to apply sample adaptive offset filter to an image which is locally decoded when the image is encoded, in accordance with the type of the sample adaptive offset filter which is common to the components of the image; an encoding unit configured to use the image, to which the sample adaptive offset filter is applied by the sample adaptive offset filter unit, to perform encoding processing on the image to generate an encoded stream; and a transmission unit configured to transmit the type information which is set by the setting unit and the encoded stream generated by the encoding unit.

The type of the sample adaptive offset filter is common to color difference components of the image.

The type of the sample adaptive offset filter is common to a first color difference component and a second color difference component.

The setting unit sets the type information for each maximum coding unit.

The image processing apparatus further includes a deblock filter unit configured to apply deblock filter to the image locally decoded, wherein the sample adaptive offset filter unit applies sample adaptive offset filter to the image to which the deblock filter is applied by the deblock filter unit.

According to the second aspect of the present disclosure, an image processing method includes: setting type information indicating a type of a sample adaptive offset filter which is common between components of an image; applying sample adaptive offset filter to an image which is locally decoded when the image is encoded, in accordance with the type of the sample adaptive offset filter which is common to the components of the image; using the image, to which the sample adaptive offset filter is applied, to perform encoding processing on the image to generate an encoded stream; and transmitting the type information which has been set and the encoded stream which has been generated.

According to the first aspect of the present disclosure, a type of a sample adaptive offset filter which is common between components of an image is set, to apply sample adaptive offset filter to an image which is locally decoded when the image is encoded, in accordance with the type of the sample adaptive offset filter which is set. Then, the image to which the sample adaptive offset filter is applied is used, to perform encoding processing on the image, to generate an encoded stream.

According to the second aspect of the present disclosure, type information is set, indicating a type of a sample adaptive offset filter which is common between components of an image, to apply sample adaptive offset filter to an image which is locally decoded when the image is encoded, in accordance with the type of the sample adaptive offset filter which is common to the components of the image. Then, the image is used to which the sample adaptive offset filter is applied, to perform encoding processing on the image to generate an encoded stream, to transmit the type information which has been set and the encoded stream which has been generated.

It should be noted that the image processing apparatus explained above may be an independent apparatus, or may be an internal block constituting an image coding device or an image decoding device.

Effects of the Invention

According to a first aspect of the present disclosure, an image can be encoded. In particular, the amount of codes can be reduced.

According to a second aspect of the present disclosure, an image can be encoded and transmitted. In particular, the amount of codes can be reduced.

BRIEF DESCRIPTION OF DRAWINGS

FIG. 7 is a figure illustrating a rule list table of the edge offset.

MODE FOR CARRYING OUT THE INVENTION

Hereinafter, modes for carrying out the present disclosure (hereinafter referred to as embodiments) will be explained. It should be noted that the explanation will be made in the following order.
1. Apparatus and overview of operation
2. Explanation about conventional method
3. First embodiment (image processing apparatus (encoding side))
4. Second embodiment (image processing apparatus (decoding side))
5. Third embodiment (multi-viewpoint image encoding/multi-viewpoint image decoding device)
6. Fourth embodiment (hierarchical image encoding/hierarchical image decoding device)
7. Fifth embodiment (computer)
8. Example of application <1. Apparatus and Overview of Operation>
[Example of Configuration of Image Coding Device]

Figure 1:
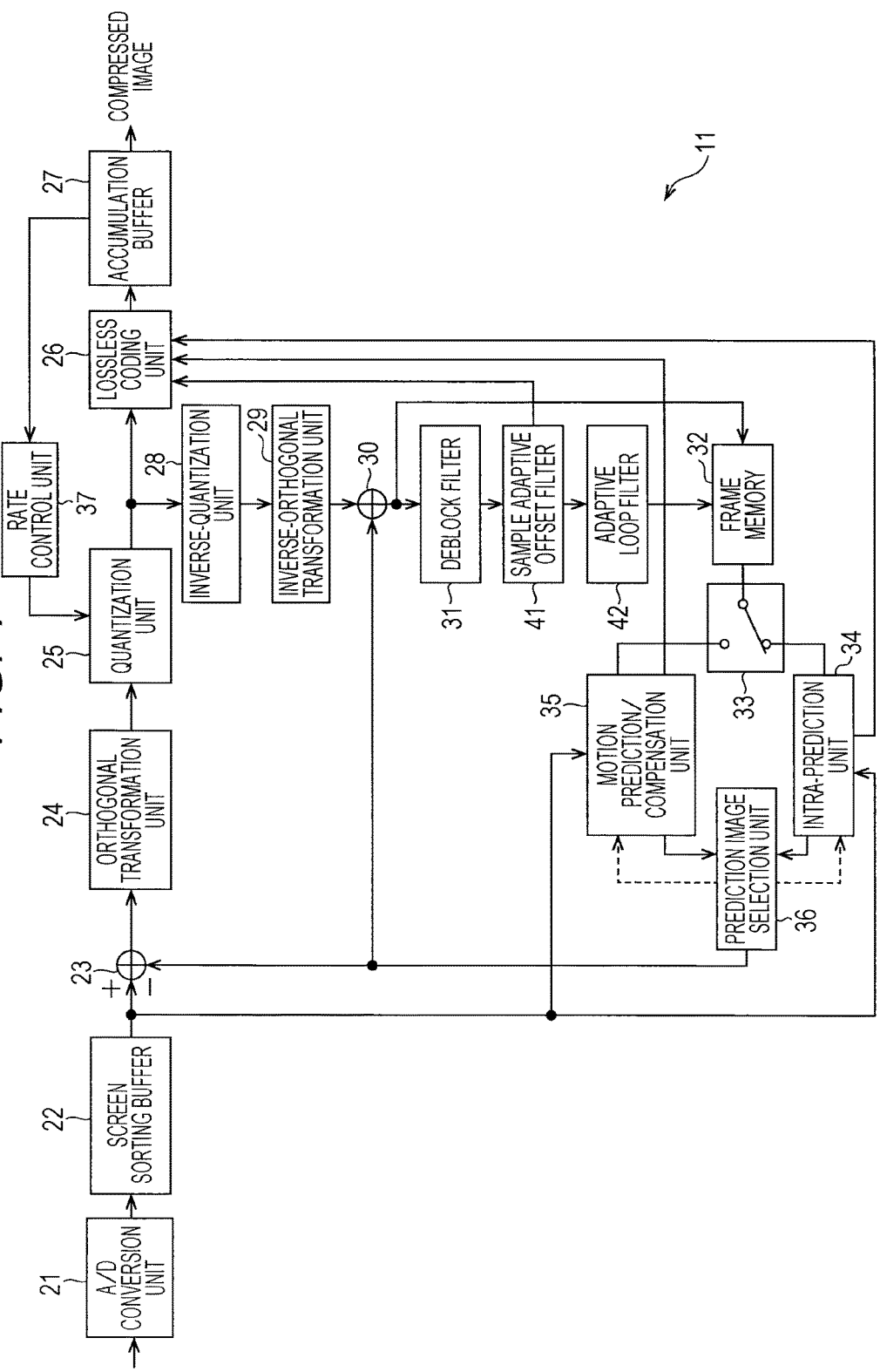
FIG. 1 is a block diagram illustrating an example of main configuration of an image coding device.

FIG. 1 illustrates a configuration of an embodiment of an image coding device serving as an image processing apparatus to which the present disclosure is applied.

An image coding device 11 as shown in FIG. 1 uses prediction processing to encode image data. In this case, an example of an encoding method includes a HEVC (High Efficiency Video Coding) method.

In this HEVC method, a coding unit (CU) is defined. The CU is also referred to as a Coding Tree Block (CTB), and is a partial area of an image in unit of picture, which is a counterpart of the macro block in an H.264/AVC method. In the latter, the size is fixed to 16 by 16 pixels, but in the former, the size is not fixed, and in each sequence, the size is designated in image compression information.

For example, in Sequence Parameter Set (SPS) included in the coded data which are to be output, the maximum size of the CU (LCU (Largest Coding Unit)) and the minimum size thereof ((SCU(Smallest Coding Unit)).

In each LCU, split-flag is 1 as long as the size is not less than the size of SCU, and accordingly, it is possible to divide a CU into CUs of a smaller size. When the value of split_flag is "1", a CU of which size is 2N by 2N is divided into CUs of which size is N by N, which is a hierarchy in one level below.

Further, the CU is divided into Prediction Units (PUs), which are areas serving as target areas of intra- or inter-prediction (partial areas of an image in unit of picture), and divided into Transform Units (TUs) which are areas serving as target areas of orthogonal transformation (partial areas of an image in unit of picture). Currently, in the HEVC method, not only 4 by 4 and 8 by 8 but also 16 by 16 and 32 by 32 orthogonal transformation can be used.

In the example of FIG. 1, the image coding device 11 includes an A/D (Analog/Digital) conversion unit 21, a screen sorting buffer 22, a calculation unit 23, an orthogonal transformation unit 24, a quantization unit 25, a lossless coding unit 26, and accumulation buffer 27. The image coding device 11 also includes an inverse-quantization unit 28, an inverse-orthogonal transformation unit 29, a calculation unit 30, a deblock filter 31, a frame memory 32, a selection unit 33, an intra-prediction unit 34, a motion prediction/compensation unit 35, a prediction image selection unit 36, and a rate control unit 37.

Further, the image coding device 11 includes a sample adaptive offset filter 41 and an adaptive loop filter 42 provided between the deblock filter 31 and the frame memory 32.

The A/D conversion unit 21 performs A/D conversion on received image data, and provides converted image data to the screen sorting buffer 22 to store the image data therein.

The screen sorting buffer 22 sorts images of frames in the stored display order into the order of frames for coding in accordance with a GOP (Group of Picture) structure. The screen sorting buffer 22 provides the images of which frame order has been sorted to the calculation unit 23. The screen sorting buffer 22 also provides the images of which frame order has been sorted to the intra-prediction unit 34 and the motion prediction/compensation unit 35.

The calculation unit 23 subtracts a prediction image, which is provided from the intra-prediction unit 34 or the motion prediction/compensation unit 35 via the prediction image selection unit 36, from an image read from the screen sorting buffer 22, and provides difference information thereof to the orthogonal transformation unit 24.

For example, in a case of an intra-coded image, the calculation unit 23 subtracts a prediction image, which is provided from the intra-prediction unit 34, from an image read from the screen sorting buffer 22. For example, in a case of an inter-coded image, the calculation unit 23 subtracts a prediction image, which is provided from the motion prediction/compensation unit 35, from an image read from the screen sorting buffer 22.

The orthogonal transformation unit 24 applies orthogonal transformation such as discrete cosine transform and Karhunen-Loeve transform on difference information provided from the calculation unit 23. The orthogonal transformation unit 24 provides transformation coefficients to the quantization unit 25.

The quantization unit 25 quantizes the transformation coefficients which are output from the orthogonal transformation unit 24. The quantization unit 25 provides the quantized conversion coefficients to the lossless coding unit 26.

The lossless coding unit 26 applies lossless coding such as variable length encoding or arithmetic encoding to the quantized transformation coefficients.

The lossless coding unit 26 obtains parameters such as information indicating the intra-prediction mode from the intra-prediction unit 34, and obtains parameters such as information indicating the inter-prediction mode and motion vector information from the motion prediction/compensation unit 35.

The lossless coding unit 26 encodes the quantized transformation coefficients, and the obtained parameters (syntax elements), and the like, and makes them a part of header information of coded data (multiplexing). The lossless coding unit 26 provides the coded data obtained through the encoding process to the accumulation buffer 27 and stores the coded data therein.

For example, the lossless coding unit 26 performs lossless coding processing such as variable length encoding or arithmetic encoding. An example of the variable length encoding includes CAVLC (Context-Adaptive Variable Length Coding). An example of the arithmetic encoding includes CABAC (Context-Adaptive Binary Arithmetic Coding).

The accumulation buffer 27 temporarily holds coded stream (data) provided by the lossless coding unit 26. With predetermined timing, the accumulation buffer 27 outputs the coded data held therein as an encoded image to, for example, a recording device, and a transmission path, not shown, provided in a later stage. More specifically, the accumulation buffer 27 is also a transmission unit which transmits a coded stream.

The transformation coefficients quantized by the quantization unit 25 is also provided to the inverse-quantization unit 28. The inverse-quantization unit 28 dequantizes the quantized transformation coefficients according to a method corresponding to the quantization by the quantization unit 25. The inverse-quantization unit 28 provides the obtained transformation coefficients to the inverse-orthogonal transformation unit 29.

The inverse-orthogonal transformation unit 29 performs inverse-orthogonal transformation on the provided transformation coefficients according to a method corresponding to the orthogonal transformation processing by the orthogonal transformation unit 24. The output obtained from the inverse-orthogonal transformation (restored difference information) is provided to the calculation unit 30.

The calculation unit 30 adds a prediction image, which is provided from the intra-prediction unit 34 or the motion prediction/compensation unit 35 via the prediction image selection unit 36, to restored difference information which is an inverse-orthogonal transformation result provided from the inverse-orthogonal transformation unit 29, thus obtaining a locally decoded image (decoded image).

For example, when the difference information corresponds to an intra-encoded image, the calculation unit 30 adds the prediction image provided by the intra-prediction unit 34 to the difference information. For example, when the difference information corresponds to an inter-encoded image, the calculation unit 30 adds the prediction image provided by the motion prediction/compensation unit 35 to the difference information.

The decoded image which is the result of the addition is provided to the deblock filter 31 and the frame memory 32.

The deblock filter 31 performs, as necessary, deblock filter processing on the decoded image thus removing block distortion in the decoded image. The deblock filter 31 provides the filter processing result to the sample adaptive offset filter 41.

The sample adaptive offset filter 41 performs sample adaptive offset (SAO) processing for mainly removing ringing from an image filtered by the deblock filter 31. The sample adaptive offset filter 41 provides the filtered image to the adaptive loop filter 42.

There are totally nine types of offset filters, which include two types of band offsets, six types of edge offsets, and one without any offset. The sample adaptive offset filter 41 sets information indicating the ON/OFF state of each component for each slice, a type of an offset filter for each LCU which is the maximum coding unit, and an offset (value). Among them, the type of the filter is set commonly to the components of Y, Cb, Cr. The sample adaptive offset filter 41 uses the type and the offset which have been set to apply filter processing to the image filtered by the deblock filter 31. In the explanation below, a color space will be used as an example, in which the brightness signal is denoted as Y, and the color difference signals are denoted as Cb, Cr. More specifically, they are simply denoted as Y, Cb, Cr, but Y represents a brightness component, Cb represents a Cb color difference component, and Cr represents a Cr color difference component.

The sample adaptive offset filter 41 provides information indicating the type, which has been set, to the lossless coding unit 26 so that it is encoded. In the sample adaptive offset filter 41, the offset explained above is a coefficient of a filter. As necessary, the offset is also referred to as a coefficient. It should be noted that the details of the sample adaptive offset filter 41 will be explained in FIG. 9 later.

For example, the adaptive loop filter 42 performs adaptive loop filter (ALF) processing on each LCU which is the maximum coding unit. The adaptive loop filter 42 uses, for example, two-dimensional Wiener Filter as a filter. It is to be understood that a filter other than the Wiener Filter may be used.

The adaptive loop filter 42 uses the filter coefficient to perform filter processing, for each LCU, on the image filtered by the sample adaptive offset filter 41, and provides the filter processing result to the frame memory 32.

Although detailed description is omitted in this specification, the image coding device 11 uses the filter coefficient calculated by the adaptive loop filter 42 for each LCU so that the residual from the original image given by the screen sorting buffer 12 becomes the smallest. The calculated filter coefficient is encoded by the lossless coding unit 26, and is transmitted to the image decoding device 51 of FIG. 3 explained later. In this specification, for example, processing is performed for each LUC, but the processing unit of the adaptive loop filter 42 is not limited thereto.

With predetermined timing, the frame memory 32 outputs the accumulated reference image via the selection unit 33 to the intra-prediction unit 34 or the motion prediction/compensation unit 35.

For example, in a case of an intra-coded image, the frame memory 32 provides the reference image via the selection unit 33 to the intra-prediction unit 34. For example, in a case of an inter-coded image, the frame memory 32 provides the reference image via the selection unit 33 to the motion prediction/compensation unit 35.

When the reference image provided from the frame memory 32 is an intra-coded image, the selection unit 33 provides the reference image to the intra-prediction unit 34. When the reference image provided from the frame memory 32 is an inter-coded image, the selection unit 33 provides the reference image to the motion prediction/compensation unit 35.

The intra-prediction unit 34 uses pixel values within the screen to perform intra-prediction (prediction within a screen) to generate a prediction image. The intra-prediction unit 34 performs intra-prediction in multiple modes (intra-prediction modes).

The intra-prediction unit 34 generates prediction images with all the intra-prediction modes, and evaluates each prediction image, thus selecting the optimum mode. When the optimum intra-prediction mode is selected, the intra-prediction unit 34 provides the prediction image generated with the optimum mode via the prediction image selection unit 36 to the calculation unit 23 and the calculation unit 30.

As described above, intra-prediction unit 34 provides a parameter such as intra-prediction mode information and the like indicating the employed intra-prediction mode to the lossless coding unit 26 as necessary.

The motion prediction/compensation unit 35 uses an input image provided from the screen sorting buffer 22 and a reference image provided from the frame memory 32 via the selection unit 33 to perform the motion prediction on the image which is to be inter encoded. The motion prediction/compensation unit 35 performs the motion compensation processing in accordance with the motion vectors detected by the motion prediction, thus generating a prediction image (inter-prediction image information).

The motion prediction/compensation unit 35 performs the inter-prediction with all the candidate inter-prediction modes to generate the prediction images. The motion prediction/compensation unit 35 provides the generated prediction image via the prediction image selection unit 36 to the calculation unit 23 and the calculation unit 30.

The motion prediction/compensation unit 35 provides the inter-prediction mode information indicating the employed inter-prediction mode and a parameter such as motion vector information indicating the calculated motion vectors to the lossless coding unit 26.

In a case of an intra-coded image, the prediction image selection unit 36 provides the output of the intra-prediction unit 34 to the calculation unit 23 and the calculation unit 30, and in a case of an inter-coded image, the prediction image selection unit 36 provides the output of the motion prediction/compensation unit 35 to the calculation unit 23 and the calculation unit 30.

The rate control unit 37 controls the rate of the quantization operation of the quantization unit 25 so as not to cause overflow or underflow, on the basis of a compressed image accumulated in the accumulation buffer 27.

[Operation of Image Coding Device]

Figure 2:
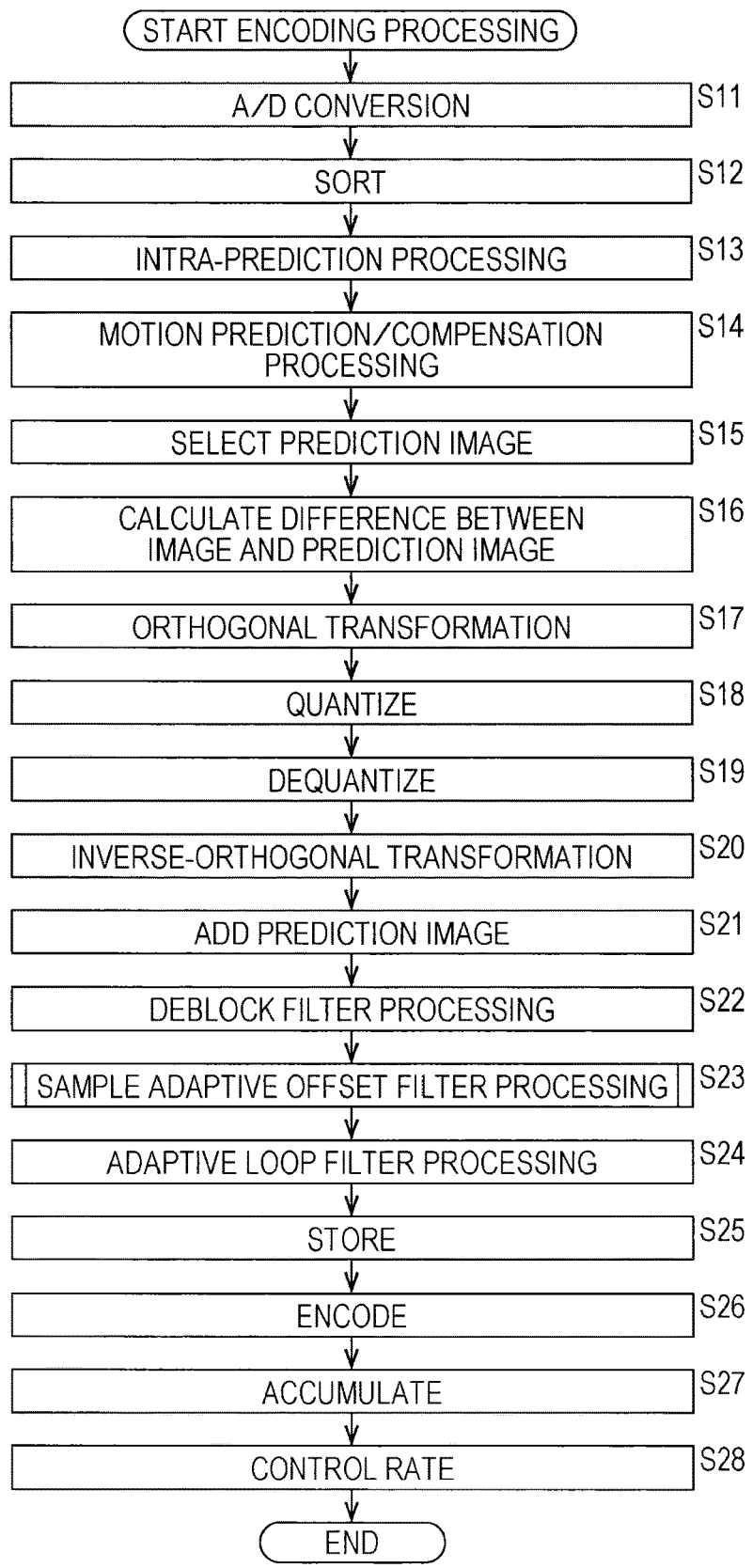
FIG. 2 is a flowchart for explaining an example of flow of encoding processing.

A flow of encoding processing executed by the image coding device 11 as explained above will be explained with reference to FIG. 2.

In step S11, the A/D conversion unit 21 performs A/D conversion on a received image. In step S12, the screen sorting buffer 22 stores images that have been subjected to the A/D conversion, and sorts them from the order in which pictures are displayed into the order in which they are encoded.

When a processing target image provided from the screen sorting buffer 22 is an image of a block which is intra processed, a decoded image which is referred to is read from the frame memory 32, and is provided via the selection unit 33 to the intra-prediction unit 34.

On the basis of these images, in step S13, the intra-prediction unit 34 performs intra-prediction on the pixels of the processing target block in all the candidate intra-prediction modes. It should be noted that a pixel not filtered by the deblock filter 31 is used as a decoded pixel which is referred to.

With this processing, the intra-prediction is performed in all the candidate intra-prediction modes, and the cost function values are calculated for all the candidate intra-prediction modes. Then, the optimum intra-prediction mode is selected on the basis of the calculated cost function values, and the prediction image generated with the intra-prediction in the optimum intra-prediction mode and the cost function value thereof are provided to the prediction image selection unit 36.

When the processing target image provided from the screen sorting buffer 22 is an image which is to be inter-processed, the image which is referred to is read from the frame memory 32 and is provided via the selection unit 33 to the motion prediction/compensation unit 35. On the basis of these images, in step S14, the motion prediction/compensation unit 35 performs the motion prediction/compensation processing.

With this processing, the motion prediction processing is performed in all the candidate inter-prediction modes, and the cost function values are calculated for all the candidate inter-prediction modes, and the optimum inter-prediction mode is determined on the basis of the calculated cost function value. Then, the prediction image generated in the optimum inter-prediction mode and the cost function value thereof are provided to the prediction image selection unit 36.

In step S15, the prediction image selection unit 36 determines, as the optimum prediction mode, one of the optimum intra-prediction mode and the optimum inter-prediction mode on the basis of the cost function values which are output from the intra-prediction unit 34 and the motion prediction/compensation unit 35. Then, the prediction image selection unit 36 selects the prediction image in the determined optimum prediction mode, and provides the prediction image to the calculation units 23, 30. The prediction image is used for calculation in steps S16, S21 explained later.

The selection information of the prediction image is provided to the intra-prediction unit 34 or the motion prediction/compensation unit 35. When the prediction image in the optimum intra-prediction mode is selected, the intra-prediction unit 34 provides the information indicating the optimum intra-prediction mode (more specifically, a parameter of intra-prediction) to the lossless coding unit 26.

When the prediction image in the optimum inter-prediction mode is selected, the motion prediction/compensation unit 35 outputs information indicating the optimum inter-prediction mode and information according to the optimum inter-prediction mode (more specifically, a parameter of motion prediction) to the lossless coding unit 26. The information according to the optimum inter-prediction mode includes motion vector information, reference frame information, and the like.

In step S16, the calculation unit 23 calculates a difference between the images sorted by the processing in step S12 and the prediction image selected by the processing in step S15. When the inter-prediction is performed, the prediction image is provided from the motion prediction/compensation unit 35 via the prediction image selection unit 36 to the calculation unit 23. When the intra-prediction is performed, the prediction image is provided from the intra-prediction unit 34 via the prediction image selection unit 36 to the calculation unit 23.

The amount of data of the difference data is reduced as compared with the original image data. Therefore, the amount of data can be compressed more greatly as compared with a case where an image is encoded as it is.

In step S17, the orthogonal transformation unit 24 performs orthogonal transformation on difference information provided from the calculation unit 23. More specifically, orthogonal transformation such as discrete cosine transform and Karhunen-Loeve transformation and like is performed and, transformation coefficients are output.

In step S18, the quantization unit 25 quantizes the transformation coefficients. In this quantization, the rate is controlled as explained in the processing of step S28 described later.

As described above, the quantized difference information is locally decoded as follows. More specifically, in step S19, the inverse-quantization unit 28 dequantizes the transformation coefficient quantized by the quantization unit 25 according to the characteristics corresponding to the characteristics of the quantization unit 25. In step S20, the inverse-orthogonal transformation unit 29 performs inverse-orthogonal transformation on the transformation coefficients dequantized by the inverse-quantization unit 28 according to the characteristics corresponding to the characteristics of the orthogonal transformation unit 24.

In step S21, the calculation unit 30 adds the prediction image received via the prediction image selection unit 36 to difference information locally decoded, and generates a locally decoded (i.e., locally decoded) image (image corresponding to input to the calculation unit 23).

In step S22, the deblock filter 31 performs the deblock filter processing on the image which is output from the calculation unit 30, thus removing block distortion. The filtered image provided by the deblock filter 31 is output to the sample adaptive offset filter 41.

In step S23, the sample adaptive offset filter 41 performs sample adaptive offset filter processing. With this processing, the type of the offset filter which is common to the components of Y, Cb, Cr is set for each LCU which is the maximum coding unit, and further, the offset is set for each component. Further, by using them, the filter processing is applied to the image filtered by the deblock filter 31. It should be noted that the details of the sample adaptive offset filter processing will be explained later with reference to FIG. 10.

Each piece of information obtained when the type information common to the components and the offset for each component are provided to the lossless coding unit 26 (which will be hereinafter collectively referred to as adaptive offset parameters) are encoded in step S26 explained later.

In step S24, the adaptive loop filter 42 applies adaptive loop filter processing to the image filtered by the sample adaptive offset filter 41. For example, on the image filtered by the sample adaptive offset filter 41, the filter processing is applied to an image for each LCU using the filter coefficients, and the filter processing result is provided to the frame memory 32.

As described above, the processing units of the sample adaptive offset filter 41 and the adaptive loop filter 42 are caused to be the same, so that the processing can be done efficiently.

In step S25, the frame memory 32 stores filtered images. It should be noted that the frame memory 32 also receives images, which are not filtered by the deblock filter 31, the sample adaptive offset filter 41, and the adaptive loop filter 42, from the calculation unit 30, and stores the images.

On the other hand, the transformation coefficients quantized in step S18 explained above are also provided to the lossless coding unit 26. In step S26, the lossless coding unit 26 encodes the quantized transformation coefficients which are output from the quantization unit 25 and the provided parameters. More specifically, the difference image is encoded by lossless encoding such as variable length encoding, arithmetic encoding, and the like to be compressed. In this case, the parameters of the sample adaptive offset filter are also encoded.

In step S27, the accumulation buffer 27 accumulates the encoded difference image (which is a coded stream) as a compressed image. The compressed images accumulated in the accumulation buffer 27 are read as necessary, and transmitted to the decoding side via the transmission path.

In step S28, the rate control unit 37 controls the rate of the quantization operation of the quantization unit 25 so as not to cause overflow or underflow, on the basis of the compressed image accumulated in the accumulation buffer 27.

When the processing of step S28 is finished, the encoding processing is terminated.

[Example of Configuration of Image Decoding Device]

Figure 3:
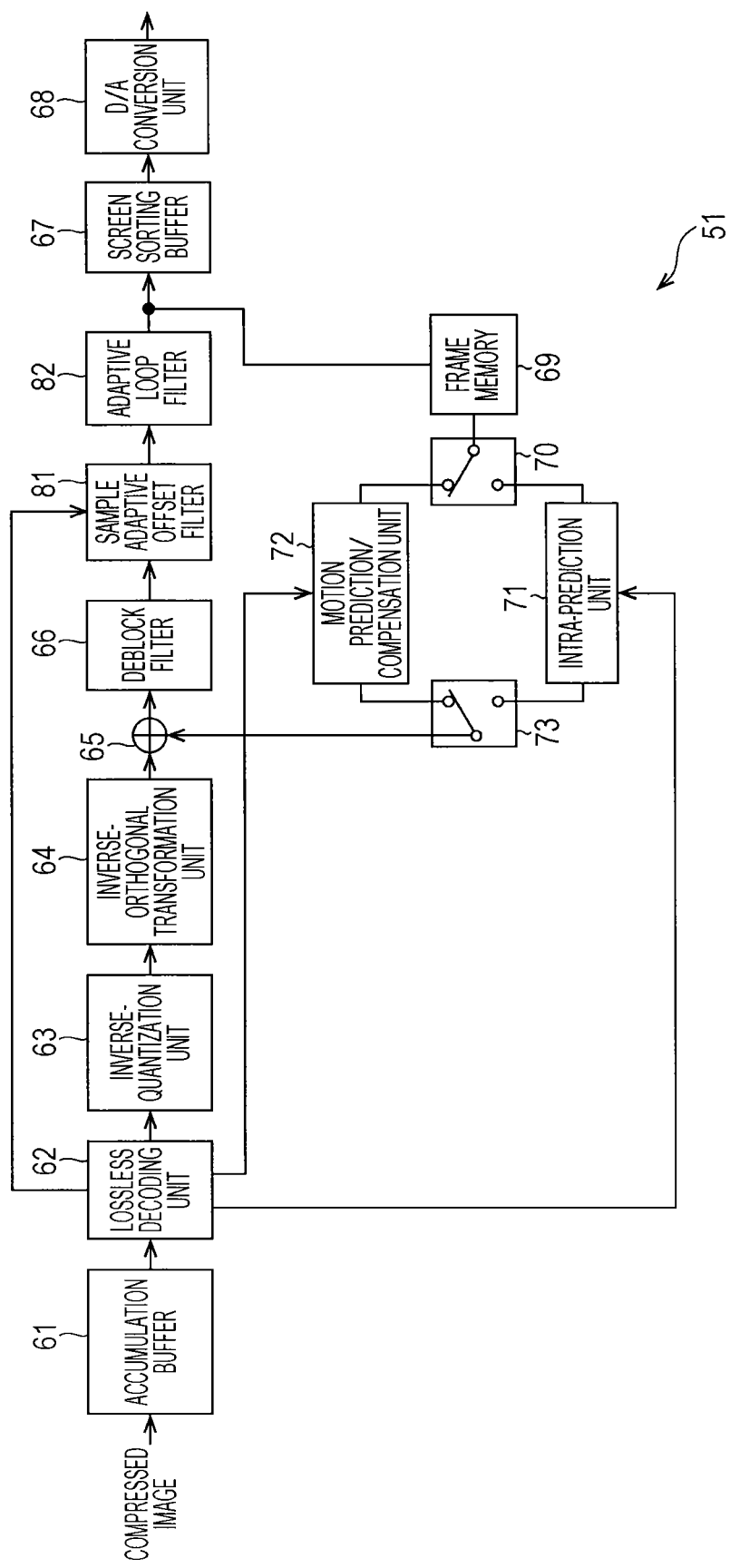
FIG. 3 is a block diagram illustrating a main example of configuration of an image decoding device.

FIG. 3 illustrates a configuration of an embodiment of an image decoding device serving as an image processing apparatus to which the present disclosure is applied. The image decoding device 51 as shown in FIG. 3 is a decoding device corresponding to the image coding device 11 of FIG. 1.

The coded stream (data) encoded by the image coding device 11 is transmitted via a predetermined transmission path to the image decoding device 51 corresponding to the image coding device 11, and is decoded by the image decoding device 51.

As shown in FIG. 3, the image decoding device 51 includes an accumulation buffer 61, a lossless decoding unit 62, an inverse-quantization unit 63, an inverse-orthogonal transformation unit 64, a calculation unit 65, a deblock filter 66, a screen sorting buffer 67, and a D/A conversion unit 68. The image decoding device 51 includes a frame memory 69, a selection unit 70, an intra-prediction unit 71, a motion prediction/compensation unit 72, and a selection unit 73.

Further, the image decoding device 51 includes a deblock filter 66 and a sample adaptive offset filter 81 and adaptive loop filter 82 between the screen sorting buffer 67 and the frame memory 69.

The accumulation buffer 61 is also a reception unit which receives coded data transmitted. The accumulation buffer 61 receives and accumulates coded data transmitted. The coded data are encoded by the image coding device 11. The lossless decoding unit 62 decodes coded data, which are read from the accumulation buffer 61 with predetermined timing, in accordance with the method corresponding to the encoding method of the lossless coding unit 26 of FIG. 1.

The lossless decoding unit 62 provides a parameter such as information indicating the intra-prediction mode in which decoding is performed to the intra-prediction unit 71, and provides information indicating the inter-prediction mode and a parameter such as motion vector information to the motion prediction/compensation unit 72. The lossless decoding unit 62 provides the decoded adaptive offset parameters (such as information indicating ON/OFF states of the components, information indicating the type common to the components for each LCU, the offset of each component, and the like) to the sample adaptive offset filter 81.

The inverse-quantization unit 63 dequantizes the coefficient data obtained in the decoding process performed by the lossless decoding unit 62 (quantized coefficients) in accordance with the method corresponding to the quantization method of the quantization unit 25 of the FIG. 1. More specifically, the inverse-quantization unit 63 uses the quantization parameters provided by the image coding device 11 to dequantize the quantization coefficients in accordance with the same method as that of the inverse-quantization unit 28 of FIG. 1.

The inverse-quantization unit 63 provides the inverse-quantized coefficient data, i.e., the orthogonal transformation coefficients, to the inverse-orthogonal transformation unit 64. The inverse-orthogonal transformation unit 64 performs inverse-orthogonal transformation on the orthogonal transformation coefficients according to the method corresponding to the orthogonal transformation method of the orthogonal transformation unit 24 of FIG. 1, and obtains decoded residual data corresponding to residual data before the orthogonal transformation is performed by the image coding device 11.

The obtained decoded residual data obtained from the inverse-orthogonal transformation is provided to the calculation unit 65. The calculation unit 65 receives a prediction image from the intra-prediction unit 71 or the motion prediction/compensation unit 72 via the selection unit 73.

The calculation unit 65 adds the decoded residual data and the prediction image, and obtains decoded image data corresponding to image data before the prediction image is subtracted by the calculation unit 23 of the image coding device 11. The calculation unit 65 provides the decoded image data to the deblock filter 66.

The deblock filter 66 performs the deblock filter processing on the decoded image as necessary to remove block distortion from the decoded image. The deblock filter 66 provides the filter processing result to the sample adaptive offset filter 81.

The sample adaptive offset filter 81 performs offset filter (SAO) processing, mainly for removing ringing, on the image filtered by the deblock filter 66.

The sample adaptive offset filter 81 uses the adaptive offset parameter provided from the lossless decoding unit 62 to apply the filter processing on the image filtered by the deblock filter 66 for each LCU which is the maximum coding unit. The sample adaptive offset filter 81 provides the filtered image to the adaptive loop filter 82.

The details of the sample adaptive offset filter 81 will be explained in FIG. 16, but the sample adaptive offset filter 81 receives the information indicating the ON/OFF state of each component for each slice, and the type (type) and the offset (value) of the offset filter for each LCU which is the maximum coding unit. Among them, the type of the filter is set commonly to the components of Y, Cb, Cr. The sample adaptive offset filter 81 uses the received type and offset to apply the filter processing to the image filtered by the deblock filter 66.

The adaptive loop filter 82 is configured basically in the same manner as the adaptive loop filter 42 of the image coding device 11 of FIG. 1, and performs the adaptive loop filter processing on each LCU which is the maximum coding unit. For the image filtered by the sample adaptive offset filter 81, the adaptive loop filter 82 uses the filter coefficients to perform the filter processing on each LCU, and provides the filter processing result to the frame memory 69 and the screen sorting buffer 67.

Although the detailed description is omitted in this specification, the filter coefficients are calculated for each LUC by the adaptive loop filter 42 of the image coding device 11 in the image decoding device 51, and those encoded and received are decoded by the lossless decoding unit 62 to be used.

The screen sorting buffer 67 sorts images. More specifically, the order of frames sorted for the order of encoding by the screen sorting buffer 22 of FIG. 1 is sorted into the original order for display. The D/A conversion unit 68 performs D/A conversion on an image provided from the screen sorting buffer 67, outputs the image to a display, not shown, and causes the display to show the image.

The output of the adaptive loop filter 82 is further provided to the frame memory 69.

The frame memory 69, the selection unit 70, the intra-prediction unit 71, the motion prediction/compensation unit 72, and the selection unit 73 respectively correspond to the frame memory 32, the selection unit 33, the intra-prediction unit 34, the motion prediction/compensation unit 35, and the prediction image selection unit 36 of the image coding device 11.

The selection unit 70 reads inter-processed image and the reference image from the frame memory 69, and provides the images to the motion prediction/compensation unit 72. The selection unit 70 reads the image used for the intra-prediction from the frame memory 69, and provides the image to the intra-prediction unit 71.

As necessary, the lossless decoding unit 62 provides the intra-prediction unit 71 with, such as information indicating intra-prediction mode obtained by decoding the header information. On the basis of the information, the intra-prediction unit 71 generates a prediction image from the reference image obtained from the frame memory 69, and provides the generated prediction image to the selection unit 73.

The motion prediction/compensation unit 72 receives information obtained by decoding the header information (the prediction mode information, the motion vector information, the reference frame information, the flags, various kinds of parameters, and the like) from the lossless decoding unit 62.

On the basis of the information provided from the lossless decoding unit 62, the motion prediction/compensation unit 72 generates the prediction image from the reference image obtained from the frame memory 69, and provides the generated prediction image to the selection unit 73.

The selection unit 73 selects the prediction image generated by the motion prediction/compensation unit 72 or the intra-prediction unit 71, and provides the selected prediction image to the calculation unit 65.

[Operation of Image Decoding Device]

An example of flow of decoding processing executed by the image decoding device 51 as explained above will be explained with reference to FIG. 4.

When the decoding processing is started, the accumulation buffer 61 receives and accumulates the coded stream (data), which has been transmitted, in step S51. In step S52, the lossless decoding unit 62 decodes the coded data provided from the accumulation buffer 61. Ipicture, Ppicture, and Bpicture encoded by the lossless coding unit 26 of FIG. 1 are decoded.

Before decoding of the picture, information about parameters such as the motion vector information, the reference frame information, and the prediction mode information (the intra-prediction mode or the inter-prediction mode) is also decoded.

When the prediction mode information is intra-prediction mode information, the prediction mode information is provided to the intra-prediction unit 71. When the prediction mode information is inter-prediction mode information, the motion vector information corresponding to the prediction mode information and the like are provided to the motion prediction/compensation unit 72. The adaptive offset parameter is also decoded, and is provided to the sample adaptive offset filter 81.

In step S53, the intra-prediction unit 71 or the motion prediction/compensation unit 72 respectively performs prediction image generation processing in association with the prediction mode information provided from the lossless decoding unit 62.

More specifically, when the lossless decoding unit 62 provides the intra-prediction mode information, the intra-prediction unit 71 generates the intra-prediction image in the intra-prediction mode. When the lossless decoding unit 62 provides the inter-prediction mode information, the motion prediction/compensation unit 72 performs the motion prediction/compensation processing in the inter-prediction mode, and generates the inter-prediction image.

With this processing, the prediction image (intra-prediction image) generated by the intra-prediction unit 71 or the prediction image (inter-prediction image) generated by the motion prediction/compensation unit 72 is provided to the selection unit 73.

In step S54, the selection unit 73 selects the prediction image. More specifically, the prediction image generated by the intra-prediction unit 71 or the prediction image generated by the motion prediction/compensation unit 72 is provided. Therefore, the provided prediction image is selected, and provided to the calculation unit 65, and is added to the output of the inverse-orthogonal transformation unit 64 in step S57 explained later.

In step S52 explained above, the transformation coefficients decoded by the lossless decoding unit 62 are also provided to the inverse-quantization unit 63. In step S55, the inverse-quantization unit 63 dequantizes the transformation coefficients decoded by the lossless decoding unit 62 in accordance with the characteristics corresponding to the characteristics of the quantization unit 25 of FIG. 1.

In step S56, the inverse-orthogonal transformation unit 29 performs the inverse-orthogonal transformation on the transformation coefficients, which are dequantized by the inverse-quantization unit 28, in accordance with the characteristics corresponding to the characteristics of the orthogonal transformation unit 24 of FIG. 1. Accordingly, the difference information corresponding to the input of the orthogonal transformation unit 24 of FIG. 1 (the output of the calculation unit 23) is decoded.

In step S57, the calculation unit 65 adds the difference information to the prediction image which is selected in the processing of step S54 explained above and is input via the selection unit 73. Thus, the original image is decoded.

In step S58, the deblock filter 66 performs deblock filter processing on the image which is output by the calculation unit 65. Therefore, the block distortion is removed. The decoded image provided by the deblock filter 66 is output to the sample adaptive offset filter 81.

In step S59, the sample adaptive offset filter 81 performs the sample adaptive offset filter processing. The sample adaptive offset filter 81 uses the adaptive offset parameter provided by the lossless decoding unit 62 to apply the filter processing onto the image filtered by the deblock filter 66. The sample adaptive offset filter 81 provides the filtered image to the adaptive loop filter 82.

Although the details of the sample adaptive offset filter 81 will be explained later in FIG. 17, the sample adaptive offset filter 81 performs the sample adaptive offset filter processing. With this processing, the type of the offset filter which is common to the components of Y, Cb, Cr is set for each LCU which is the maximum coding unit, and further, the offset is set for each component. Further, by using them, the filter processing is applied to the image filtered by the deblock filter 66.

In step S60, the adaptive loop filter 82 performs the adaptive loop filter processing on the image filtered by the sample adaptive offset filter 81. The adaptive loop filter 82 uses the filter coefficients calculated for each LCU which is the maximum coding unit to perform the filter processing for each LCU on the input image, and provides the filter processing result to the screen sorting buffer 67 and the frame memory 69.

In step S61, the frame memory 69 stores the filtered image.

In step S62, the screen sorting buffer 67 sorts the images filtered by the adaptive loop filter 82. More specifically, the order of frames sorted for encoding by the screen sorting buffer 22 of the image coding device 11 is sorted into the original order for display.

In step S63, the D/A conversion unit 68 performs the D/A conversion on the images provided by the screen sorting buffer 67. The images are output to a display, not shown, and the images are displayed.

When the processing in step S63 is finished, the decoding processing is terminated.

<Explanation about Conventional Method>
[Adaptive Offset Processing According to HEVC Method]

Subsequently, the sample adaptive offset filter according to the HEVC method will be explained. In the HEVC method, the Sample Adaptive Offset method is employed.

At the encoding side, the sample adaptive offset filter 41 is provided between the deblock filter (DB) 31 and the adaptive loop filter (ALF) 42. Likewise, at the decoding side, the sample adaptive offset filter 81 is provided between the deblock filter (DB) 66 and the adaptive loop filter (ALF) 82.

The types of the adaptive offsets include two types of band offsets and six types of edge offsets, and alternatively, the offset may not be applied. It is possible to select which type of adaptive offset explained above is used to encode the image for each LCU.

This selection information is encoded as PQAO Info. by the encoding unit (Entropy Coding), and the bit stream is generated, and the generated bit stream is transmitted to the decoding side. By using this method, the encoding efficiency can be improved.

First, the details of the band offset will be explained with reference to FIG. 5.

Figure 5:
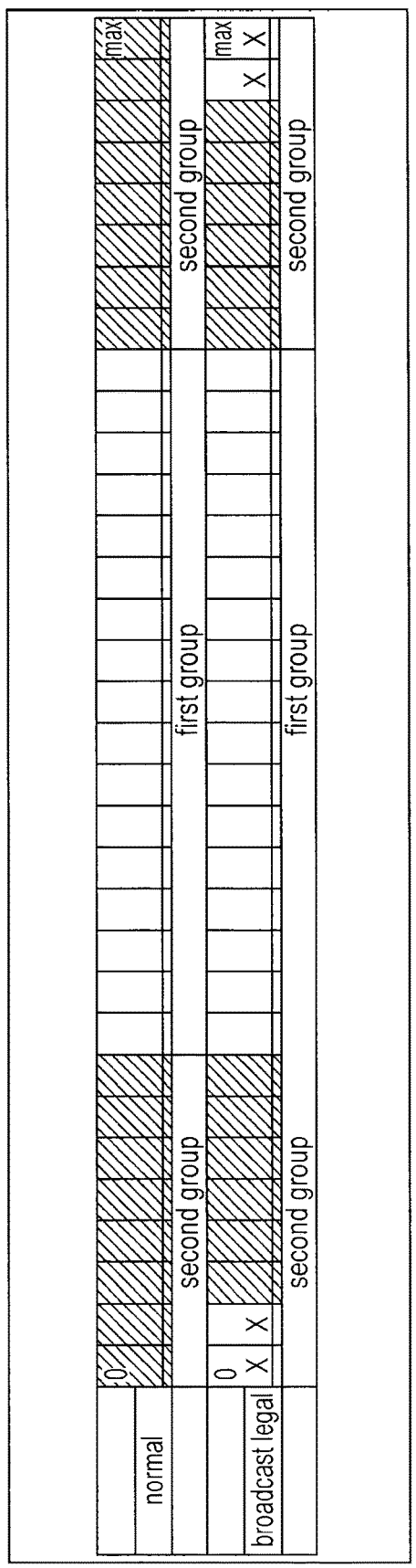
FIG. 5 is a figure for explaining band offset.

In the band offset, a single mark denotes one band=eight pixels in the example of FIG. 5. The brightness pixel value is divided into 32 bands, and each band independently has an offset value.

More specifically, in the example of FIG. 5, sixteen central bands of 0 to 255 pixels (32 bands) are classified into a first group, and eight bands at both sides are classified into a second group.

Then, the offset of any one of the first group and the second group is encoded and sent to the decoding side. In general, any given area is often either an area where it is clear as to white or black or an area where the color is ambiguous. All pixels are rarely in both of the first group and the second group. For this reason, when the offset of only one of them is sent, this can suppress increase in the amount of encoding caused by transmission of pixel values of not-included pixels in each LCU.

When the input signal is given by broadcast, the brightness signal is limited to the range of 16, 235, and the color difference signal is limited to the range of 16, 240. At this occasion, the broadcast legal shown in the lower column of FIG. 5 is applied, and the offset values for the two bands at each of the both sides which are indicated with x marks are not transmitted.

Subsequently, the details of the edge offset will be explained with reference to FIG. 6.

At the edge offset, the pixel value in question and an adjacent pixel value adjacent to the pixel value are compared, and the offset value is transmitted to a category corresponding thereto.

Figure 6:
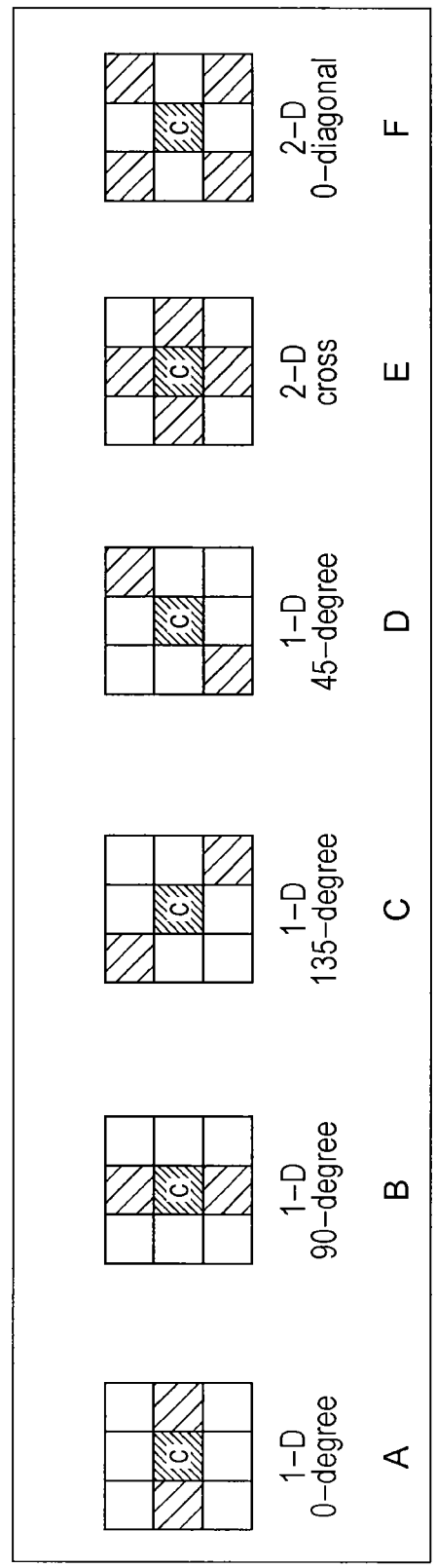
FIG. 6 is a figure for explaining edge offset.

The edge offsets include four one-dimensional patterns indicated in A of FIG. 6 to D of FIG. 6, and two two-dimensional patterns indicated in E of FIGS. 6 and F of FIG. 6, and the offsets are transmitted in the categories indicated in FIG. 6.

In A of FIG. 6, adjacent pixels are arranged at the right and the left of the pixel C in one dimensional direction. More specifically, this indicates 1-D, 0-degree pattern forming zero degree with respect to the pattern A of FIG. 6. In B of FIG. 6, adjacent pixels are arranged above and below the pixel C in one dimensional direction. More specifically, this indicates 1-D, 90-degrees pattern forming 90 degrees with respect to the pattern A of FIG. 6.

In C of FIG. 6, adjacent pixels are arranged upper left and lower right of the pixel C in one dimensional direction. More specifically, this indicates 1-D, 135-degrees pattern forming 135 degrees with respect to the pattern A of FIG. 6. In D of FIG. 6, adjacent pixels are arranged upper right and lower left of the pixel C in one dimensional direction. More specifically, this indicates 1-D, 135-degrees pattern forming 45 degrees with respect to the pattern A of FIG. 6.

In E of FIG. 6, adjacent pixels are arranged above, below, at the left, and at the right of the pixel C in two dimensional direction. More specifically, this indicates 2-D, cross pattern which crosses the pixel C. In F of FIG. 6, adjacent pixels are arranged upper right, lower left, upper left, and lower right of the pixel C in two dimensional direction. More specifically, this indicates 2-D, diagonal pattern which diagonally crosses the pixel C.

Reference symbol A of FIG. 7 shows a rule list table of one-dimensional patterns (Classification rule for 1-D patterns). The patterns of A of FIG. 6 to D of FIG. 6 are classified into five types of categories as shown in A of FIG. 7, and according to the category, the offset is calculated and sent to the decoding unit.

When the pixel value of the pixel C is less than the pixel values of the two adjacent pixels, it is classified into category 1. When the pixel value of the pixel C is less than the pixel value of one of the adjacent pixels and matches the pixel value of the other of the adjacent pixels, it is classified into category 2. When the pixel value of the pixel C is more than the pixel value of one of the adjacent pixels and matches the pixel value of the other of the adjacent pixels, it is classified into category 3. When the pixel value of the pixel C is more than the pixel values of the two adjacent pixels, it is classified into category 4. If none of the above is applicable, it is classified into category 0.

Reference symbol B of FIG. 7 indicates a rule list table of the two-dimensional patterns (Classification rule for 2-D patterns). The patterns of E of FIGS. 6 and F of FIG. 6 are classified into seven types of categories as shown in B of FIG. 7, and according to the category, the offset is sent to the decoding side.

When the pixel value of the pixel C is less than the pixel values of the four adjacent pixels, it is classified into category 1. When the pixel value of the pixel C is less than the pixel values of the three adjacent pixels and matches the pixel value of the fourth adjacent pixel, it is classified into category 2. When the pixel value of the pixel C is less than the pixel values of the three adjacent pixels and more than the pixel value of the fourth adjacent pixel, it is classified into category 3.

When the pixel value of the pixel C is more than the pixel values of the three adjacent pixels and less than the pixel value of the fourth adjacent pixel, it is classified into category 4. When the pixel value of the pixel C is more than the pixel values of the three adjacent pixels and matches the pixel value of the fourth adjacent pixel, it is classified into category 5. When the pixel value of the pixel C is more than the pixel values of the four adjacent pixels, it is classified into category 6. If none of the above is applicable, it is classified into category 0.

As described above, at the edge offset, the amount of calculation for one-dimensional pattern is lower because comparison can be done with only two adjacent pixels. In a high efficiency encoding condition, the value of one bit offset is made into higher precision as compared with the low delay encoding condition, and sent to the decoding side.

The adaptive offset processing explained above is processing that is performed for each LCU in the HEVC method (Non-Patent Document 1). The adaptive offset processing in the HEVC method, the control signals between the components of Y, Cb, Cr are all independently transmitted.

More specifically, in the HEVC method, the SAO control information such as the ON/OFF information, the filter type information, and the filter coefficient is transmitted for each LCU or all independently for each component.

In contrast, Non-Patent Document 2 suggests the following technique: the ON/OFF control signal between components in the SAO control information explained above is replaced with a single syntax and transmitted.

Figure 8:
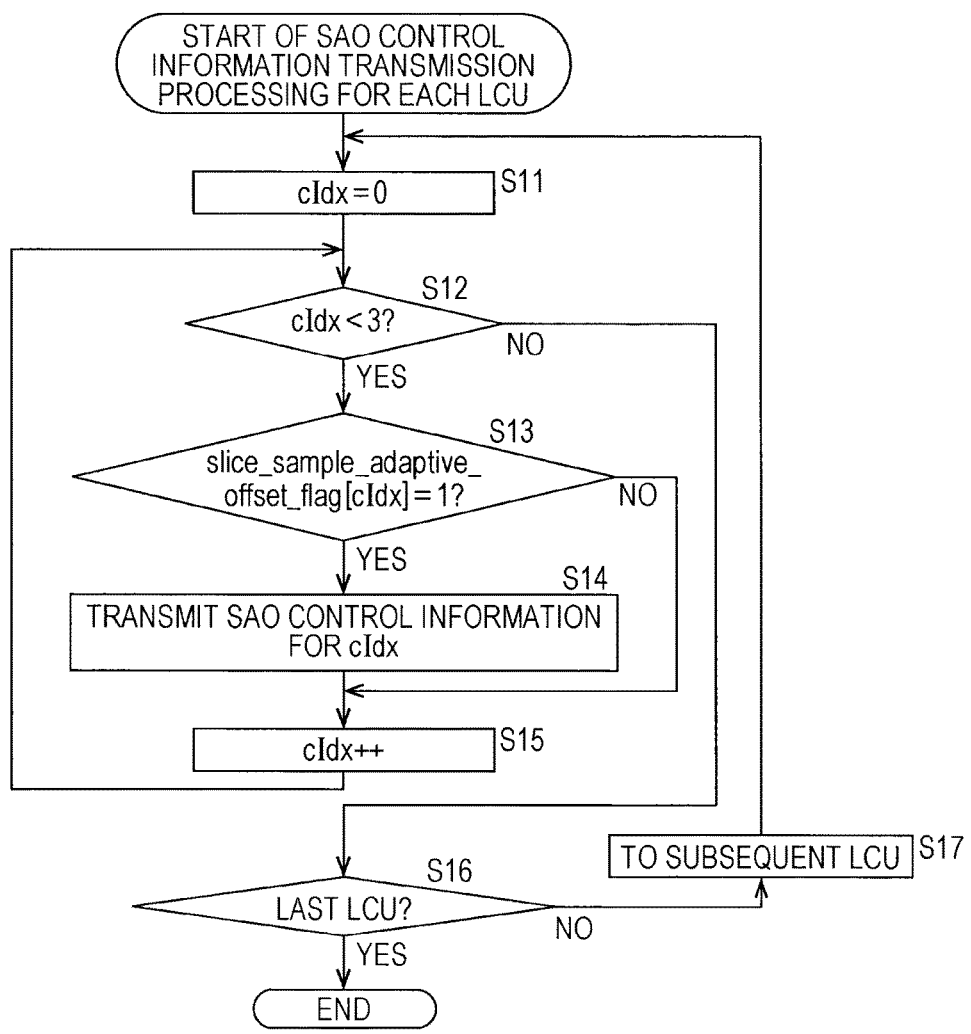
FIG. 8 is a flowchart for explaining conventional SAO control information transmission processing.

Subsequently, conventional SAO control information transmission processing for each LCU will be explained with reference to a flowchart of FIG. 8.

In step S11, the component ID(cIdx) is zero. In this case, cIdx=0 indicates Y (brightness signal), cIdx=1 indicates Cb (color difference signal), and cIdx=2 indicates Cr (color difference signal).

In step S12, a determination is made as to whether cIdx<3 holds or not. When cIdx<3 is determined to hold in step S12, the processing in step S13 is subsequently performed. In step S13, a determination is made as to whether slice_sample_adaptive_offset_flag[cIdx]=1 holds or not. The flag slice_sample_adaptive_offset_flag[cIdx] is the information indicating the ON/OFF state of (flag) each component for each slice.

When slice_sample_adaptive_offset_flag[cIdx]=1 is determined to hold (more specifically, the sample adaptive offset filter is performed on cIdx) in step S13, the processing in step S14 is subsequently performed. In step S14, the SAO control information for cIdx (=0) is transmitted. In Non-Patent Document 2, the filter type information, the filter coefficient (offset), and the like are transmitted as the SAO control information.

In step S13, slice_sample_adaptive_offset_flag[cIdx]=0 holds (more specifically, the sample adaptive offset filter is determined not to perform on cIdx, the processing in step S14 is skipped, and the processing in step S15 is subsequently performed).

In step S15, cIdx++ is performed (more specifically, cIdx=1), the processing in step S12 is performed back again. In step S12, cIdx<3 is determined not to hold, the processing in step S16 is subsequently performed.

In step S16, a determination is made as to whether the current LCU which is currently being processed is the last LCU or not. When the current LCU which is currently being processed is determined not to be the last LCU in step S16, the processing in step S17 is subsequently performed. In step S17, a subsequent LCU is adopted as the current LCU, and the processing in step S11 is performed back again.

When the current LCU which is currently being processed is determined to be the last LCU in step S16, the SAO control information transmission processing for each LCU is terminated.

As described above, in Non-Patent Document 2, the SAO control information such as the filter type information and the filter coefficient is transmitted for each LCU or all independently for each component.

However, in Non-Patent Documents 1, 2, the type information is transmitted independently between the components of Y, Cb, Cr, and therefore, the amount of codes required for controlling the sample adaptive offset filter is high.

In view of the above issues, the present technique is made such that the filter type is made common between the components (Y, Cb, Cr or Cb, Cr), and only the coefficients are independently transmitted as the SAO control information.

<3. First Embodiment>

[Example of Configuration of Sample Adaptive Offset Filter]

Figure 9:
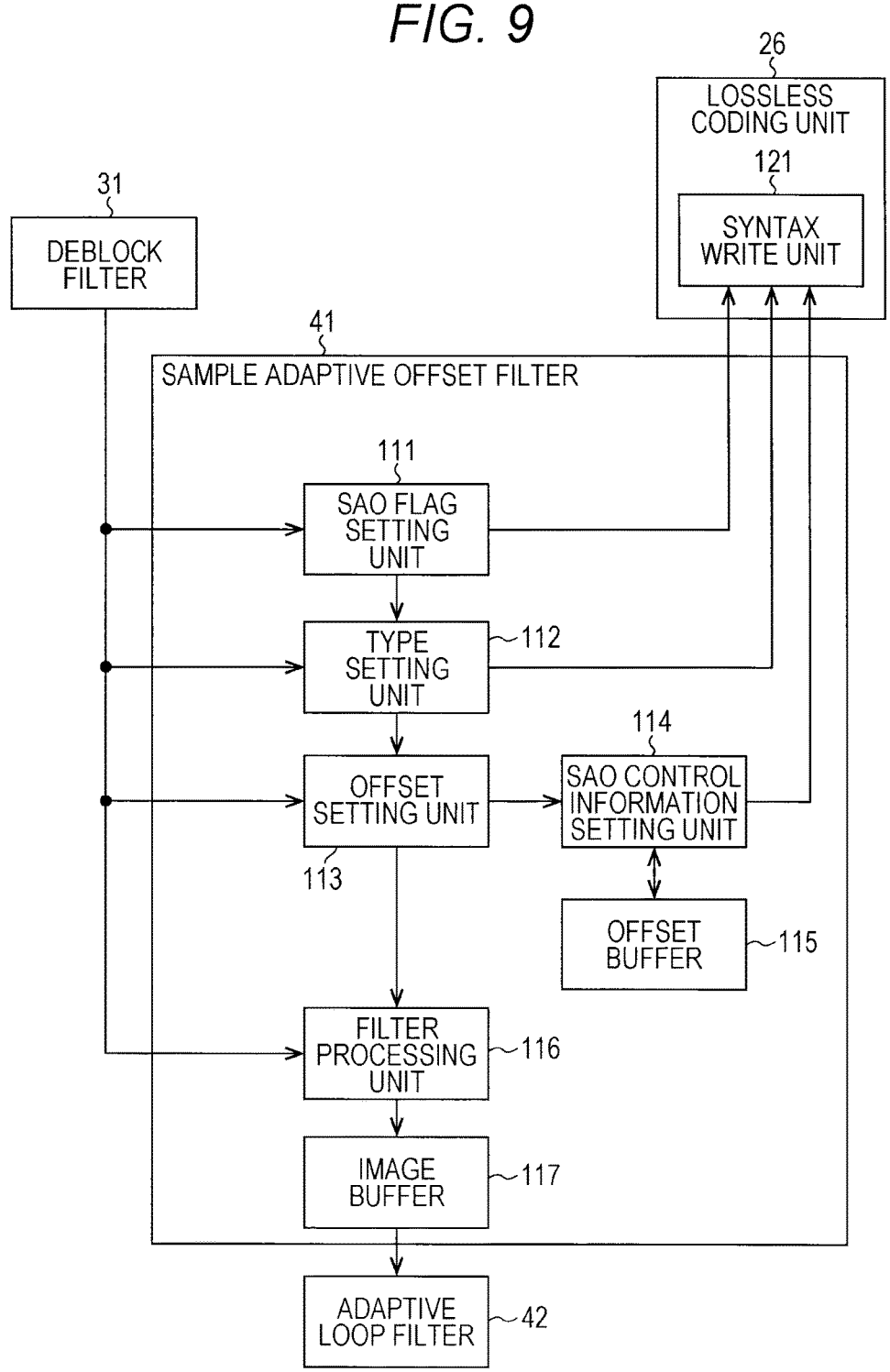
FIG. 9 is a block diagram illustrating an example of configuration of a sample adaptive offset filter to which the present disclosure is applied.

FIG. 9 is a block diagram illustrating an example of configuration of a sample adaptive offset filter and a lossless coding unit in the image coding device of FIG. 1.

In the example of FIG. 9, the sample adaptive offset filter 41 includes an SAO flag setting unit 111, a type setting unit 112, an offset setting unit 113, an SAO control information setting unit 114, an offset buffer 115, a filter processing unit 116, and an image buffer 117.

The lossless coding unit 26 includes at least a syntax write unit 121.

The deblocked pixel values given by the deblock filter 31 are input into the SAO flag setting unit 111, the type setting unit 112, the offset setting unit 113, and the filter processing unit 116. The SAO flag setting unit 111 uses the deblocked pixel values to set an SAO flag (slice_sample_adaptive_offset_flag) indicating the ON/OFF state of the sample adaptive offset filter of each component in units of slices. The SAO flag setting unit 111 provides the SAO flag, which has been set, to the type setting unit 112 and syntax write unit 121.

The type setting unit 112 uses the deblocked pixel values to set, in units of LCUs, the type of the filter which is common to the components of Y, Cb, Cr. For example, in units of LCUs, the cost function value is calculated, and the optimum type for the LCU of which cost function value is the least is set. At this occasion, the signals of all the components are used, but the used signals are not limited, and, for example, only the brightness signal may be used. The type setting unit 112 provides the information indicating the type to the offset setting unit 113 and the syntax write unit 121. The type setting unit 112 also provides the SAO flag of each component to the offset setting unit 113.

The offset setting unit 113 uses the deblocked pixel values to set the offsets (coefficients) independent in each component of Y, Cb, Cr in units of LCUs. At this occasion, for example, the signals of each component (deblocked pixel values) are used to calculate the cost function value in units of LCUs, and the optimum offset for the LCU of which cost function value is the least is set.

The offset setting unit 113 provides the filter processing unit 116 with the SAO flag and the offset of each component and the type common to the components. The offset setting unit 113 also provides the offset to the SAO control information setting unit 114.

The SAO control information setting unit 114 writes the offset given by the offset setting unit 113 to the offset buffer 115 for each component. The SAO control information setting unit 114 refers to the information written to the offset buffer 115, and determines whether the offset given by the offset setting unit 113 matches the offset of a left LCU which is adjacent to the left of the current LCU which is currently being processed. When the offset given by the offset setting unit 113 is determined to match the offset of a left LCU which is adjacent to the left of the current LCU which is currently being processed, the SAO control information setting unit 114 sets sao_merge_left_flag, and provides sao_merge_left_flag, which has been set, to the syntax write unit 121 as the SAO control information.

Further, the SAO control information setting unit 114 determines whether the offset given by the offset setting unit 113 matches the offset of an upper LCU which is adjacent to the upper side of the current LCU. When the offset given by the offset setting unit 113 is determined to match the offset of an upper LCU which is adjacent to the upper side of the current LCU, the SAO control information setting unit 114 sets sao_merge_top_flag, and provides sao_merge_top_flag, which has been set, to the syntax write unit 121 as the SAO control information.

When the offset given by the offset setting unit 113 matches neither the left LCU nor the upper LCU, the SAO control information setting unit 114 provides only the offset to the syntax write unit 121 as the SAO control information. More specifically, sao_merge_left_flag is a flag indicating the same offset as the left LCU, and sao_merge_top_flag is a flag indicating the same offset as the upper LCU. When these flags are set, the flag that has been set is sent in place of the offset. In this case, an example where the determination is made based on only the offset has been explained. Alternatively, the offset setting unit 113 may provide not only the type but also the offset, and the determination may be made based on the type and the offset.

The offset buffer 115 holds the offset of an LCU adjacent to the current LCU. The offset buffer 115 may hold at least the offset of the left LCU and the upper LCU of the current LCU.

The filter processing unit 116 performs sample adaptive offset filter processing, for each LCU, on the deblocked pixel value of each component given by the deblock filter 31 on the basis of the SAO flag, the type information, and the offset information given by the offset setting unit 113. The filter processing unit 116 provides the pixel value having been subjected to the offset processing to the image buffer 117.

The image buffer 117 temporarily stores the pixel values which have been subjected to the offset processing by the filter processing unit 116, and provides the pixel values to the adaptive loop filter 42 with predetermined timing.

The syntax write unit 121 writes the SAO flag given by the SAO flag setting unit 111 to the header portion of the coded stream for each slice. The syntax write unit 121 writes, for each LCU, the type common to the components given by the type setting unit 112 and the offset or the merge flag for each component given by the SAO control information setting unit 114 to the header portion of the coded stream.

[Sample Adaptive Offset Filter Processing of Encoding Side]

Subsequently, the sample adaptive offset filter processing that is performed by the sample adaptive offset filter 41 of FIG. 9 will be explained with reference to the flowchart of FIG. 10. It should be noted that the sample adaptive offset filter processing is processing in step S23 of FIG. 2.

The deblocked pixel values given by the deblock filter 31 are input into the SAO flag setting unit 111, the type setting unit 112, the offset setting unit 113, and the filter processing unit 116. In step S111, the SAO flag setting unit 111 uses the deblocked pixel values to set the SAO flag (slice_sample_adaptive_offset_flag) indicating the ON/OFF state of the sample adaptive offset filter of each component in units of slices. The SAO flag setting unit 111 provides the SAO flag, which has been set, to the type setting unit 112 and the syntax write unit 121.

In step S112, the type setting unit 112 sets component ID(cIdx)=0. In this case, cIdx=0 indicates Y (brightness signal), cIdx=1 indicates Cb (color difference signal), and cIdx=2 indicates Cr (color difference signal).

In step S113, the type setting unit 112 determines whether slice_sample_adaptive_offset_flag[0 or 1 or 2]=1 holds or not. More specifically, in step S113, the sample adaptive offset filter of at least one of Y, Cb, Cr is to be applied or not is determined.

When slice_sample_adaptive_offset_flag[0 or 1 or 2]=1 is determined to hold, and more specifically, when the sample adaptive offset filter of at least one of Y, Cb, Cr is determined to be applied in step S113, the processing in step S114 is subsequently performed.

In step S114, the type setting unit 112 uses the deblocked pixel values to set the type (sao_type) of the filter which is common to the components of Y, Cb, Cr in units of LCUs. The type setting unit 112 provides the information indicating the type to the syntax write unit 121, and thereafter, the processing in step S115 is subsequently performed.

Figure 12:
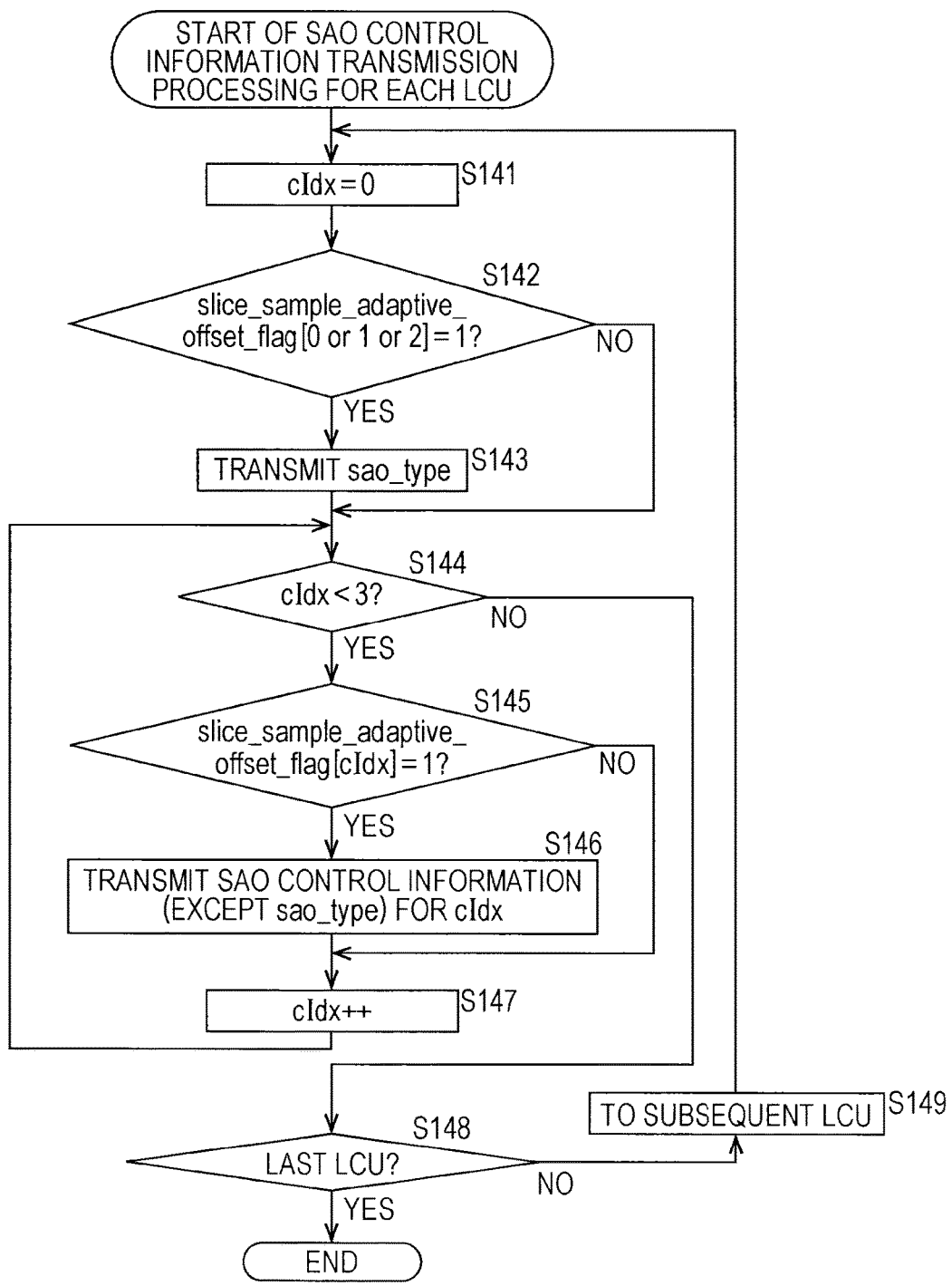
FIG. 12 is a flowchart for explaining SAO control information transmission processing.

In association with this, the syntax write unit 121 writes sao_type to the syntax, provides it to the accumulation buffer 27, and transmits it in step S143 of FIG. 12 explained later.

When slice_sample_adaptive_offset_flag[0 and 1 and 2]=0 is determined to hold, and more specifically, when sample adaptive offset filters of all of Y, Cb, Cr are determined not to be applied in step S112, the processing in step S114 is skipped and step S115 is subsequently performed.

The type setting unit 112 determines whether cIdx<3 holds or not in step S115. When cIdx<3 is determined to hold in step S115, the processing in step S116 is subsequently performed.

In step S116, the type setting unit 112 determines whether slice_sample_adaptive_offset_flag[cIdx]=1 holds or not.

When slice_sample_adaptive_offset_flag[cIdx]=1 is determined to hold (more specifically, the sample adaptive offset filter is performed for cIdx) in step S116, the processing in step S117 is subsequently performed. At this occasion, the type setting unit 112 provides the type of the filter which is set in step S114 and the SAO flag (slice_sample_adaptive_offset_flag) of corresponding cIdx which is set in step S111 to the offset setting unit 113.

In step S117, the offset setting unit 113 and the SAO control information setting unit 114 set the SAO control information for cIdx (=0 (more specifically, Y brightness signal)). This SAO control information setting processing will be explained later with reference to FIG. 11. With this processing, the offset or the merge flag is set as the SAO control information, and the SAO control information which has been set is provided to the syntax write unit 121. In this case, the offset which has been set is provided to the filter processing unit 116.

In association with this, the syntax write unit 121 writes the SAO control information for cIdx to the syntax, provides the SAO control information to the accumulation buffer 27, and transmits the SAO control information in step S146 of FIG. 12 explained later.

After step S117, the processing in step S118 is subsequently performed. In step S116, slice_sample_adaptive_offset_flag[cIdx]=0 is determined to hold (more specifically, the sample adaptive offset filter for cIdx is not performed), the processing in step S117 is skipped and step S118 is subsequently performed.

In step S118, the filter processing unit 116 performs the adaptive filter processing on the deblocked pixels given by the deblock filter 31. At this occasion, the adaptive filter processing is performed on the basis of the type of the filter which has been set in step S114, the SAO flag corresponding to cIdx which has been set in step S111, and further the offset having been set in step S117.

The filter processing unit 116 provides the pixel values having been subjected to the offset processing to the image buffer 117. The image buffer 117 temporarily stores the pixel values having been subjected to the offset processing by the filter processing unit 116, and provides the pixel values to the adaptive loop filter 42 with predetermined timing.

In step S119, the type setting unit 112 performs cIdx++ (more specifically, cIdx=1 (which means Cb color difference signal)), and the processing in step S115 is performed back again. When cIdx<3 is determined not to hold in step S115, the processing in step S120 is subsequently performed.

In step S120, the type setting unit 112 determines whether the current LCU which is currently being processed is the last LCU or not. When the current LCU which is currently being processed is determined not to be the last LCU in step S120, the processing in step S121 is subsequently performed. In step S121, the current LCU is changed to a subsequent LCU, and the processing in step S112 is performed back again.

When the current LCU which is currently being processed is determined to be the last LCU in step S120, the sample adaptive offset filter is terminated.

[SAO Control Information Setting Processing]

Subsequently, the SAO control information setting processing in step S117 of FIG. 10 will be explained with reference to the flowchart of FIG. 11.

In step S131, the offset setting unit 113 uses the deblocked pixel values to set the offsets (coefficients) independent in each component of cIdx in units of LCUs, and provides the offsets having been set, to the filter processing unit 116 and the SAO control information setting unit 114.

In step S132, the SAO control information setting unit 114 writes the offsets given by the offset setting unit 113 to the offset buffer 115 for each component of Y, Cb, Cr.

In step S133, the SAO control information setting unit 114 determines whether the current LCU which is currently being processed can be merged with the left LCU adjacent to the left of the current LCU. More specifically, the SAO control information setting unit 114 refers to information written to the offset buffer 115, and determines whether the offset of the current LCU given by the offset setting unit 113 matches the offset of the left LCU.

When the offset of the current LCU given by the offset setting unit 113 is determined to match the offset of the left LCU in step S133, and the current LCU is determined to be able to be merged with the left LCU, the processing in step S134 is subsequently performed.

In step S134, the SAO control information setting unit 114 sets sao_merge_left_flag, and provides sao_merge_left_flag, which has been set, to the syntax write unit 121 as the SAO control information.

On the other hand, when the current LCU is determined not to be able to be merged with the left LCU in step S133, the processing in step S135 is subsequently performed. In step S135, the SAO control information setting unit 114 determines whether the current LCU which is currently being processed can be merged with the upper LCU adjacent to the upper side of the current LCU. More specifically, the SAO control information setting unit 114 refers to the information written to the offset buffer 115, and determines whether the offset of the current LCU given by the offset setting unit 113 matches the offset of the upper LCU or not.

When the offset of the current LCU given by the offset setting unit 113 is determined to match the offset of the upper LCU, and the current LCU is determined to be able to be merged with the upper LCU in step S135, the processing in step S136 is subsequently performed.

In step S136, the SAO control information setting unit 114 sets sao_merge_top_flag, and provides sao_merge_top_flag, which has been set, to the syntax write unit 121 as the SAO control information.

On the other hand, when the current LCU is determined not to be able to be merged with the upper LCU in step S135, the processing in step S137 is subsequently performed.

In step S137, the SAO control information setting unit 114 provides the offset to the syntax write unit 121 as the SAO control information.

[SAO Control Information Transmission Processing for Each LCU]

Subsequently, SAO control information transmission processing for each LCU with the conventional example shown in FIG. 8 will be explained with reference to the flowchart of FIG. 12. This processing corresponds to the sample adaptive offset filter processing explained with reference to FIG. 10, and is, for example, processing performed in the encoding processing of step S26 of FIG. 2.

The syntax write unit 121 sets component ID(cIdx)=0 in step S141.

In step S142, the syntax write unit 121 determines whether slice_sample_adaptive_offset_flag[0 or 1 or 2]=1 holds or not. More specifically, a determination is made as to whether the sample adaptive offset filter of at least one of Y, Cb, Cr is applied or not.

When slice_sample_adaptive_offset_flag[0 or 1 or 2]=1 is determined to hold in step S142, the processing in step S143 is subsequently performed. In step S143, the syntax write unit 121 writes information indicating the type (sao_type) of the filter provided and set in step S114 of FIG. 10 to the syntax, provides the information to the accumulation buffer 27 and transmits the information. The information indicating the type is transmitted in units of PPSes (Picture Parameter Sets) or slices.

In step S142, when slice_sample_adaptive_offset_flag[0 and 1 and 2]=0 is determined to hold, step S143 is skipped, and the processing in step S144 is subsequently performed.

In step S144, the syntax write unit 121 determines whether cIdx<3 holds or not. When cIdx<3 is determined to hold in step S144, the processing in step S145 is subsequently performed.

In step S145, the syntax write unit 121 determines whether slice_sample_adaptive_offset_flag[cIdx]=1 holds or not. When slice_sample_adaptive_offset_flag[cIdx]=1 is determined to hold (more specifically, when the sample adaptive offset filter for cIdx is to be performed) in step S145, the processing in step S146 is subsequently performed.

Figure 10:
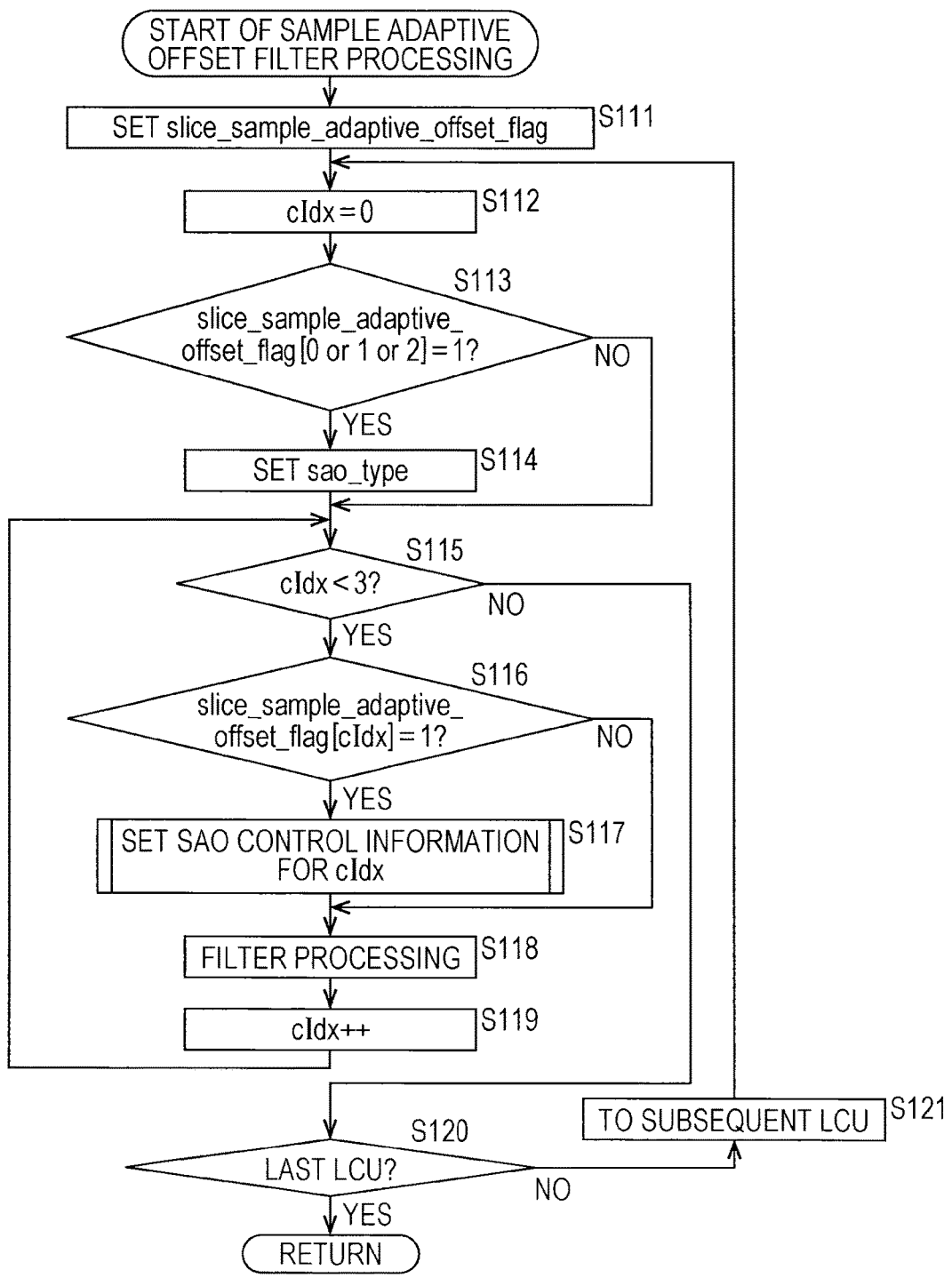
FIG. 10 is a flowchart for explaining sample adaptive offset filter processing.
Figure 11:
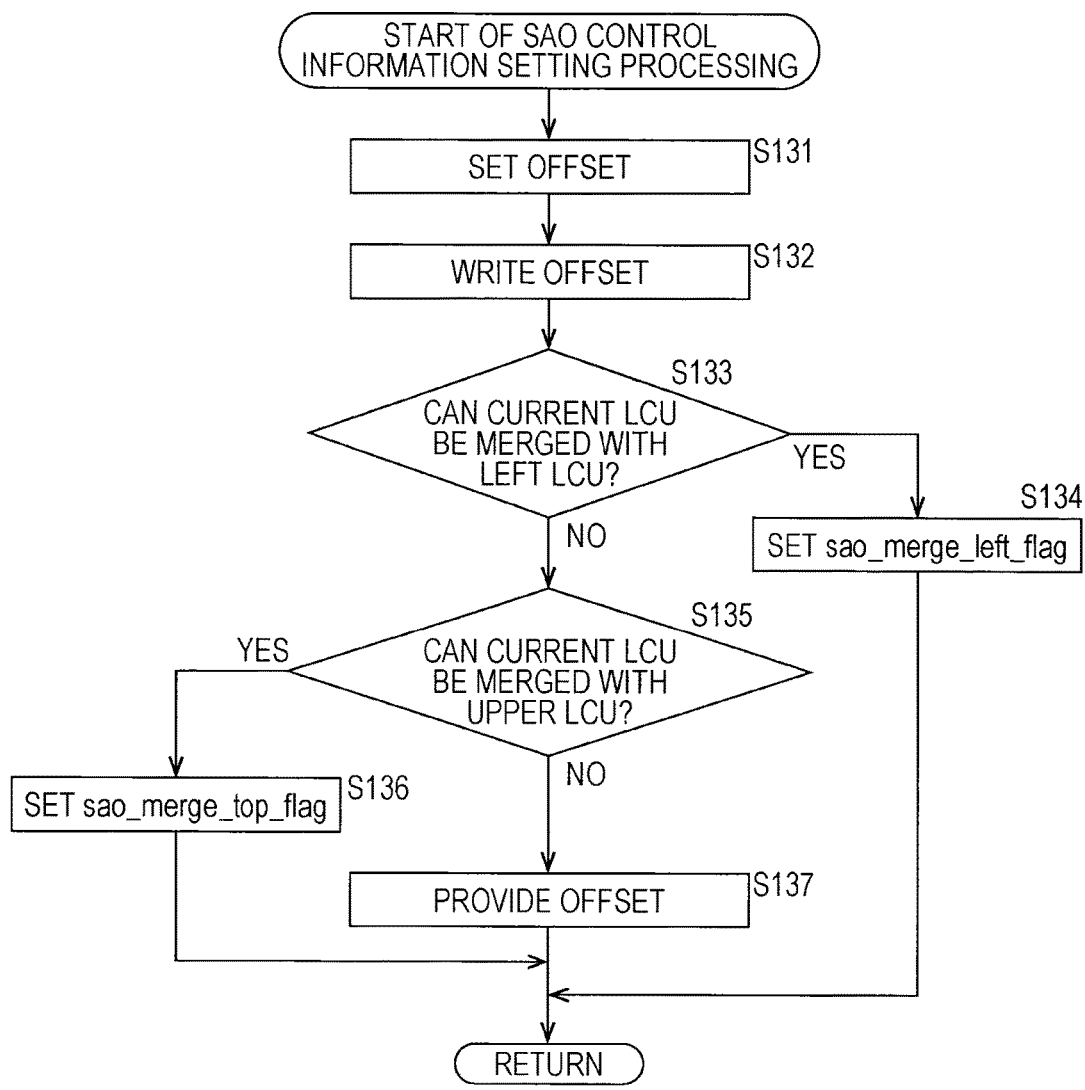
FIG. 11 is a flowchart for explaining SAO control information setting processing.

In step S146, the syntax write unit 121 writes, to the syntax, the SAO control information (except sao_type) for cIdx (=0 (which is the Y brightness signal)) set and provided in step S117 of FIG. 10, provides it to the accumulation buffer 27, and transmits it.

In step S147, the syntax write unit 121 performs cIdx++ (more specifically, cIdx=1 (which is the Cr color difference signal)), and the processing in step S144 is performed back again. When cIdx<3 is determined not to hold in step S144, the processing in step S148 is subsequently performed.

In step S148, the syntax write unit 121 determines whether the current LCU which is currently being processed is the last LCU or not. When the current LCU which is currently being processed is determined not to be the last LCU in step S148, the processing in step S149 is subsequently performed. In step S149, the current LCU is changed to a subsequent LCU, and the processing in step S141 is performed back again.

In step S148, when the current LCU which is currently being processed is determined to be the last LCU, the SAO control information transmission processing for each LCU is terminated.

As described above, the information indicating the type of the filter is made common between the components of Y, Cb, Cr, and more specifically, the information indicating the type of the filter is made common between the components of the brightness and the color difference, and is transmitted, so that only the coefficients (offsets) are transmitted independently between each of the components, whereby the amount of encoding can be reducing.

[Another Example of Configuration of Sample Adaptive Offset Filter]

Figure 13:
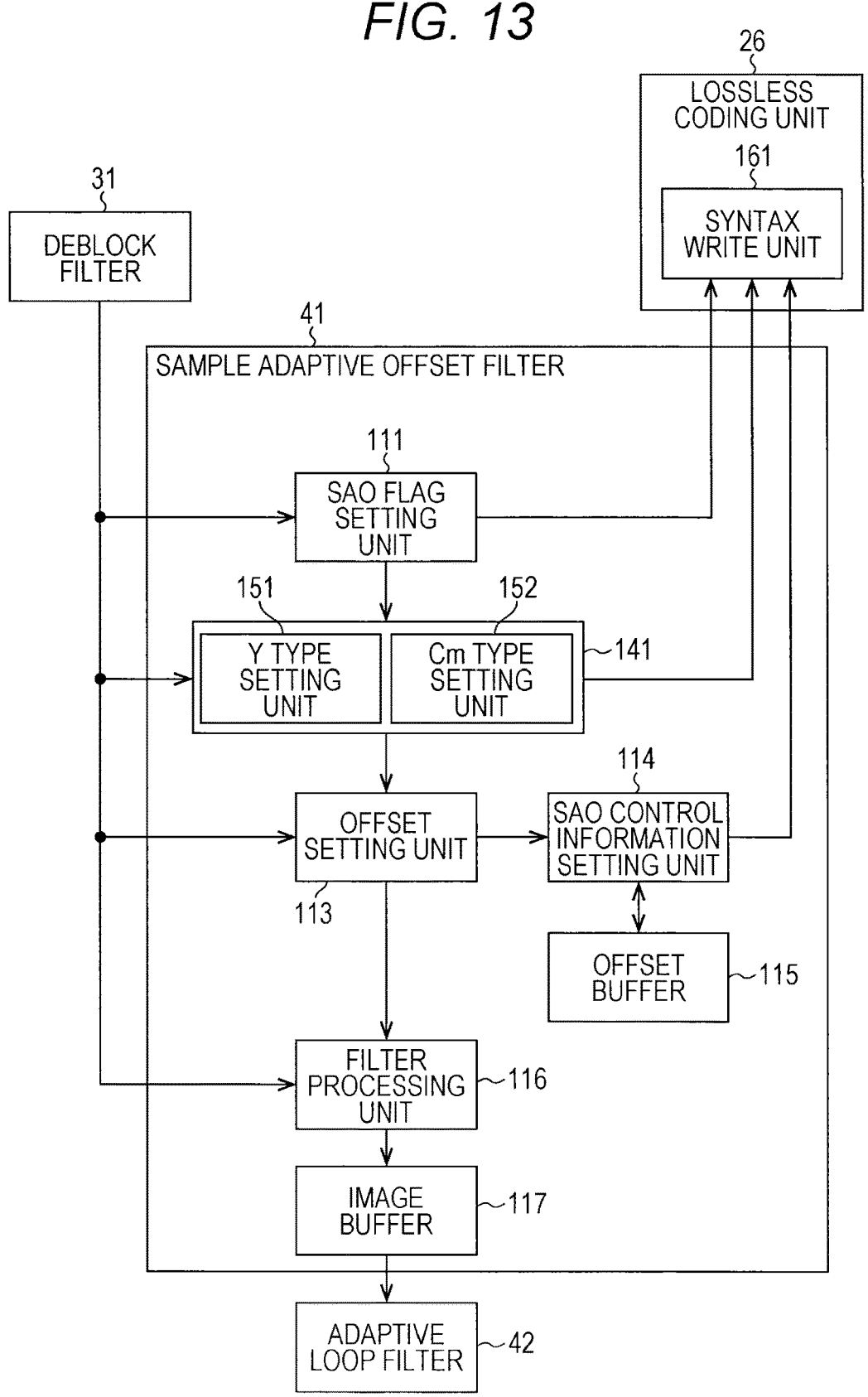
FIG. 13 is a block diagram illustrating another example of configuration of a sample adaptive offset filter to which the present disclosure is applied.

FIG. 13 is a block diagram illustrating another example of configuration of a sample adaptive offset filter and a lossless coding unit of an image coding device of FIG. 1.

In the example of FIG. 13, the sample adaptive offset filter 41 is the same as the sample adaptive offset filter 41 of FIG. 9 in that it includes an SAO flag setting unit 111, an offset setting unit 113, an SAO control information setting unit 114, an offset buffer 115, a filter processing unit 116, and an image buffer 117.

The sample adaptive offset filter 41 is different from the sample adaptive offset filter 41 of FIG. 9 in that the type setting unit 112 is replaced with the type setting unit 141.

The lossless coding unit 26 of FIG. 13 is different from the lossless coding unit 26 of FIG. 9 in that the syntax write unit 121 is replaced with the syntax write unit 161.

More specifically, the type setting unit 141 of FIG. 13 includes a Y type setting unit 151 configured to set the filter type independent in the brightness signal and a Cm type setting unit 152 configured to set the filter type common to the color difference signals of Cb and Cr.

For example, the Y type setting unit 151 uses the brightness signal to calculate the cost function value for each LCU, and sets the optimum type for the LCU of the brightness signal of which cost function value is the least. For example, the Cm type setting unit 152 uses at least one of Cb and Cr to calculate the cost function value for each LCU, and sets the optimum type to the LCU of the color difference signal of which cost function value is the least.

Like the syntax write unit 121 of FIG. 9, the syntax write unit 161 writes the SAO flag given by the SAO flag setting unit 111 to the header portion of the coded stream for each slice. Like the syntax write unit 121, the syntax write unit 161 writes the offset or merge flag for each component, which is given by the SAO control information setting unit 114, to the header portion of the coded stream.

Unlike the syntax write unit 121, the syntax write unit 161 writes, for each LCU, the type information indicating the Y type for the brightness given by the type setting unit 112 and the type information indicating Cm type common to the color difference components to the header portion of the coded stream.

[Sample Adaptive Offset Filter Processing of Encoding Side]

Subsequently, the sample adaptive offset filter processing performed by the sample adaptive offset filter 41 of FIG. 13 will be explained with reference to the flowchart of FIG. 14. It should be noted that the sample adaptive offset filter processing is processing in step S23 of FIG. 2.

In step S161, the SAO flag setting unit 111 uses the deblocked pixel values to set the SAO flag indicating the ON/OFF state of the sample adaptive offset filter of each component in units of slices. The SAO flag setting unit 111 provides the SAO flag (slice_sample_adaptive_offset_flag), which has been set, to the Y type setting unit 151, the Cm type setting unit 152, and the syntax write unit 161.

In step S162, the Y type setting unit 151 and the Cm type setting unit 152 set component ID(cIdx)=0.

In step S163, the Y type setting unit 151 determines whether slice_sample_adaptive_offset_flag[0]=1 holds or not. More specifically, in step S163, the sample adaptive offset filter of Y is to be applied or not is determined.

When slice_sample_adaptive_offset_flag[0]=1 is determined to hold, and more specifically when the sample adaptive offset filter of Y is determined to be applied in step S163, the processing in step S164 is subsequently performed.

In step S164, the Y type setting unit 151 uses the deblocked pixel values to set the type (sao_type_Y) of the filter of Y in units of LCUs. The Y type setting unit 151 provides the information indicating the type of Y to the syntax write unit 161, and thereafter, the processing in step S165 is subsequently performed.

Figure 15:
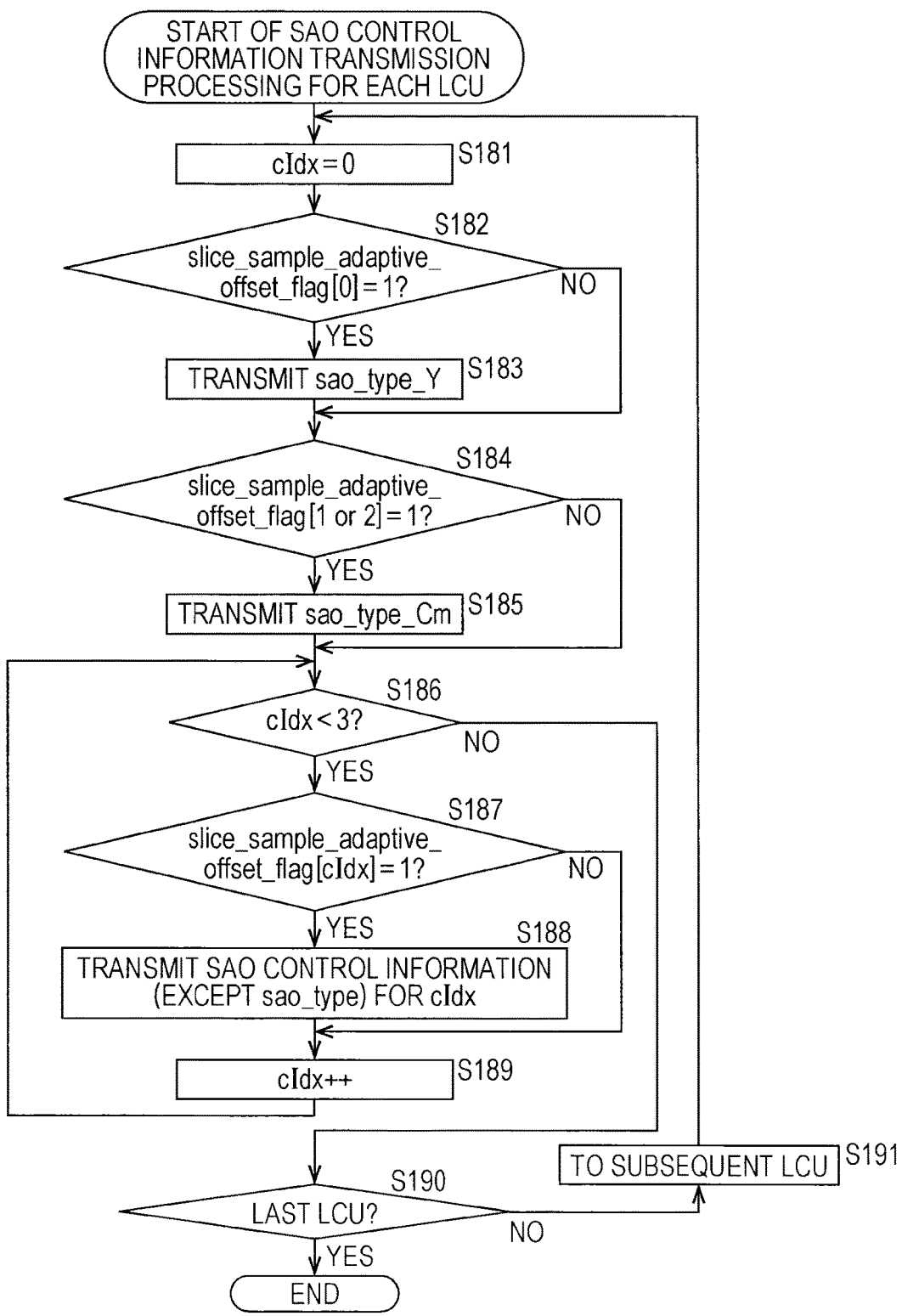
FIG. 15 is a flowchart for explaining SAO control information transmission processing.

In association with this, the syntax write unit 161 writes sao_type_Y to the syntax, and provides it to the accumulation buffer 27 and transmits it in step S183 of FIG. 15 explained later.

When slice_sample_adaptive_offset_flag[0]=0 is determined to hold in step S163, the processing in step S164 is skipped and step S165 is subsequently performed.

In step S165, the Cm type setting unit 152 determines whether slice_sample_adaptive_offset_flag[1 or 2]=1 holds or not. More specifically, in step S165, a determination is made as to whether the sample adaptive offset filter of Cr or Cb is to be applied or not.

When slice_sample_adaptive_offset_flag[1 or 2]=1is determined to hold, and more specifically, when the sample adaptive offset filter of Cm is determined to be applied in step S165, the processing in step S166 is subsequently performed.

In step S166, the Cm type setting unit 152 uses the deblocked pixel values to set the type (sao_type_Cm) of the filter common to Cb and Cr in units of LCUs. The Y type setting unit 151 provides information indicating the type of Cm to the syntax write unit 161, and thereafter, the processing in step S167 is subsequently performed.

In association with this, the syntax write unit 161 writes sao_type_Cm to the syntax, provides it to the accumulation buffer 27, and transmits it in step S185 of FIG. 15 explained later.

When slice_sample_adaptive_offset_flag[1 and 2]=0 is determined to hold in step S165, the processing in step S166 is skipped and step S167 is subsequently performed.

In S167 to S173 subsequent thereto, basically the same processing as step S115 to S121 of FIG. 10 is performed, therefore, the explanation thereabout is omitted because it is simply a repetition.

[SAO Control Information Transmission Processing for Each LCU]

Subsequently, SAO control information transmission processing for each LCU with the conventional example shown in FIG. 8 will be explained with reference to the flowchart of FIG. 15. This processing corresponds to the sample adaptive offset filter processing explained with reference to FIG. 14, and is, for example, processing performed in the encoding processing of step S26 of FIG. 2.

In step S181, the syntax write unit 161 sets component ID(cIdx)=0.

In step S182, the syntax write unit 161 determines whether slice_sample_adaptive_offset_flag[0]=1 holds or not. More specifically, a determination is made as to whether the sample adaptive offset filter of Y is applied or not.

When slice_sample_adaptive_offset_flag[0]=1 is determined to hold in step S182, the processing in step S183 is subsequently performed. In step S183, the syntax write unit 161 writes information indicating the type (sao_type_Y) of the filter provided in step S164 of FIG. 14 to the syntax, provides the information to the accumulation buffer 27, and transmits the information.

When slice_sample_adaptive_offset_flag[0]=0 is determined to hold in step S182, the processing in step S183 is skipped and step S184 is subsequently performed.

In step S184, the syntax write unit 161 determines whether slice_sample_adaptive_offset_flag[1 or 2]=1 holds or not. More specifically, a determination is made as to whether the sample adaptive offset filter of Cm is applied or not.

When slice_sample_adaptive_offset_flag[1 or 2]=1 is determined to hold in step S184, the processing in step S185 is subsequently performed. In step S185, the syntax write unit 161 writes information indicating the type (sao_type_Cm) of the filter provided in step S166 of FIG. 14 to the syntax, provides the information to the accumulation buffer 27, and transmits the information.

When slice_sample_adaptive_offset_flag[1 and 2]=0 is determined to hold in step S184, step S185 is skipped, and the processing in step S186 is subsequently performed.

Figure 14:
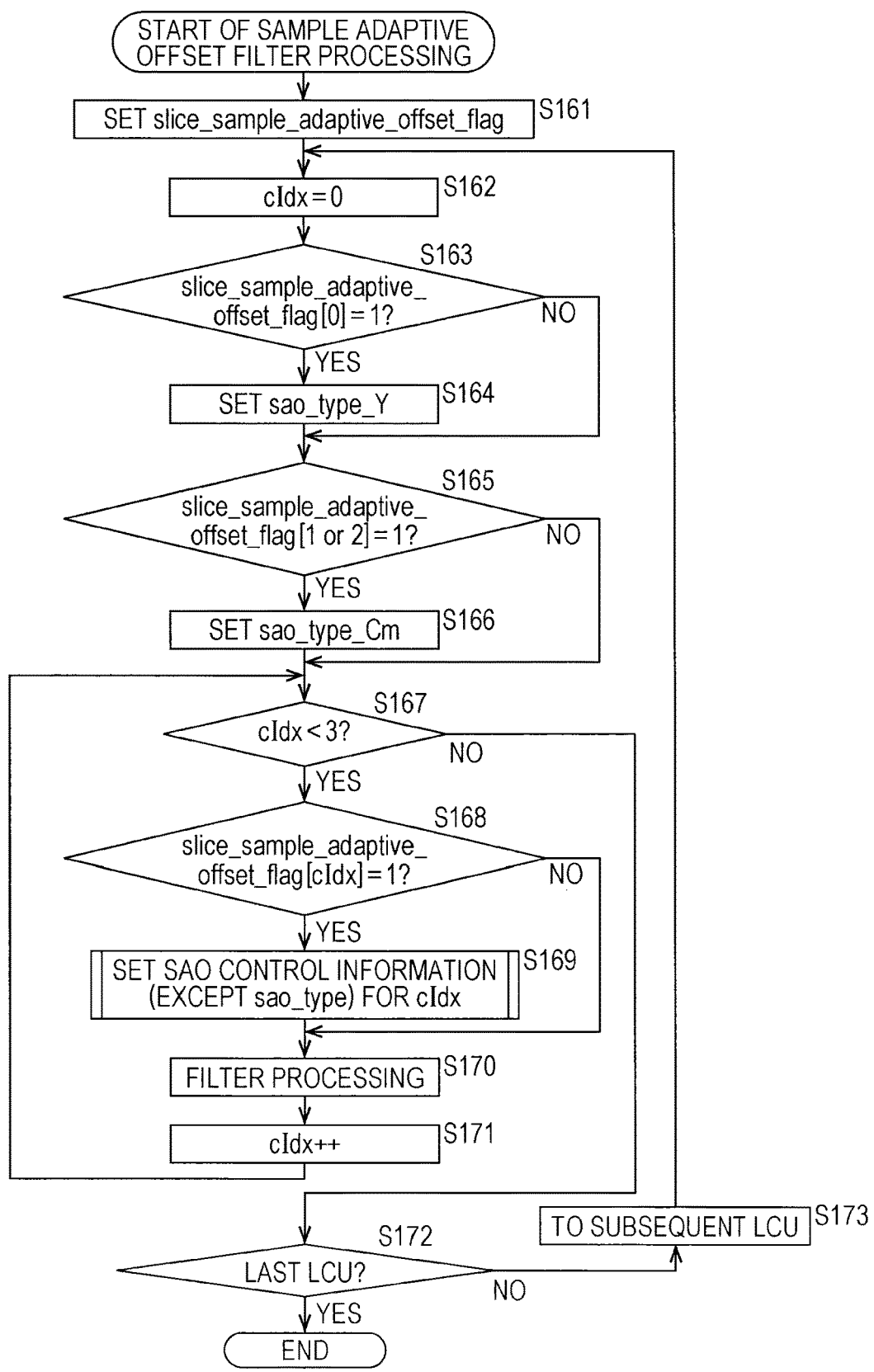
FIG. 14 is a flowchart for explaining sample adaptive offset filter processing.

In S186 to S191 subsequent thereto, basically the same processing as step S144 to S149 of FIG. 14 is performed, therefore, the explanation thereabout is omitted because it is simply a repetition.

As described above, the type information about the filter can also be made common only between the components of the color differences of Cb and Cr, and in this case, the amount of codes can also be reduced.

<4. Fifth Embodiment>

[Example of Configuration of Sample Adaptive Offset Filter]

Figure 16:
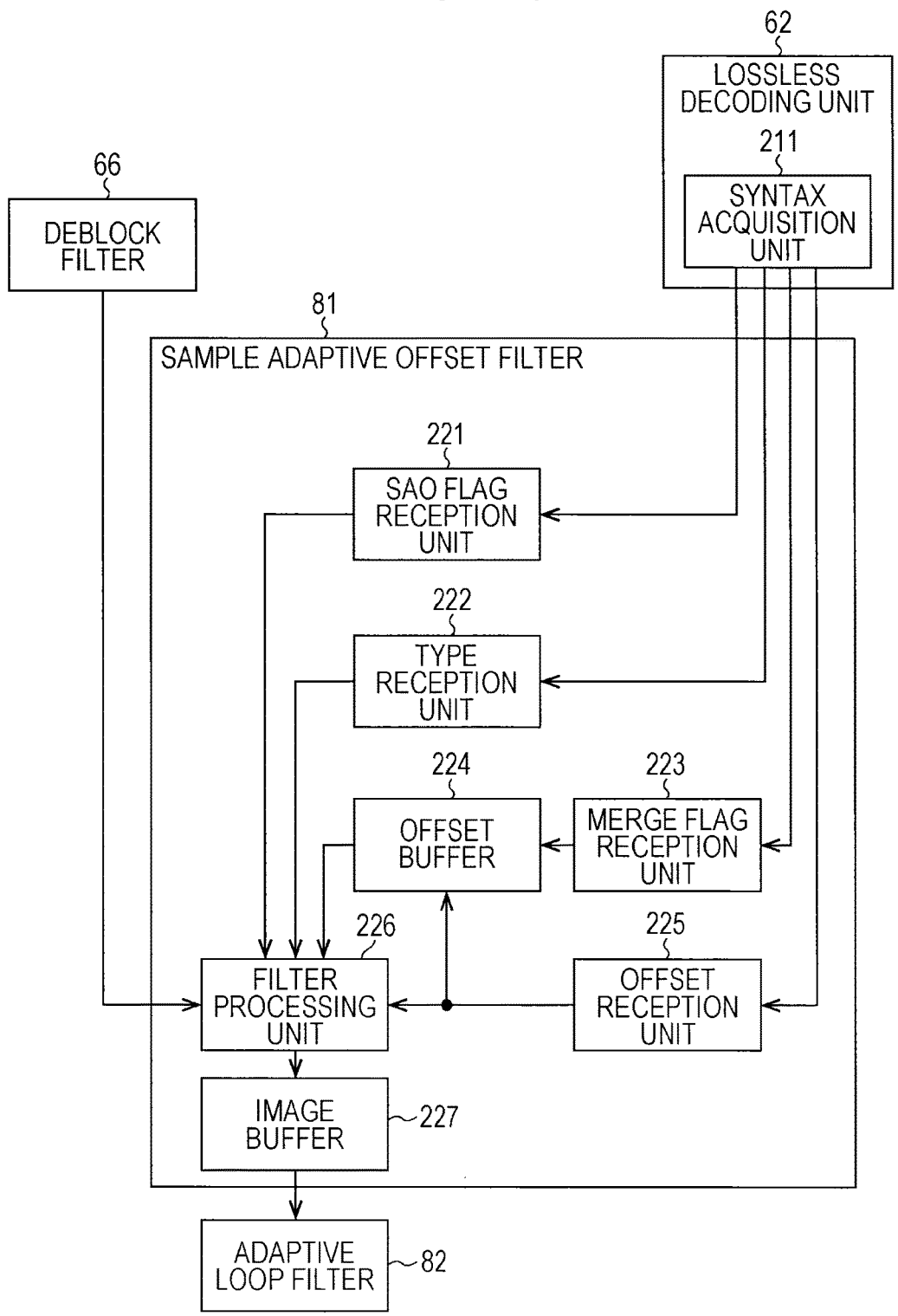
FIG. 16 is a block diagram illustrating an example of configuration of a sample adaptive offset filter to which the present disclosure is applied.

FIG. 16 is a block diagram illustrating an example of configuration of a lossless decoding unit and a sample adaptive offset filter in an image decoding device of FIG. 3. An example of configuration as shown in FIG. 16 corresponds to the sample adaptive offset filter and the lossless coding unit of FIG. 9.

In the example of FIG. 16, the lossless decoding unit 62 includes at least a syntax acquisition unit 211.

The sample adaptive offset filter 81 includes an SAO flag reception unit 221, a type reception unit 222, a merge flag reception unit 223, an offset buffer 224, an offset reception unit 225, a filter processing unit 226, and an image buffer 227.

The syntax acquisition unit 211 obtains the header portion of the coded stream from the syntax. Then, the syntax acquisition unit 211 provides the adaptive offset parameter in the obtained syntax to the SAO flag reception unit 221, the type reception unit 222, the merge flag reception unit 223, and the offset reception unit 225.

More specifically, the syntax acquisition unit 211 provides an SAO flag (slice_sample_adaptive_offset_flag) which is one of the adaptive offset parameters to the SAO flag reception unit 221. The syntax acquisition unit 211 provides the type information of the filter which is one of the adaptive offset parameters to the type reception unit 222. The syntax acquisition unit 211 provides the merge flag (sao_merge_left_flag or sao_merge_top_flag) which is one of the adaptive offset parameters to the merge flag reception unit 223. The syntax acquisition unit 211 provides the offset (coefficient) which is one of the adaptive offset parameters to the offset reception unit 225.

It should be noted that the SAO flag of the adaptive offset parameters is set and transmitted for each slice. The type information, the merge flag, the offset, and the like in the adaptive offset parameters are set and transmitted for each LCU. The type information is transmitted, for example, in unit of PPS (Picture Parameter Set) or slice.

The SAO flag reception unit 221 provides the filter processing unit 226 with the SAO flag indicating the ON/OFF state for each component provided from the syntax acquisition unit 211. The type reception unit 222 provides the filter processing unit 226 with the filter type information which is common to the components provided from the syntax acquisition unit 211. The merge flag reception unit 223 provides the offset buffer 224 with the merge flag provided from the syntax acquisition unit 211. The offset reception unit 225 provides the offset obtained from the syntax acquisition unit 211 to the offset buffer 224 and the filter processing unit 226.

The offset buffer 224 holds the offset of an LCU adjacent to the current LCU. The offset buffer 224 may store at least the left LCU of the current LCU and the offset of the upper LCU. When the offset buffer 224 receives the merge flag of the current LCU from the merge flag reception unit 223, the offset buffer 224 reads the offset stored in association with the adjacent LCU (left or upper side) indicated by the merge flag, and provides it to the filter processing unit 226. Then, the offset buffer 224 stores the read offset in association with the current LCU. When the offset buffer 224 receives the offset of the current LCU from the offset reception unit 225, the offset buffer 224 stores the received offset in association with the current LCU.

The filter processing unit 226 refers to information given by the SAO flag reception unit 221, the type reception unit 222, the offset buffer 224, and the offset reception unit 225, and performs filter processing on the deblocked pixel values from the deblock filter 66.

More specifically, the filter processing unit 226 refers to the SAO flag given by the SAO flag reception unit 221, the filter type which is made common between components and which is provided from the type reception unit 222, and the offset given by the offset buffer 224 or the offset reception unit 225.

The filter processing unit 226 provides the pixels, which have been subjected to the offset processing, to the image buffer 227.

The image buffer 227 is configured basically in the same way as the image buffer 117 of FIG. 10. More specifically, the image buffer 227 temporarily stores the pixel values having been subjected to the offset processing by the filter processing unit 226, and provides the pixel values to the adaptive loop filter 82 with predetermined timing.

[Sample Adaptive Offset Filter Processing of Decoding Side]

Subsequently, the sample adaptive offset filter processing performed by the sample adaptive offset filter 81 of FIG. 16 will be explained with reference to the flowchart of FIG. 17. It should be noted that the sample adaptive offset filter processing is processing in step S59 of FIG. 4.

Figure 4:
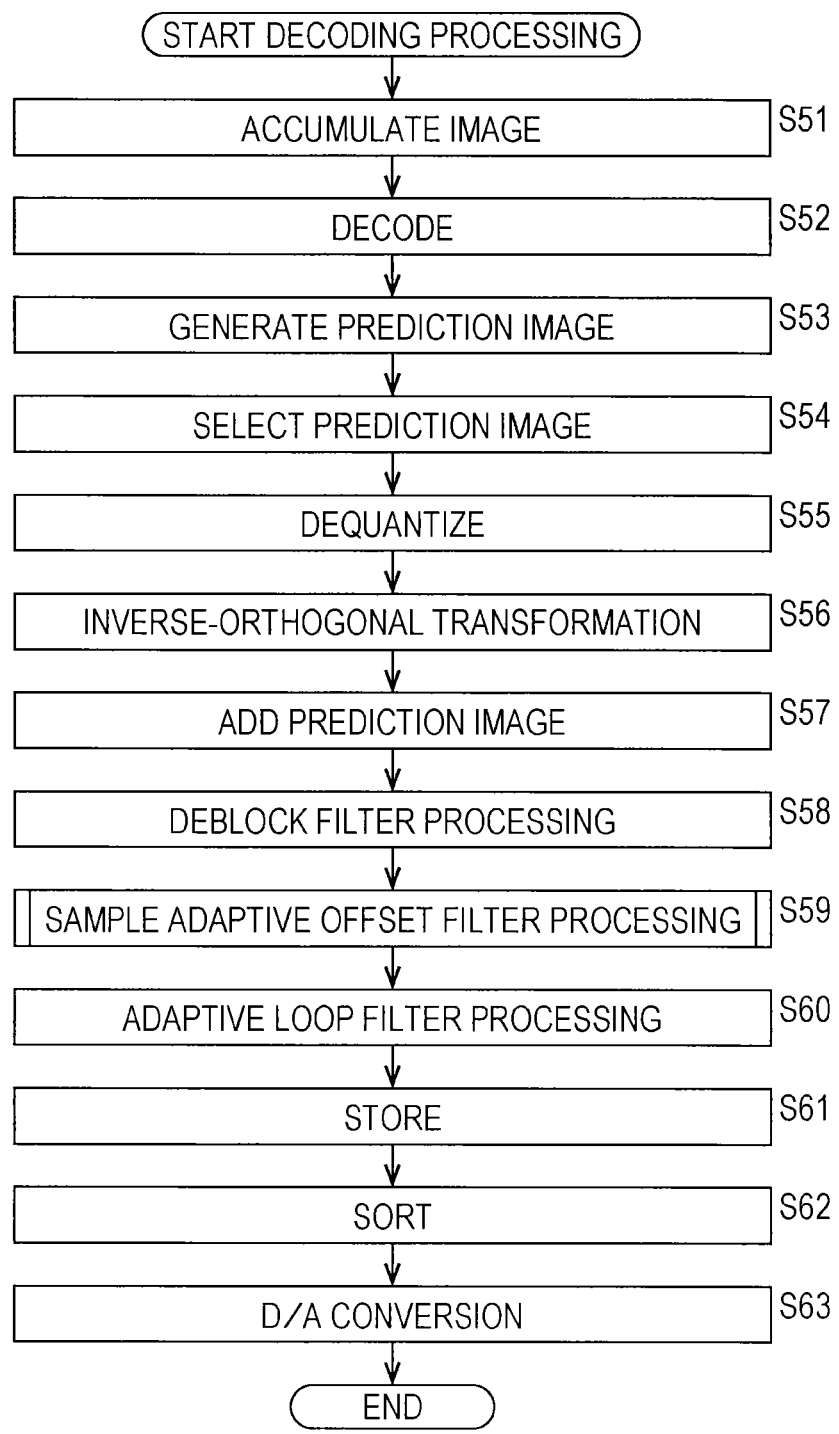
FIG. 4 is a flowchart for explaining an example of flow of decoding processing.

When the coded stream is decoded in step S52 of FIG. 4, the syntax acquisition unit 211 reads the syntax from the header portion of the coded stream, and among them, the syntax acquisition unit 211 provides the adaptive offset parameter to each unit of the sample adaptive offset filter 81.

In step S211, the SAO flag reception unit 221 receives the SAO flag of the adaptive offset parameter (slice_sample_adaptive_offset_flag) provided from the syntax acquisition unit 211. The SAO flag reception unit 221 provides the received SAO flag to the filter processing unit 226.

In step S212, the filter processing unit 226 sets component ID(cIdx)=0.

In step S213, the filter processing unit 226 determines whether slice_sample_adaptive_offset_flag[0 or 1 or 2]=1 or not. More specifically, in step S213, a determination is made as to whether the sample adaptive offset filter of at least one of Y, Cb, Cr is applied or not.

When slice_sample_adaptive_offset_flag[0 or 1 or 2]=1 is determined to hold in step S213, and more specifically, when the sample adaptive offset filter of at least one of Y, Cb, Cr is determined to be applied, the processing in step S214 is subsequently performed.

In step S214, the filter processing unit 226 receives the filter type information (sao_type), which is made common between the components, given by the syntax acquisition unit 211 via the type reception unit 222.

When slice_sample_adaptive_offset_flag[0 and 1 and 2]=0 is determined to hold, and more specifically, when the sample adaptive offset filters of all of Y, Cb, Cr are determined not to be applied in step S213, the processing in step S214 is skipped and step S215 is subsequently performed.

In step S215, the filter processing unit 226 determines whether cIdx<3 holds or not. When cIdx<3 is determined to hold in step S215, the processing in step S216 is subsequently performed.

In step S216, the filter processing unit 226 determines whether slice_sample_adaptive_offset_flag[cIdx]=1 holds or not.

When slice_sample_adaptive_offset_flag[cIdx]=1 is determined to hold (more specifically, the sample adaptive offset filter is performed on cIdx) in step S216, the processing in step S217 is subsequently performed.

In step S217, the filter processing unit 226 receives the SAO control information for cIdx (=0). This SAO control information reception processing will be explained later with reference to FIG. 18, and with this processing, the merge flag or the offset is received, and the offset which is read with the received merge flag or the received offset is provided to the filter processing unit 226.

After step S217, the processing in step S218 is subsequently performed. When slice_sample_adaptive_offset_flag[cIdx]=0 is determined to hold (more specifically, the sample adaptive offset filter for cIdx is not performed) in step S216, the processing in step S217 is skipped and step S218 is subsequently performed.

In step S218, the filter processing unit 226 performs the adaptive filter processing on the pixels having been subjected to the deblock processing given by the deblock filter 66. At this occasion, the adaptive filter processing is performed on the basis of the type of the filter which has been received in step S214, the SAO flag corresponding to cIdx received in step S211, and further the offset having been obtained in step S217.

The filter processing unit 226 provides the pixel values having been subjected to the offset processing to the image buffer 227. The image buffer 227 temporarily stores the pixel values having been subjected to the offset processing by the filter processing unit 226, and provides the pixel values to the adaptive loop filter 42 with predetermined timing.

In step S219, the filter processing unit 226 performs cIdx++ (more specifically, cIdx=1), and the processing in step S215 is performed back again. When cIdx<3 is determined not to hold in step S215, the processing in step S220 is subsequently performed.

In step S220, the filter processing unit 226 determines whether the current LCU which is currently being processed is the last LCU or not. When the current LCU which is currently being processed is determined not to be the last LCU in step S220, the processing in step S221 is subsequently performed. In step S221, the current LCU is changed to a subsequent LCU, and the processing in step S212 is performed back again.

When the current LCU which is currently being processed is determined to be the last LCU in step S220, the sample adaptive offset filter processing is terminated.

[SAO Control Information Setting Processing]

Subsequently, the SAO control information reception processing in step S217 of FIG. 17 will be explained with reference to the flowchart of FIG. 18.

In step S231, the merge flag reception unit 223 receives the merge flag. In step S232, the merge flag reception unit 223 determines whether sao_merge_left_flag is one or not. When sao_merge_left_flag is determined to be one in step S232, the processing in step S233 is subsequently performed.

In step S233, the merge flag reception unit 223 controls the offset buffer 224, and reads the offset of the left LCU, and the offset buffer 224 provides the offset of the left LCU which has been read to the filter processing unit 226.

On the other hand, when sao_merge_left_flag is determined to be zero in step S232, the processing in step S234 is subsequently performed. In step S234, the merge flag reception unit 223 determines whether sao_merge_top_flag is one or not. When sao_merge_top_flag is determined to be one in step S234, the processing in step S235 is subsequently performed.

In step S235, the merge flag reception unit 223 controls the offset buffer 224, and reads the offset of the upper LCU, and the offset buffer 224 provides the offset of the upper LCU which has been read to the filter processing unit 226.

When sao_merge_top_flag is determined to be zero in step S234, the processing in step S236 is subsequently performed. In step S236, the offset reception unit 225 receives the offset from the syntax acquisition unit 211, and provides the offset to the filter processing unit 226. The offset reception unit 225 also provides the received offset to the offset buffer 224.

In step S237, the offset buffer 224 writes the offset read in step S233 or S235 or the offset from the offset reception unit 225 to the buffer as the offset of the current LCU.

As described above, the information indicating the type of the filter is sent upon being made common between the components of Y, Cb, Cr, and more specifically, the information indicating the type of the filter is sent upon being made common between the components of the brightness and the color difference, and therefore, only the coefficients (offsets) are transmitted independently between the components, so that the amount of encoding can be reduced.

[Another Example of Configuration of Sample Adaptive Offset Filter]

Figure 19:
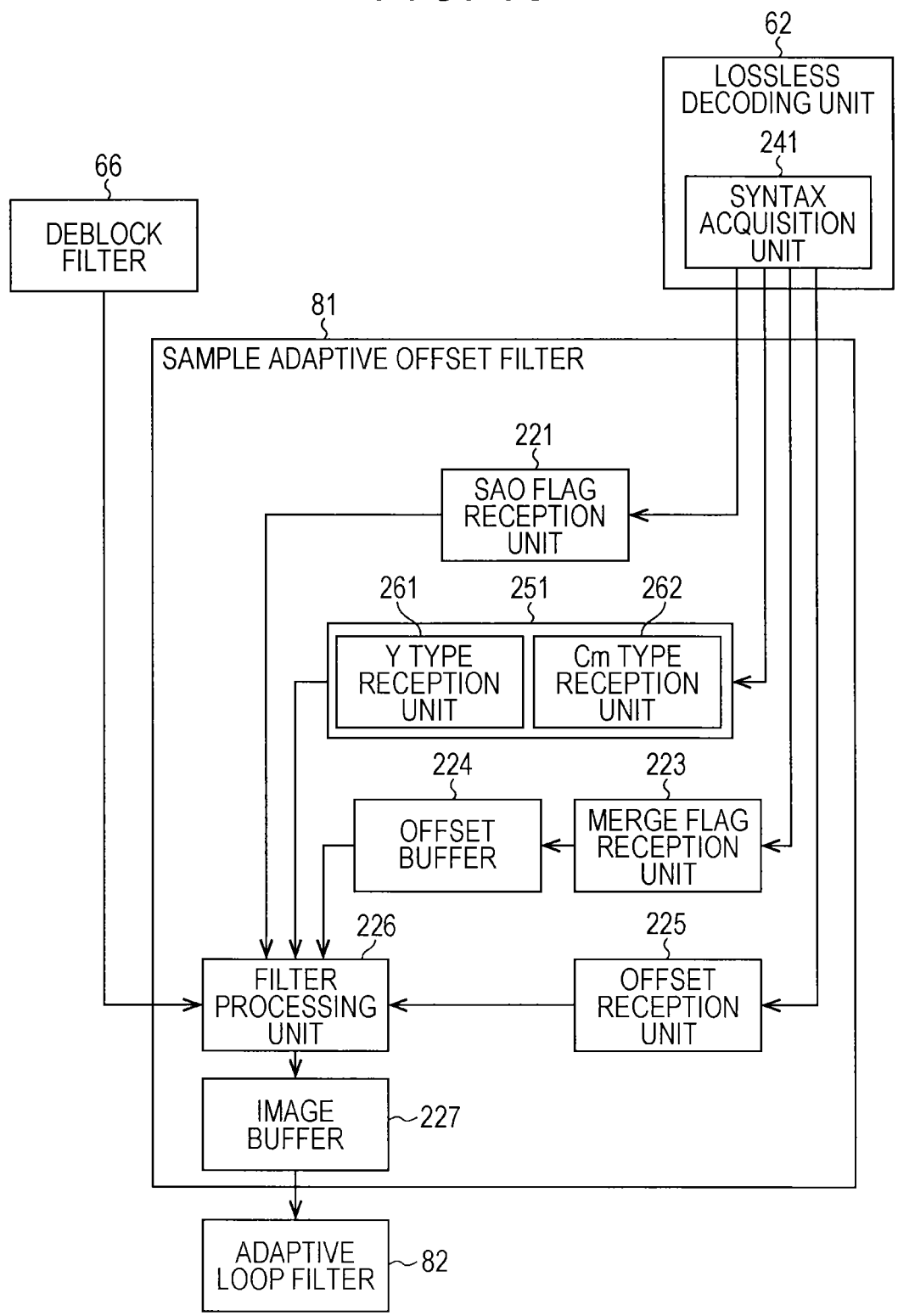
FIG. 19 is a block diagram illustrating another example of configuration of a sample adaptive offset filter to which the present disclosure is applied.

FIG. 19 is a block diagram illustrating an example of configuration of a lossless decoding unit and a sample adaptive offset filter in the image decoding device of FIG. 3. The example of configuration as shown in FIG. 19 corresponds to the sample adaptive offset filter and the lossless coding unit of FIG. 13.

In the example of FIG. 19, the lossless decoding unit 62 is different from the lossless decoding unit 62 of FIG. 16 in that the syntax acquisition unit 211 and the syntax acquisition unit 241 are switched.

The sample adaptive offset filter 81 is the same as the sample adaptive offset filter 81 of FIG. 16 in that the sample adaptive offset filter 81 includes an SAO flag reception unit 221, a merge flag reception unit 223, an offset buffer 224, an offset reception unit 225, a filter processing unit 226, and an image buffer 227.

The sample adaptive offset filter 81 is different from the sample adaptive offset filter 81 of FIG. 16 in that the type reception unit 222 is replaced with the type reception unit 251 made of the Y type reception unit 261 and the Cm type reception unit 262.

More specifically, in the example of FIG. 16, the type information about the filter which is made common between Y, Cb, Cr is sent as one of the adaptive offset parameters. In contrast, in the example of FIG. 19, the type information about the filter of Y and the type information about the filter which is made common between Cb and Cr is sent.

Like the syntax acquisition unit 211 of FIG. 16, the syntax acquisition unit 241 obtains the SAO flag (slice_sample_adaptive_offset_flag), and provides it to the SAO flag reception unit 221. Like the syntax acquisition unit 211 of FIG. 16, the syntax acquisition unit 241 obtains the merge flag (sao_merge_left_flag or sao_merge_top_flag), and provides it to the merge flag reception unit 223. Like the syntax acquisition unit 211 of FIG. 16, the syntax acquisition unit 241 obtains the offset, and provides it to the offset reception unit 225.

On the other hand, unlike the syntax acquisition unit 211 of FIG. 16, the syntax acquisition unit 241 obtains the type information about the filter, which is made common to Cb and Cr, and the type information about the filter of Y, and provides them to the Y type reception unit 261 and the Cm type reception unit 262.

The Y type reception unit 261 provides the filter type information about Y provided from the syntax acquisition unit 211 to the filter processing unit 226. The Cm type reception unit 262 provides the filter type information of Cm, which is made common to Cb and Cr provided from the syntax acquisition unit 211, to the filter processing unit 226.

[Sample Adaptive Offset Filter Processing of Decoding Side]

Figure 20:
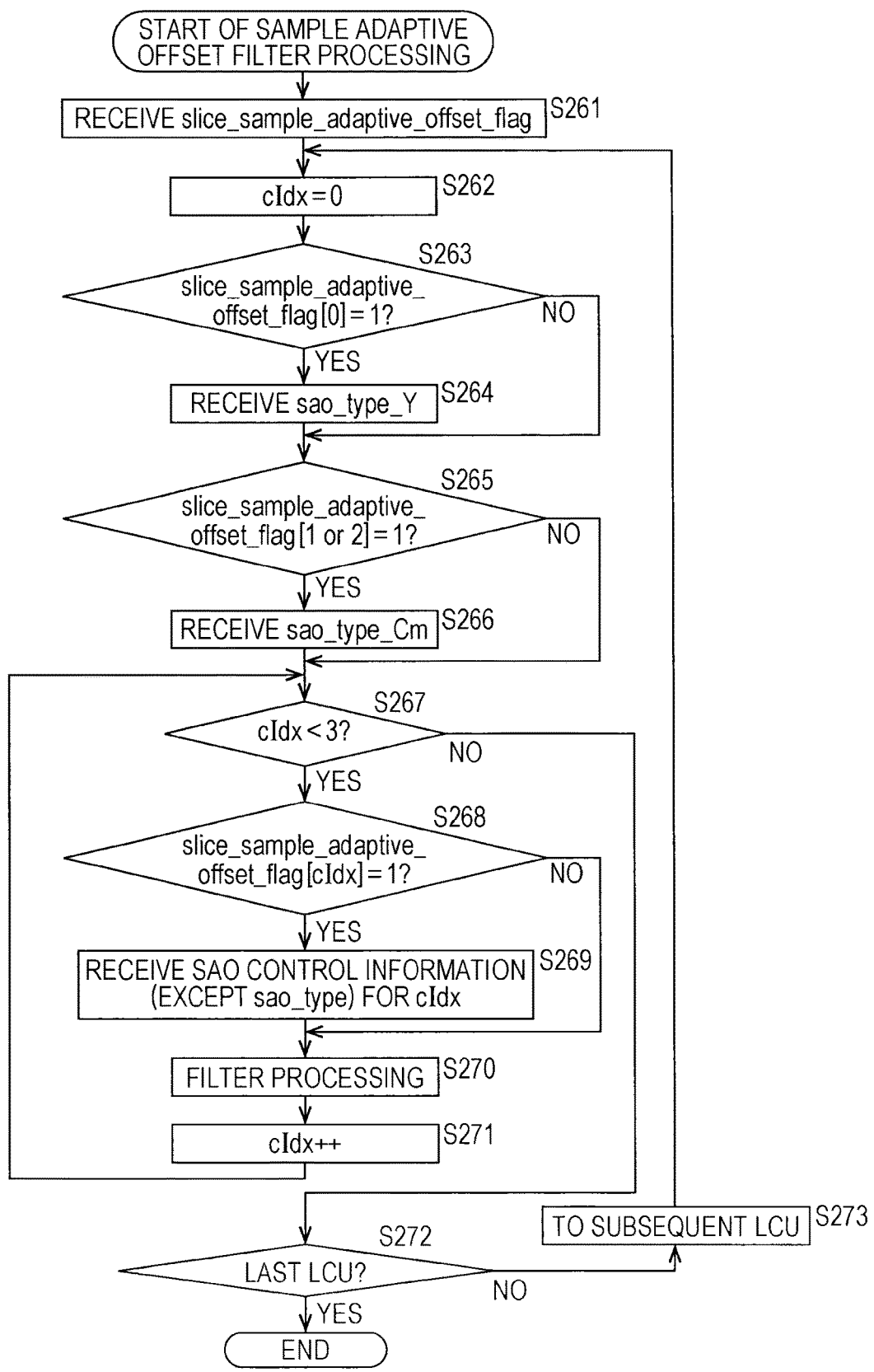
FIG. 20 is a flowchart for explaining sample adaptive offset filter processing.

Subsequently, the sample adaptive offset filter processing performed by the sample adaptive offset filter 81 of FIG. 19 will be explained with reference to the flowchart of FIG. 20. It should be noted that this sample adaptive offset filter processing is processing in step S59 of FIG. 4.

In step S261, the SAO flag reception unit 221 receives the SAO flag (slice_sample_adaptive_offset_flag) of the adaptive offset parameter provided from the syntax acquisition unit 211. The SAO flag reception unit 221 provides the received SAO flag to the filter processing unit 226.

In step S262, the filter processing unit 226 sets component ID(cIdx)=0. In step S263, the filter processing unit 226 determines whether slice_sample_adaptive_offset_flag[0]=1 holds or not. More specifically, in step S263, a determination is made as to whether the sample adaptive offset filter of Y is applied or not.

When slice_sample_adaptive_offset_flag[0]=1 is determined to hold, and more specifically, the sample adaptive offset filter of Y is determined to be applied in step S263, the processing in step S264 is subsequently performed.

In step S264, the filter processing unit 226 receives the filter type information of Y (sao_type_Y) given by the syntax acquisition unit 241 via the Y type reception unit 261.

On the other hand, in step S263, when slice_sample_adaptive_offset_flag[0]=0 is determined to hold, and more specifically, the sample adaptive offset filter of Y is determined not to be applied, the processing in step S264 is skipped and step S265 is subsequently performed.

In step S265, the filter processing unit 226 determines whether slice_sample_adaptive_offset_flag[1 or 2]=1 holds or not. In step S265, a determination is made as to whether the sample adaptive offset filter of Cb or Cr is applied or not.

When slice_sample_adaptive_offset_flag[1or 2]=1 is determined to hold, and more specifically, when the sample adaptive offset filter of Cb or Cr is determined to be applied in step S265, the processing in step S266 is subsequently performed.

In step S266, the filter processing unit 226 receives the filter type information of Cm (sao_type_Cm) given by the syntax acquisition unit 241 via the Cm type reception unit 262.

When slice_sample_adaptive_offset_flag[1 and 2]=0 is determined to hold, and more specifically, when the sample adaptive offset filter of Cb and Cr is determined not to be applied in step S265, the processing in step S266 is skipped and step S267 is subsequently performed.

Figure 17:
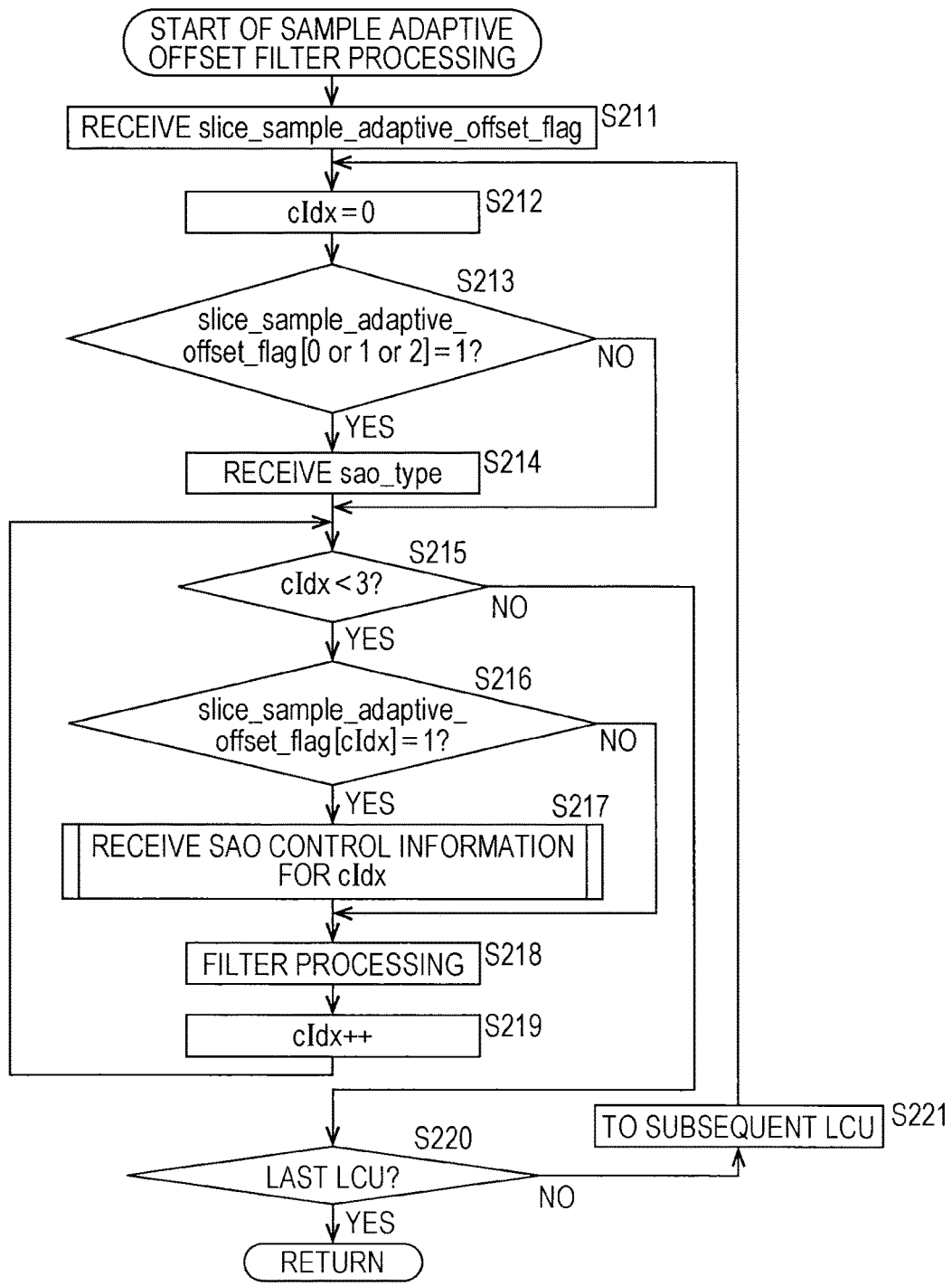
FIG. 17 is a flowchart for explaining sample adaptive offset filter processing.
Figure 18:
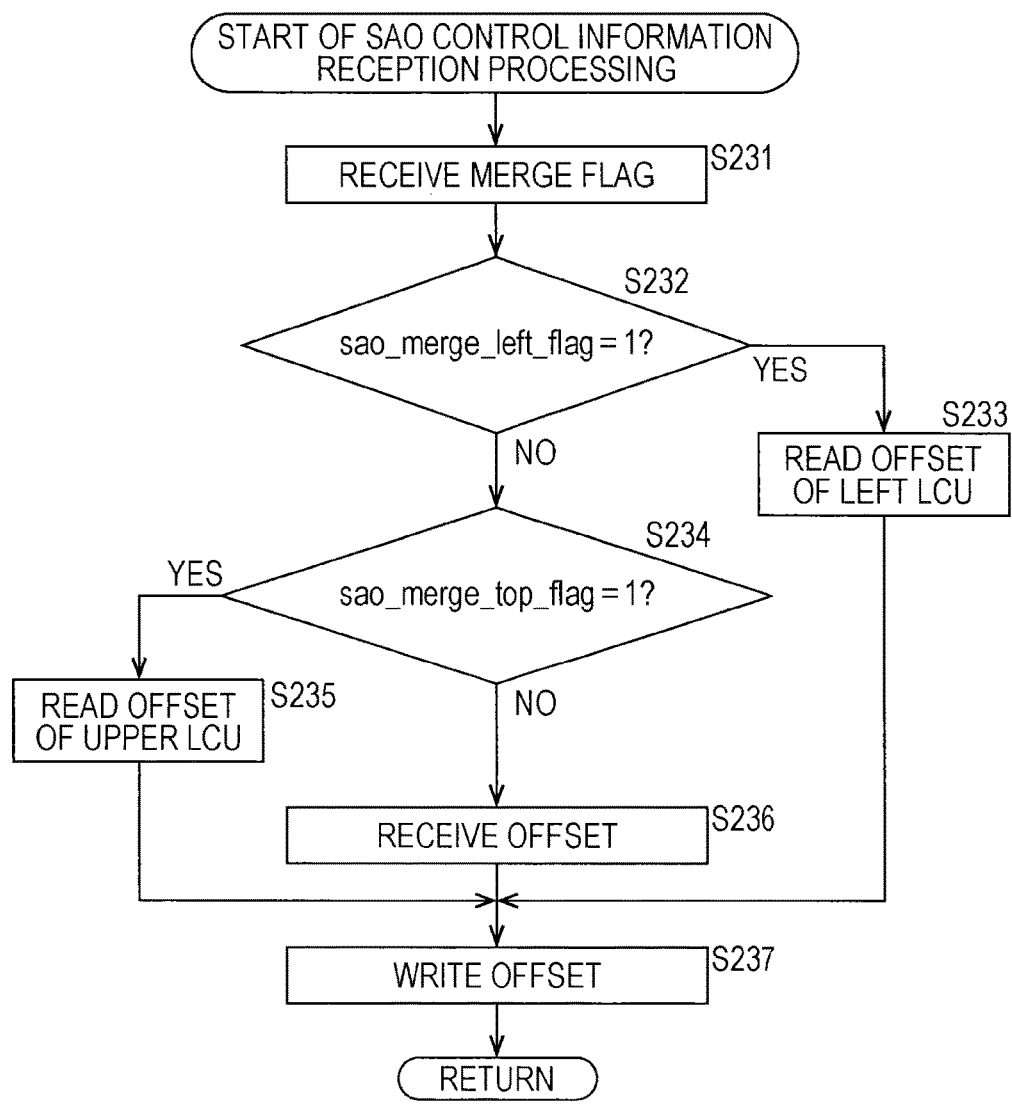
FIG. 18 is a flowchart for explaining SAO control information reception processing.

The processing in S267 to S273 subsequent thereto is basically the same processing as steps S215 to S221 of FIG. 17, and therefore, the explanation thereabout is omitted because it is simply a repetition.

As described above, the type information about the filter can be made common only between the components of color differences of Cb and Cr. In this case, the amount of codes can be reduced.

In the above explanation, the example in which the type is made common between all the components of the brightness and the chromaticity and the example in which the type is made common between the components of the color differences have been explained. Alternatively, both of the modes employing the above may be provided, and the modes may be selectively used.

More specifically, a mode in which the type is made common between all the components of the brightness and the chromaticity is defined as an all-common mode, and a mode in which the type is made common only between the components of the color difference is defined as a color difference common mode, and these two types of modes may be provided. In this case, the mode identification information for identifying which of the modes is used by the encoding side may be sent to the decoding side.

In this case, the decoding side receives the mode identification information which has been transmitted, sets the mode using the received mode identification information, and performs the sample adaptive offset filter.

As described above, the type information about the filter is made common between the components of the brightness signal and the color difference signal and is transmitted. Therefore, the amount of codes can be reduced, and the efficiency of encoding can be increased.

In the above explanation, the color format is 4:2:0. Alternatively, the present technique can be applied to any other color formats such as 4:2:2 and 4:4:4.

For example, when choma_format_idc is used: in a case of 4:2:0 (choma_format_idc==1), the SAO type may be made common between all of the components; in a case of 4:4:4 (choma_format_idc==3), the SAO type may not be made common; and in a case of 4:2:2 (choma_forma-t_idc==2), the SAO type may be made common only between Cb/Cr. More specifically, according to the color format, the all-common mode or the color difference common mode explained above may be determined.

In the above explanation, an example in which the brightness and the color difference are color space of Y, Cb, Cr has been explained. Alternatively, the present technique can also be applied to another color space, e.g., where the brightness and color difference are Y, U, V.

In the above explanation, the HEVC method is used as the basis of the encoding method. However, the present disclosure is not limited thereto. Other encoding methods/decoding methods including at least the sample adaptive offset filter as in-loop filter may be applied.

Further, for example, the present disclosure can be applied to an image coding device and an image decoding device which are used for receiving image information (bit stream) compressed by orthogonal transformation such as discrete cosine transform and motion compensation similarly to HEVC method and the like, via network media such as satellite broadcasting, cable television, the Internet, and cellular phone. The present disclosure can be applied to an image coding device and an image decoding device used for processing on recording media such as optical, magnetic disks, and flash memories.

<5. Third Embodiment>

[Application to Multi-view Image Point Coding/Multi-viewpoint Image Decoding]

Figure 21:
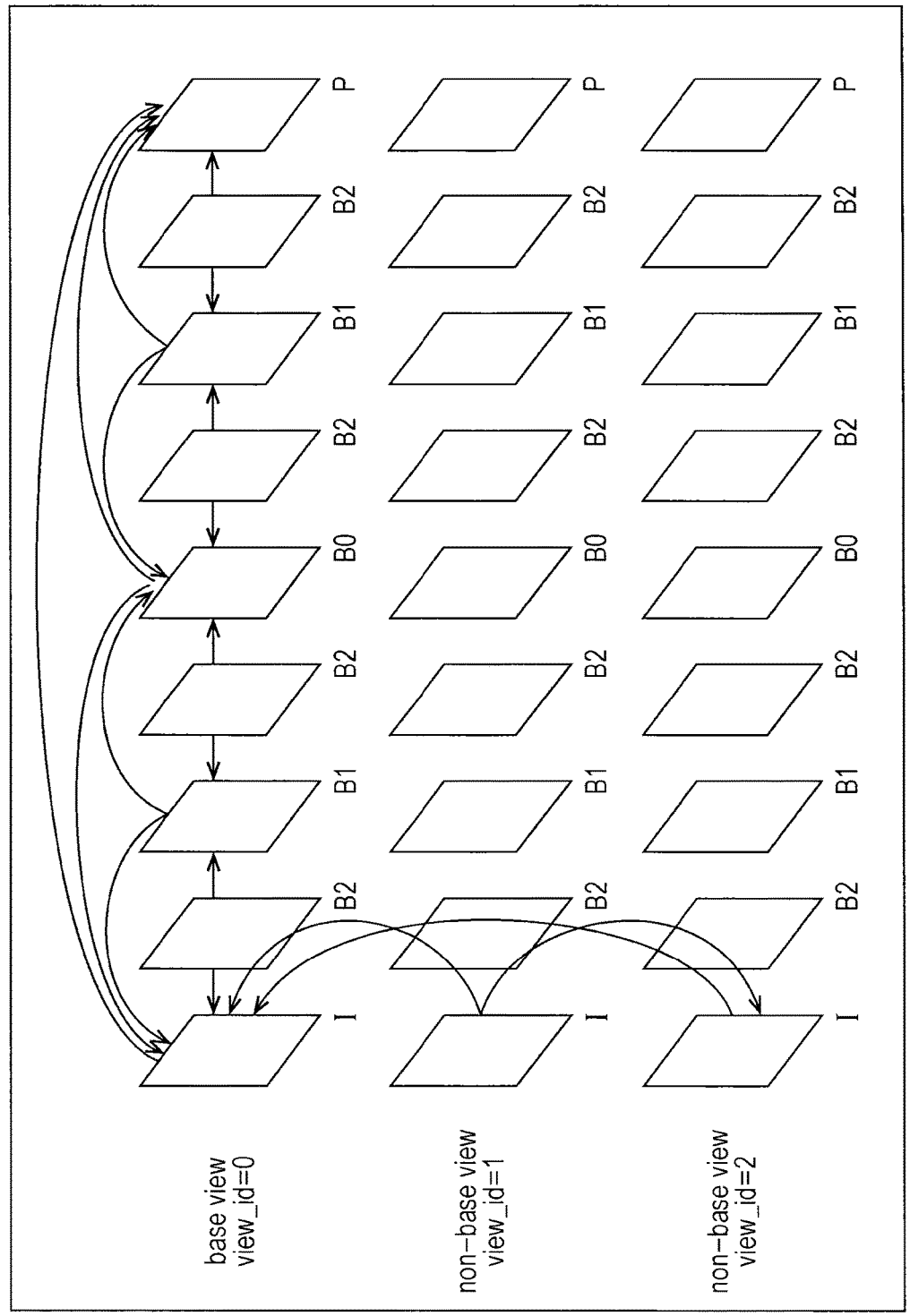
FIG. 21 is a figure illustrating an example of a multi-viewpoint image encoding method.

The above series of processing can be applied to multi-viewpoint image coding/multi-viewpoint image decoding. FIG. 21 illustrates an example of multi-viewpoint image coding method.

As illustrated in FIG. 21, a multi-viewpoint image includes images for multiple view points, and images of predetermined viewpoint of the multiple viewpoints are designated as base view images. Images of viewpoints other than the base view image are treated as non-base view images.

In the case where the multi-viewpoint image encoding as shown in FIG. 21 is performed, the sample adaptive offset filter parameters (the SAO flag, the type information of the filter, the offset, the mode identification information, and the like explained above) can be set in each view (the same view). In each view (a different view), the sample adaptive offset filter parameters which are set in another view may be shared.

In this case, the sample adaptive offset filter parameters which are set in the base view are used in at least a single non-base view. Alternatively, for example, the sample adaptive offset filter parameters which are set in a non-base view (view_id=i) are used in at least one of the base view and the non-base view (view_id=j).

Therefore, the amount of codes can be reduced.

[Multi-viewpoint Image Coding Device]

Figure 22:
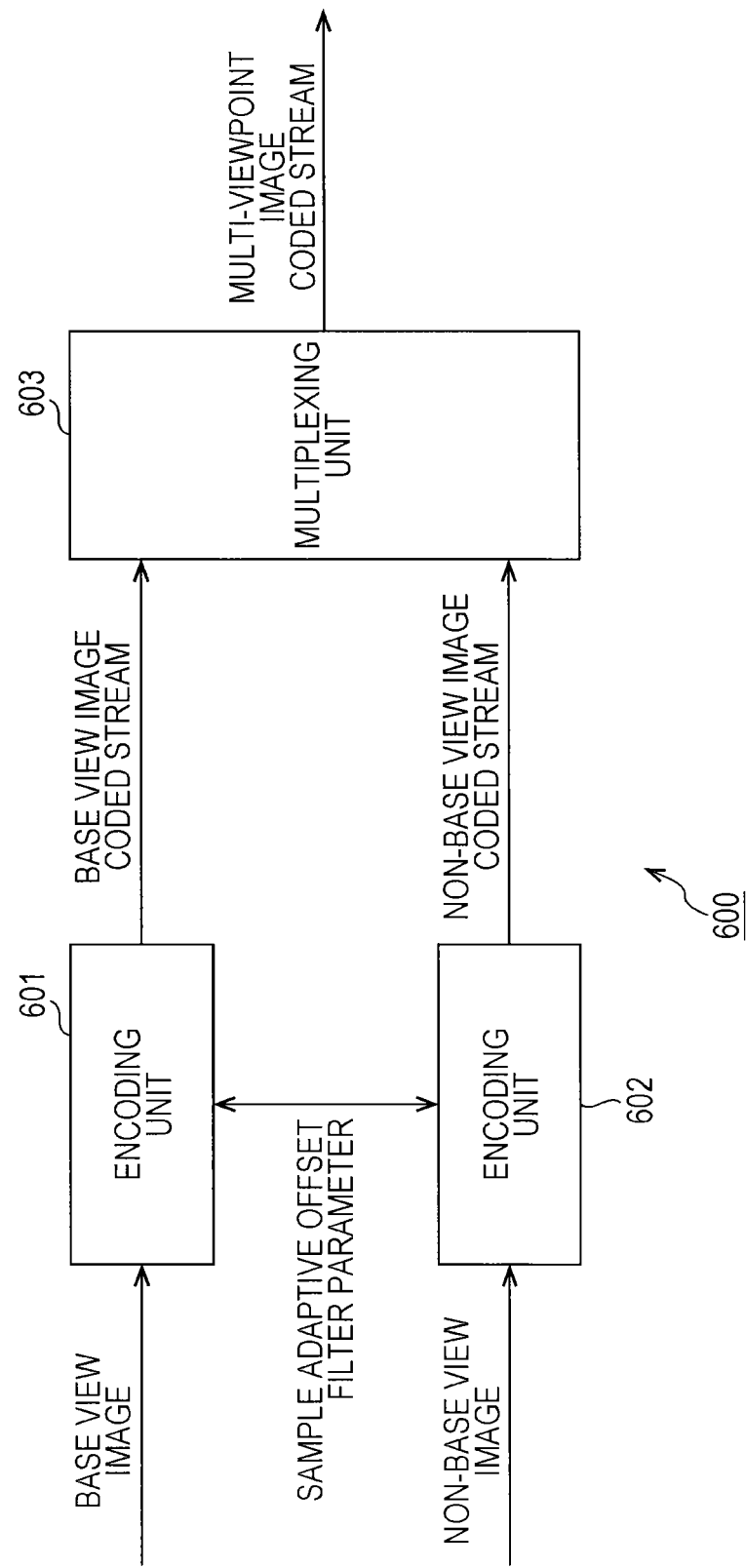
FIG. 22 is a figure illustrating a main example of configuration of a multi-viewpoint image coding device to which the present disclosure is applied.

FIG. 22 is a figure illustrating a multi-viewpoint image coding device performing the multi-viewpoint image coding explained above. As illustrated in FIG. 22, a multi-viewpoint image coding device 600 includes a encoding unit 601, a encoding unit 602, and a multiplexing unit 603.

The encoding unit 601 encodes base view images, and generates a base view image coded stream. The encoding unit 602 encodes non-base view images, and generates a non-base view image coded stream. The multiplexing unit 603 multiplexes the base view image coded stream generated by the encoding unit 601 and the non-base view image coded stream generated by the encoding unit 602, and generates a multi-viewpoint image coded stream.

The image coding device 11 (FIG. 1) can be applied to the encoding unit 601 and encoding unit 602 of the multi-viewpoint image coding device 600. In this case, the multi-viewpoint image coding device 600 sets and transmits the sample adaptive offset filter parameters which are set by the encoding unit 601 and the sample adaptive offset filter parameters which are set by the encoding unit 602.

The sample adaptive offset filter parameters which are set by the encoding unit 601 as described above may be set and transmitted so that the sample adaptive offset filter parameters are may be shared and used by the encoding unit 601 and the encoding unit 602. On the contrary, the sample adaptive offset filter parameters which are collectively set by the encoding unit 602 may be set and transmitted so that the sample adaptive offset filter parameters are shared and used by the encoding unit 601 and the encoding unit 602.

[Multi-viewpoint Image Decoding Device]

Figure 23:
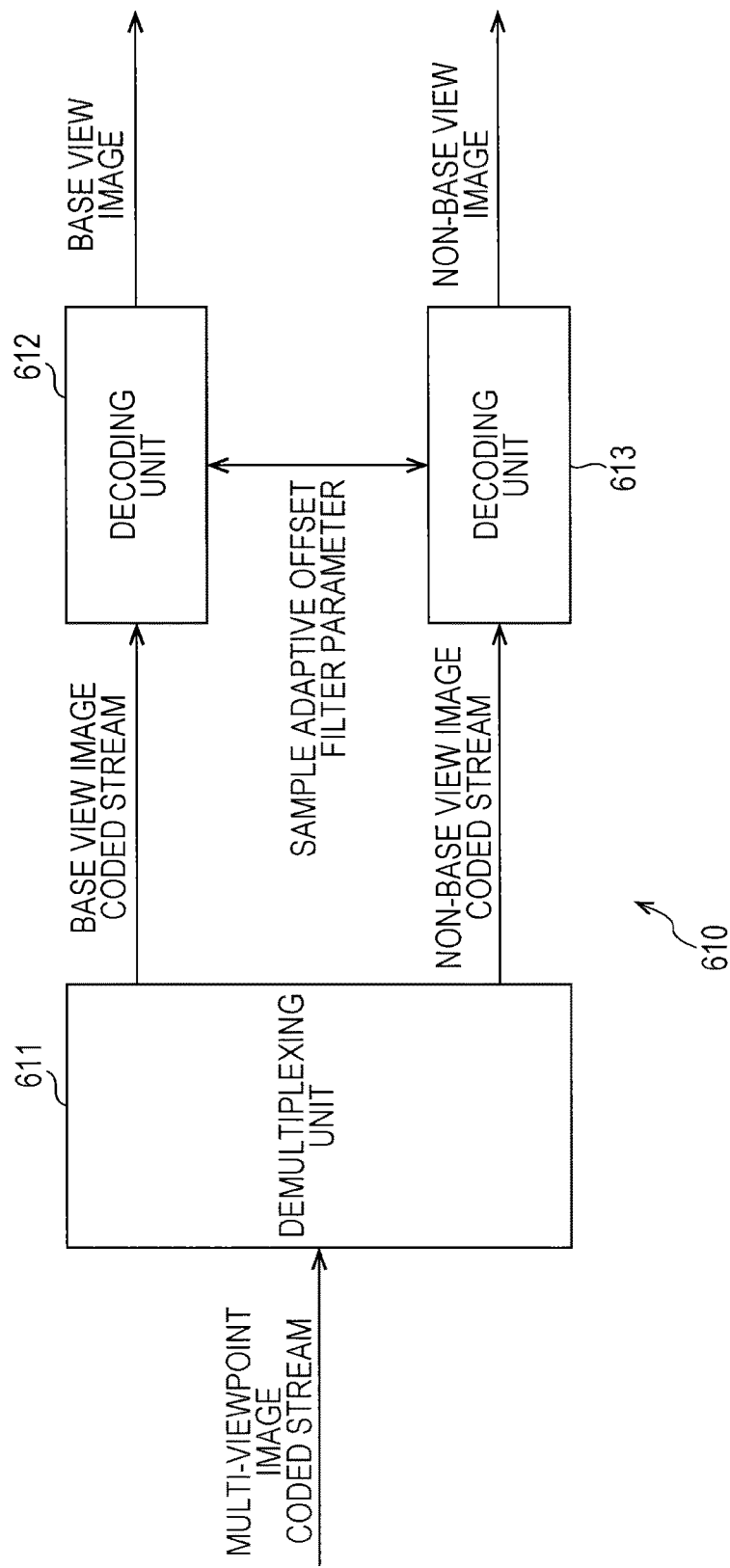
FIG. 23 is a figure illustrating a main example of configuration of a multi-viewpoint image decoding device to which the present disclosure is applied.

FIG. 23 is a figure illustrating a multi-viewpoint image decoding device that performs the multi-viewpoint image decoding explained above. As illustrated in FIG. 23, the multi-viewpoint image decoding device 610 includes a demultiplexing unit 611, a decoding unit 612, and a decoding unit 613.

The demultiplexing unit 611 demultiplexes the multi-viewpoint image coded stream obtained by multiplexing the base view image coded stream and the non-base view image coded stream, and extracts the base view image coded stream and the non-base view image coded stream. The decoding unit 612 decodes the base view image coded stream extracted by the demultiplexing unit 611, and obtains the base view images. The decoding unit 613 decodes the non-base view image coded stream extracted by the demultiplexing unit 611, and obtains the non-base view images.

The image decoding device 51 (FIG. 3) can be applied to the decoding unit 612 and decoding unit 613 of the multi-viewpoint image decoding device 610. In this case, the multi-viewpoint image decoding device 610 performs processing using the sample adaptive offset filter parameters which is set by the encoding unit 601 and decoded by the decoding unit 612 and the sample adaptive offset filter parameters which is set by the encoding unit 602 and decoded by the decoding unit 613.

The sample adaptive offset filter parameters which are set by the encoding unit 601 (or the encoding unit 602) may be set and transmitted so that the sample adaptive offset filter parameters are shared and used by the encoding unit 601 and the encoding unit 602. In this case, the multi-viewpoint image decoding device 610 performs processing using the sample adaptive offset filter parameters which are set by the encoding unit 601 (or the encoding unit 602) and decoded by the decoding unit 612 (or the decoding unit 613).

<6. Fourth Embodiment>

[Application to Hierarchical Image Point Coding/Hierarchical Image Decoding]

Figure 24:
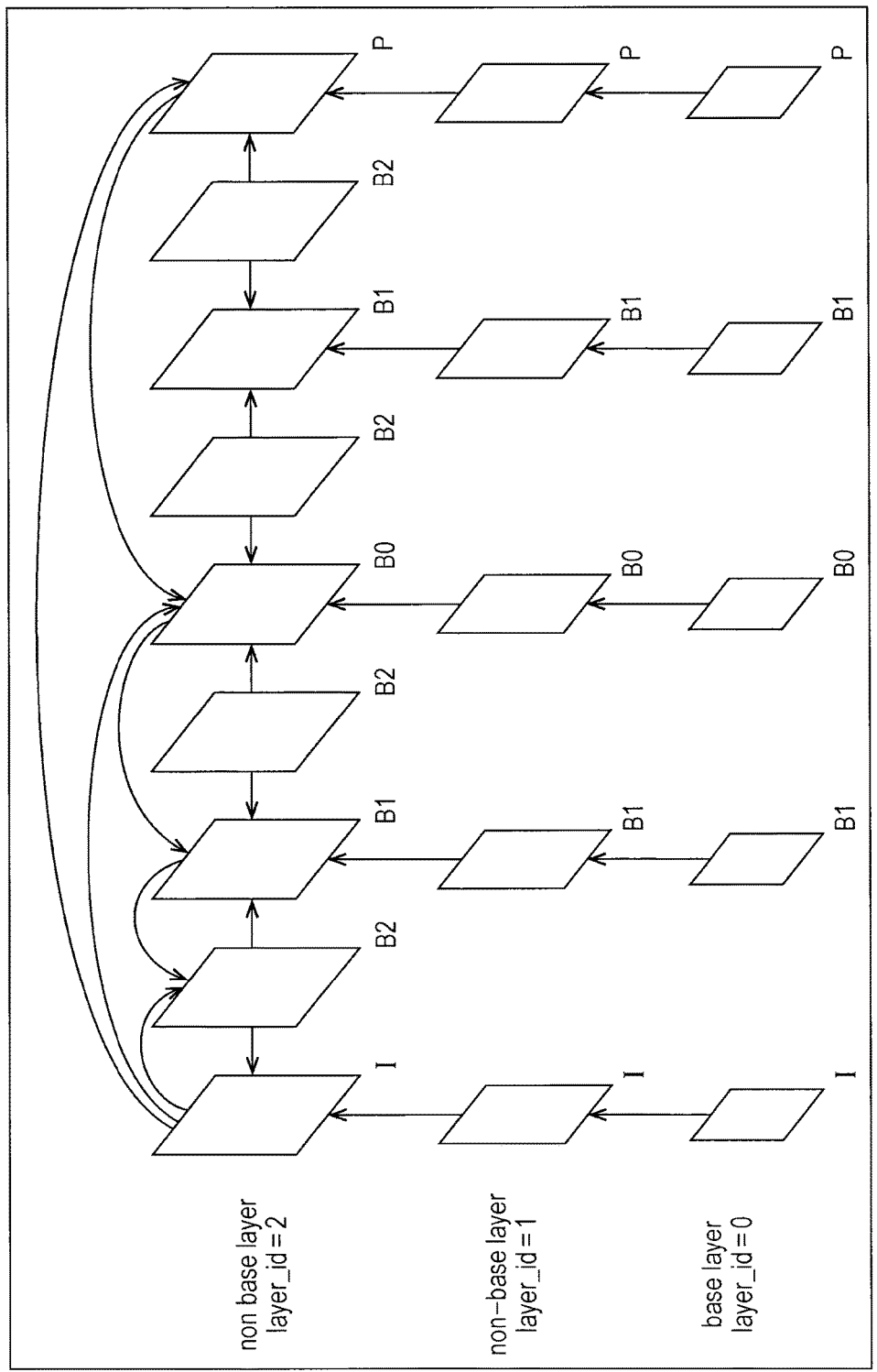
FIG. 24 is a figure illustrating an example of a hierarchical image encoding method.

The above series of processing can be applied to hierarchical image coding/hierarchical image decoding. FIG. 24 illustrates an example of multi-viewpoint image coding method.

As illustrated in FIG. 24, a hierarchical image includes images of multiple hierarchical (resolution), and a hierarchical image of a predetermined one of the multiple resolution is designated as a base layer image. Images of hierarchies other than the base layer image are treated as non-base layer images.

When the hierarchical image encoding (spatial scalability) as shown in FIG. 24 is performed, the sample adaptive offset filter parameters can be set in each layer (the same layer). In each layer (a different layer), the sample adaptive offset filter parameters which are set in another layer can be shared.

In this case, the sample adaptive offset filter parameters which are set in the base layer are used in at least a single non-base layer. Alternatively, for example, the sample adaptive offset filter parameters which are set in a non-base layer (layer_id=i) are used in at least one of base layer and non-base layer (layer_id=j).

Therefore, the amount of codes can be reduced.

[Hierarchical Image Coding Device]

Figure 25:
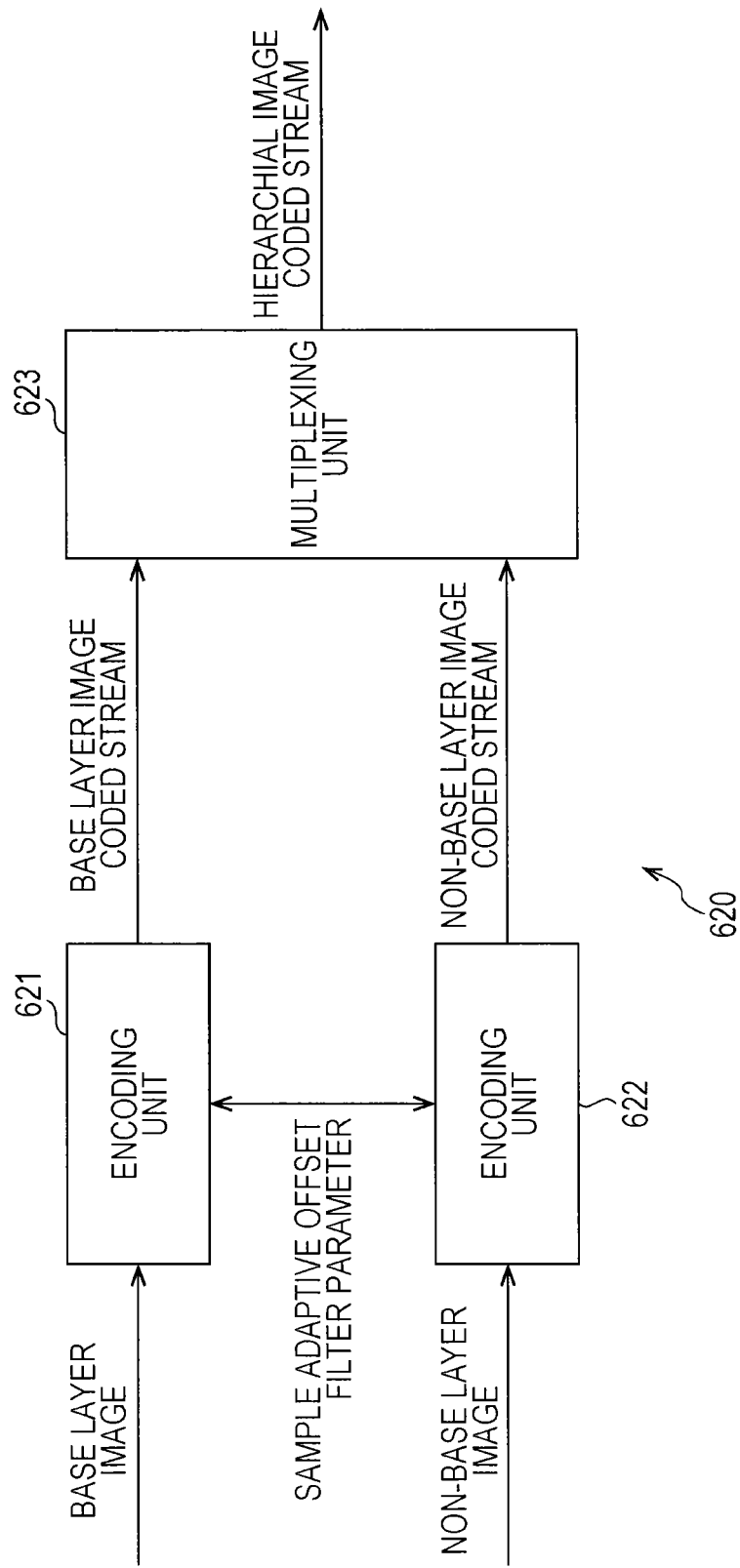
FIG. 25 is a figure illustrating a main example of configuration of a hierarchical image coding device to which the present disclosure is applied.

FIG. 25 is a figure illustrating a hierarchical image coding device that performs the hierarchical image coding explained above. As illustrated in FIG. 25, the hierarchical image coding device 620 includes an encoding unit 621, an encoding unit 622, and a multiplexing unit 623.

The encoding unit 621 encodes base layer images, and generates a base layer image coded stream. The encoding unit 622 encodes non-base layer images, and generates a non-base layer image coded stream. The multiplexing unit 623 multiplexes the base layer image coded stream generated by the encoding unit 621 and the non-base layer image coded stream generated by the encoding unit 622, and generates a hierarchical image coded stream.

The image coding device 11 (FIG. 1) can be applied to the encoding unit 621 and the encoding unit 622 of the hierarchical image coding device 620. In this case, the hierarchical image coding device 620 sets the identification information which is set by the encoding unit 621 and the sample adaptive offset filter parameters which is set by the encoding unit 602, and transmits the sample adaptive offset filter parameters.

It should be noted that such configuration may be adopted that the sample adaptive offset filter parameters which is set by the encoding unit 621 as described above is set so as to be shared and used in the encoding unit 621 and the encoding unit 622, and is transmitted. On the contrary, such configuration may be adopted that the sample adaptive offset filter parameters which is set by the encoding unit 622 is set so as to be shared and used in the encoding unit 621 and the encoding unit 622, and is transmitted.

[Hierarchical Image Decoding Device]

Figure 26:
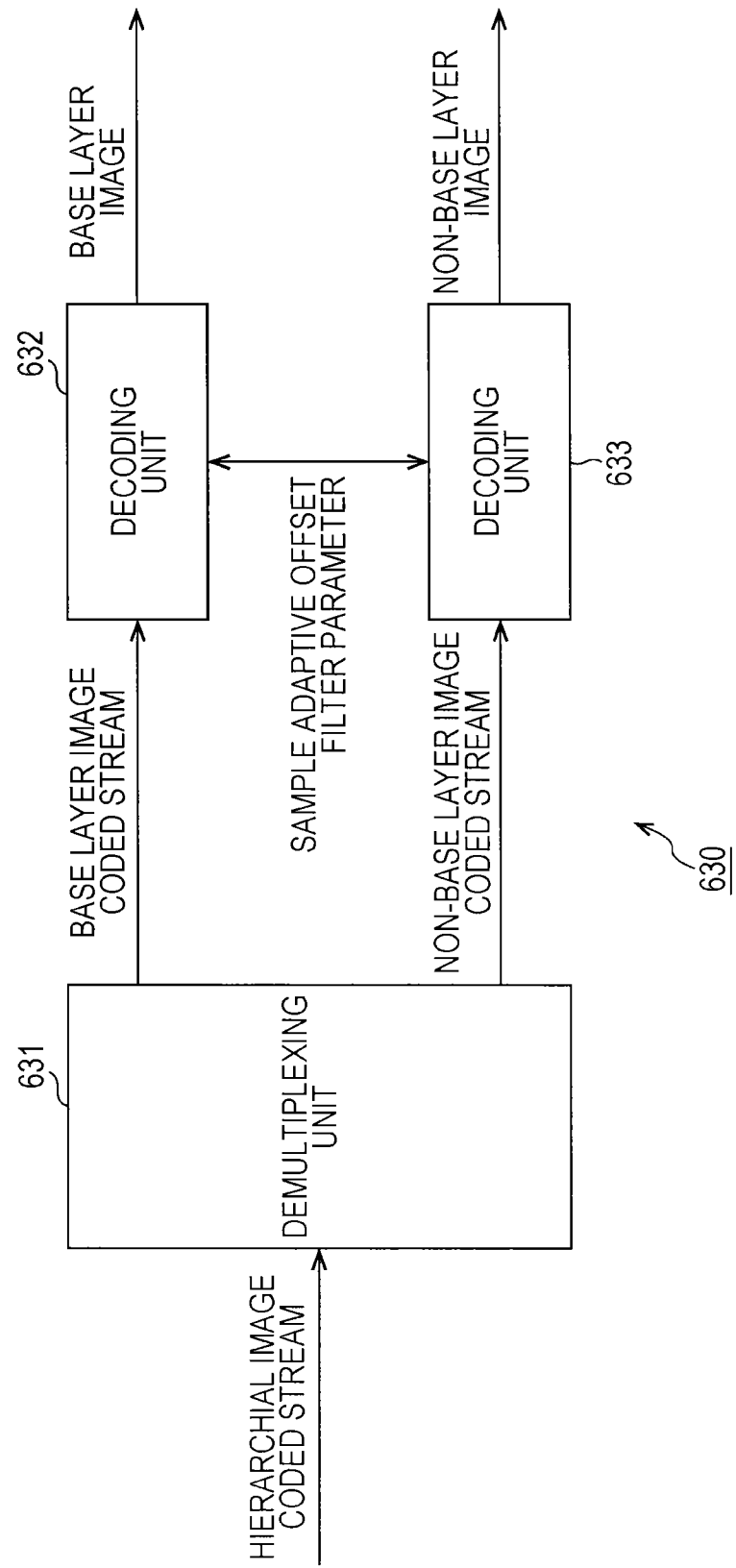
FIG. 26 is a figure illustrating an example of main configuration of a hierarchical image decoding device to which the present technique is applied.

FIG. 26 is a figure illustrating a hierarchical image decoding device that performs the hierarchical image decoding explained above. As illustrated in FIG. 26, the hierarchical image decoding device 630 includes a demultiplexing unit 631, a decoding unit 632, and a decoding unit 633.

The demultiplexing unit 631 demultiplexes the hierarchical image coded stream obtained by multiplexing the base layer image coded stream and the non-base layer image coded stream, and extracts the base layer image coded stream and the non-base layer image coded stream. The decoding unit 632 decodes the base layer image coded stream extracted by the demultiplexing unit 631, and obtains the base layer image. The decoding unit 633 decodes the non-base layer image coded stream extracted by the demultiplexing unit 631, and obtains the non-base layer image.

The image decoding device 51 (FIG. 3) can be applied to the decoding unit 632 and the decoding unit 633 of the hierarchical image decoding device 630. In this case, the hierarchical image decoding device 630 performs processing by using the sample adaptive offset filter parameters which is set by the encoding unit 621 and which is decoded by the decoding unit 632 and the decoded sample adaptive offset filter parameters which is set by the encoding unit 622 and which is decoded by the decoding unit 633.

It should be noted that, the sample adaptive offset filter parameters which is set by the encoding unit 621 (or, the encoding unit 622) described above may be set so as to be shared and used in the encoding unit 621 and the encoding unit 622, and is transmitted. In this case, in the hierarchical image decoding device 630 the processing is performed by using the sample adaptive offset filter parameters which is set by the encoding unit 621 (or, the encoding unit 622) and decoded by the decoding unit 632 (or, the decoding unit 633).

<7. Fifth Embodiment>

[Configuration of Computer]

The above series of processing may be executed by hardware, or may be executed by software. When the series of processing is executed by software, programs constituting the software are installed to the computer. Here, the computer includes a computer incorporated into dedicated hardware and, for example, a general-purpose personal computer capable of executing various kinds of functions by installing various kinds of programs.

Figure 27:
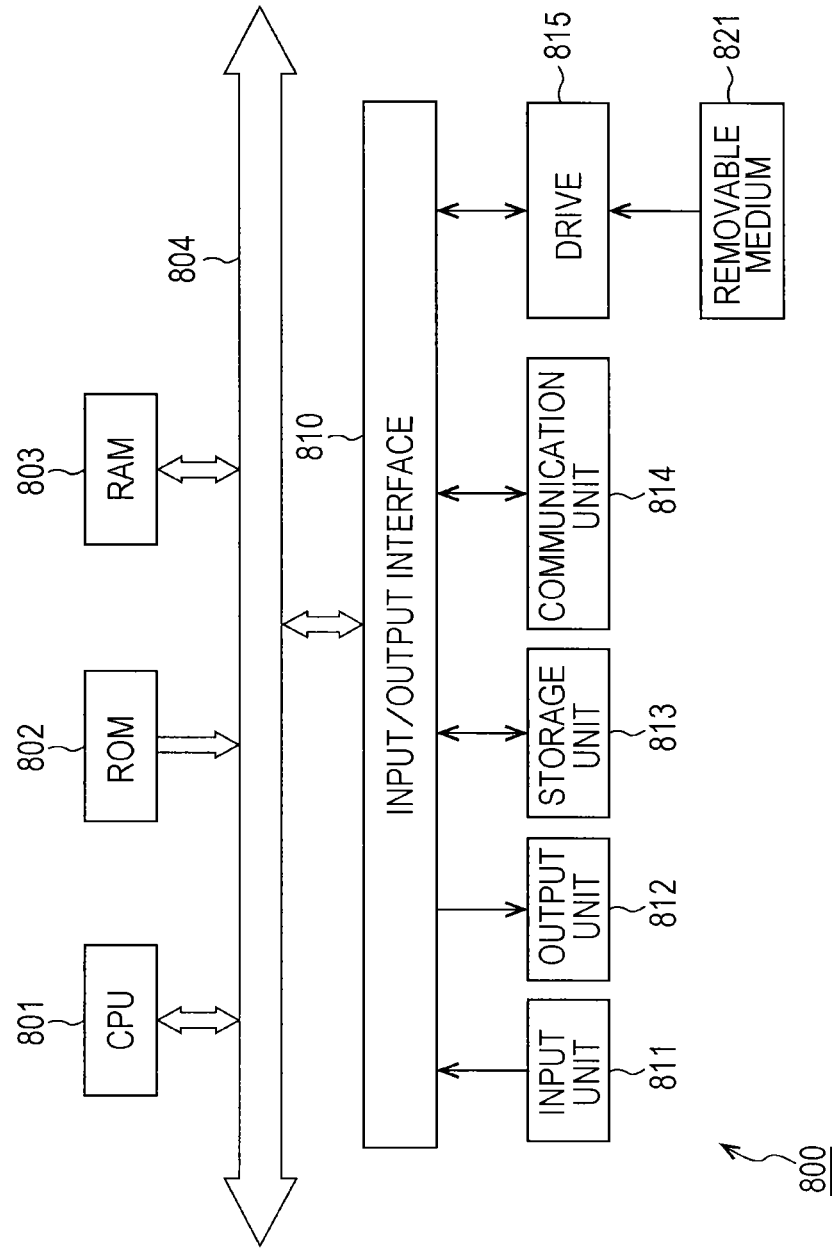
FIG. 27 is a block diagram illustrating an example of main configuration of a computer.

FIG. 27 is a block diagram illustrating an example of configuration of hardware of a computer executing the above series of processing using a program.

In a computer 800, a CPU (Central Processing Unit) 801, a ROM (Read Only Memory) 802, and a RAM (Random Access Memory) 803 are connected with each other via a bus 804.

The bus 804 is further connected with an input/output interface 805. The input/output interface 805 is connected with an input unit 806, an output unit 807, a storage unit 808, a communication unit 809, and a drive 810.

The input unit 806 is constituted by a keyboard, a mouse, a microphone, and the like. The output unit 807 is constituted by a display, a speaker, and the like. The storage unit 808 is constituted by a hard disk, a nonvolatile memory, and the like. The communication unit 809 is constituted by a network interface and the like. The drive 810 drives a removable medium 811 such as a magnetic disk, an optical disk, a magneto-optical disk, and a semiconductor memory.

In the computer configured as described above, the CPU 801 performs the above series of processing by, e.g., executing the program stored in the storage unit 808 by loading the program to the RAM 803 via the input/output interface 805 and the bus 804.

The program executed by the computer 800 (CPU 801) may be provided as being recorded to the removable medium 811 serving as, for example, a package medium. Further, the program can be provided via wired or wireless transmission media such as local area network, the Internet, and digital satellite broadcasting.

In the computer, the program can be installed to the storage unit 808 via the input/output interface 805 by loading the removable medium 811 to the drive 810. Further, the program can be installed to the storage unit 808 by receiving the program with the communication unit 809 via wired or wireless transmission media. Also, the program can be installed to the ROM 802 and the storage unit 808 beforehand.

The program executed by the computer may be a program with which processing in performed in time sequence according to the order explained in this specification, or may be a program with which processing is performed in parallel or with necessary timing, e.g., upon call.

In this specification, steps describing the program recorded in the recording medium include processing performed in time sequence according to the described order. The steps may not be necessarily performed in time sequence, and the steps include processing executed in parallel or individually.

In this specification, the system includes the entire apparatus constituted by a plurality of devices.

A configuration explained as a device (or a processing unit) in the above explanation may be divided, and structured as multiple devices (or processing units). A configuration explained as multiple devices (or processing units) in the above explanation may be combined, and structured as a device (or a processing unit). Alternatively, it is to be understood that the configuration of each device (or each processing unit) may be added with any configuration other than the above. Further, when the configuration and operation of the entire system are substantially the same, a part of configuration of a certain device (or processing unit) may be included in the configuration of another device (or another processing unit). More specifically, this technique is not limited to the above embodiment, and may be changed in various manners as long as it is within the gist of this technique.

The image coding device and image decoding device according to the embodiments explained above can be applied to various kinds of electronic devices such as a transmitter or a receiver for distribution to terminals by satellite broadcasting, cable broadcasting such as cable television, distribution on the Internet, cellular communication, recording devices for recording images to a medium such as an optical disk, magnetic disk, and flash memory, or a reproduction device for reproducing images from these recording media. Hereinafter, four examples of applications will be explained.

<8. Example of Application>

[First Example of Application: Television Reception Device]

Figure 28:
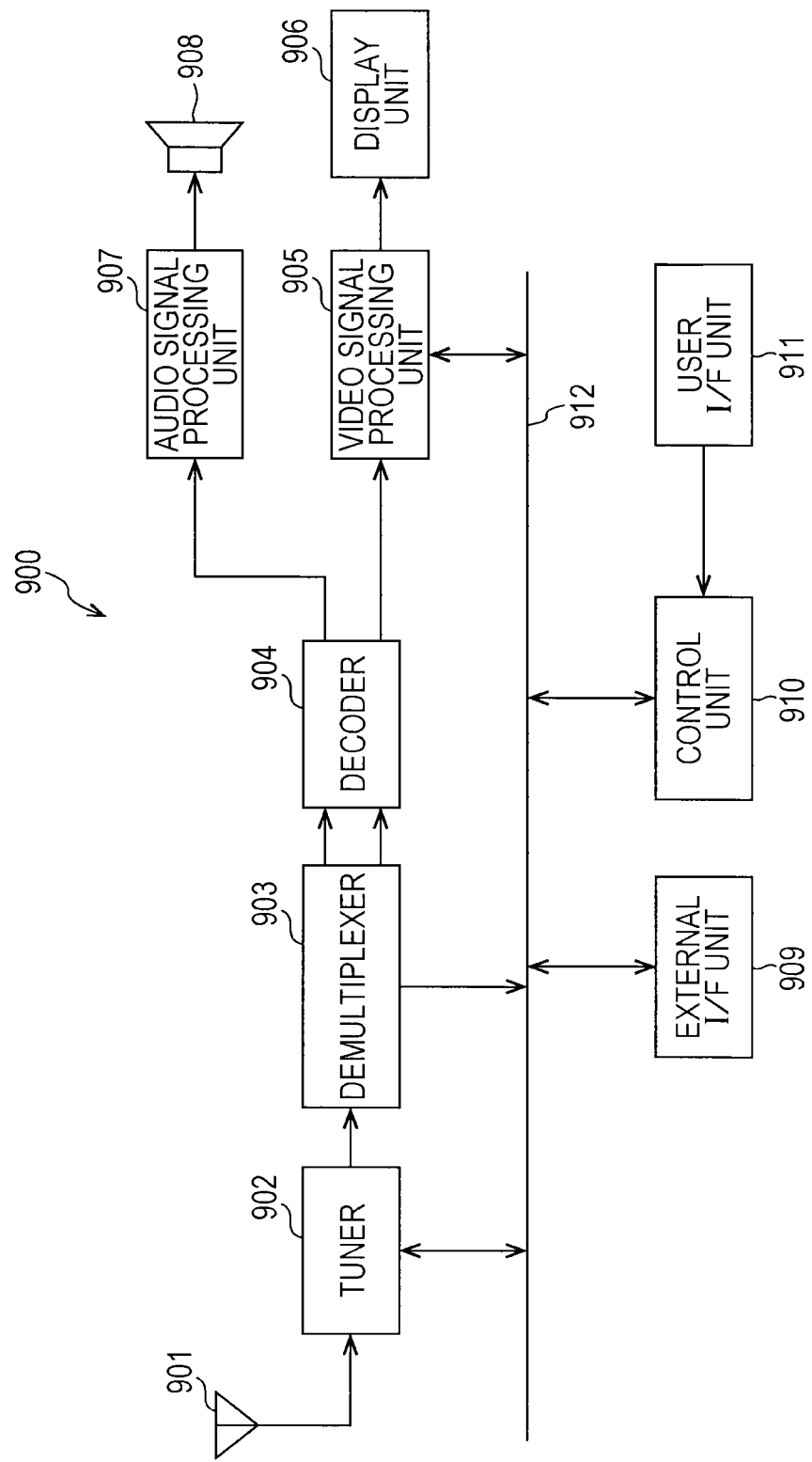
FIG. 28 is a block diagram illustrating an example of schematic configuration of a television device.

FIG. 28 illustrates an example of schematic configuration illustrating a television device to which the above embodiments are applied. The television device 900 includes an antenna 901, a tuner 902, a demultiplexer 903, a decoder 904, a video signal processing unit 905, a display unit 906, an audio signal processing unit 907, a speaker 908, an external interface 909, a control unit 910, a user interface 911, and a bus 912.

The tuner 902 extracts a signal of a desired channel from a broadcasting signal received via the antenna 901, and demodulates the extracted signal. Then the tuner 902 outputs the encoded bit stream obtained from the demodulation to the demultiplexer 903. More specifically, the tuner 902 plays a role of a transmission means in the television device 900 for receiving the coded stream in which an image is encoded.

The demultiplexer 903 separates a video stream and an audio stream of a program of viewing target from the encoded bit stream, and outputs the separated streams to the decoder 904. Further, the demultiplexer 903 extracts auxiliary data such as EPG (Electronic Program Guide) from the encoded bit stream, and provides the extracted data to the control unit 910. It should be noted that the demultiplexer 903 may perform descrambling in a case where the encoded bit stream is scrambled.

The decoder 904 decodes the video stream and the audio stream received from the demultiplexer 903. Then, decoder 904 outputs the video data generated from the decoding processing to the video signal processing unit 905. The decoder 904 outputs the audio data generated from the decoding processing to the audio signal processing unit 907.

The video signal processing unit 905 plays the video data received from the decoder 904, and causes the display unit 906 to display the video. The video signal processing unit 905 may display, on the display unit 906, an application screen provided via the network. The video signal processing unit 905 may perform additional processing such as noise reduction on the video data in accordance with setting. Further, the video signal processing unit 905 generates an image of GUI (Graphical User Interface) such as menu, buttons, or cursor, and overlays the generated image on the output image.

The display unit 906 is driven by a driving signal provided from the video signal processing unit 905, and displays video or image on a video screen of a display device (such as liquid crystal display, plasma display or OELD (Organic ElectroLuminescence Display) (organic EL display) and the like).

The audio signal processing unit 907 performs reproduction processing such as D/A conversion and amplification of audio data received from the decoder 904, and causes the speaker 908 to output audio. The audio signal processing unit 907 may perform additional processing such as noise reduction on the audio data.

The external interface 909 is an interface for connection between the television device 900 and external device or network. For example, a video stream or an audio stream received via the external interface 909 may be decoded by the decoder 904. More specifically, the external interface 909 also plays a role of a transmission means in the television device 900 for receiving the coded stream in which an image is encoded.

The control unit 910 has a memory such as a processor for a CPU and the like, and a RAM and a ROM. The memory stores, e.g., programs executed by the CPU, program data, EPG data, and data obtained via the network. The program stored in the memory may be, for example, read and executed by the CPU when the television device 900 is activated. The CPU executes the program to control operation of the television device 900 in accordance with operation signal received from the user interface 911, for example.

The user interface 911 is connected to the control unit 910. The user interface 911 includes, e.g., buttons and switches with which the user operates the television device 900, and a reception unit for receiving a remote control signal. The user interface 911 generates an operation signal by detecting user's operation via these constituent elements, and outputs the generated operation signal to the control unit 910.

The bus 912 connects the tuner 902, the demultiplexer 903, the decoder 904, the video signal processing unit 905, the audio signal processing unit 907, the external interface 909, and the control unit 910 with each other.

In the television device 900 configured as described above, the decoder 904 has a function of an image decoding device according to the embodiments explained above. Therefore, the amount of codes can be reduced when images are decoded by the television device 900.

[Second Example of Application: Cellular Phone]

Figure 29:
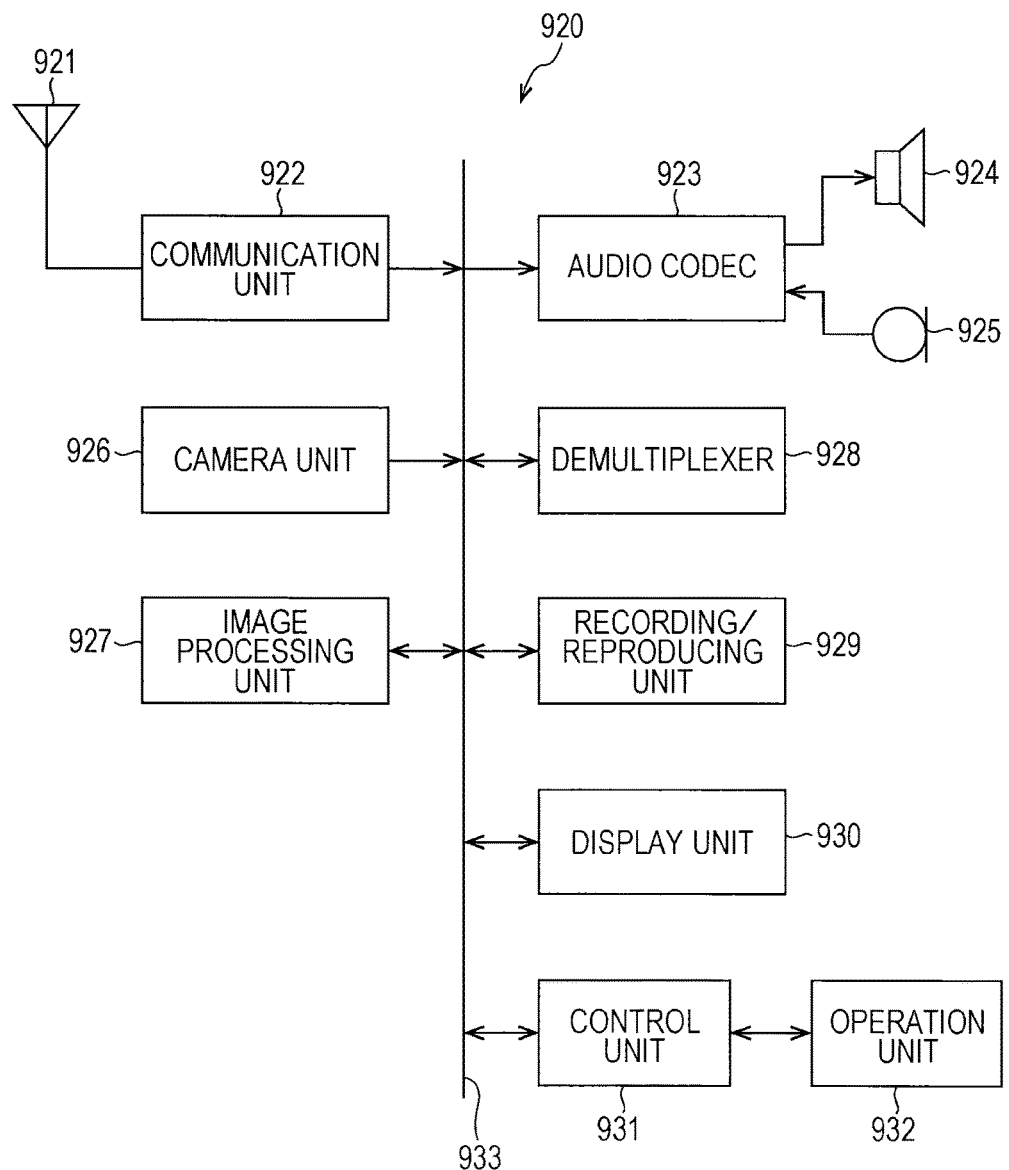
FIG. 29 is a block diagram illustrating an example of schematic configuration of a cellular phone.

FIG. 29 illustrates an example of schematic configuration illustrating a cellular phone to which the above embodiments are applied. The cellular phone 920 includes an antenna 921, a communication unit 922, an audio codec 923, speaker 924, a microphone 925, a camera unit 926, an image processing unit 927, a demultiplexer 928, a recording/reproducing unit 929, a display unit 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 connects the communication unit 922, the audio codec 923, the camera unit 926, the image processing unit 927, the demultiplexer 928, the recording/reproducing unit 929, the display unit 930, and the control unit 931 with each other.

The cellular phone 920 performs operation such as transmission/reception of audio signals, transmission/reception of e-mails or image data, capturing images, and recording data in various kinds of modes including audio phone call mode, data communication mode, shooting mode, and video call mode.

In the audio phone call mode, an analog audio signal generated by the microphone 925 is provided to the audio codec 923. The audio codec 923 converts an analog audio signal into audio data, performs A/D conversion on the converted audio data, and compresses the audio data. Then, the audio codec 923 outputs the compressed audio data to the communication unit 922. The communication unit 922 encodes and modulates the audio data, and generates a transmission signal. Then, the communication unit 922 transmits the generated transmission signal via the antenna 921 to the base station (not shown). The communication unit 922 amplifies a radio signal received via the antenna 921, and converts the frequency, and obtains a reception signal. Then, the communication unit 922 generates audio data by demodulating and decoding a reception signal, and outputs the generated audio data to the audio codec 923. The audio codec 923 decompresses the audio data, performs D/A conversion, and generates an analog audio signal. Then, the audio codec 923 provides the generated audio signal to the speaker 924, and outputs audio.

In the data communication mode, for example, the control unit 931 generates text data constituting an e-mail in accordance given with user's operation with operation unit 932. The control unit 931 displays characters on the display unit 930. The control unit 931 generates e-mail data in accordance with user's transmission instruction given with the operation unit 932, and outputs the generated e-mail data to the communication unit 922. The communication unit 922 encodes and modulates e-mail data, and generates a transmission signal. Then, the communication unit 922 transmits the generated transmission signal via the antenna 921 to the base station (not shown). The communication unit 922 amplifies a radio signal received via the antenna 921, and converts the frequency, and obtains a reception signal. Then, the communication unit 922 restores e-mail data by demodulating and decoding the reception signal, and outputs the restored e-mail data to the control unit 931. The control unit 931 displays the contents of the e-mail on the display unit 930, and stores the e-mail data to the recording medium of the recording/reproducing unit 929.

The recording/reproducing unit 929 has any given recording medium that can be read and written. For example, the recording medium may be an internal recording medium such as a RAM or a flash memory, and may be an externally-attached recording medium such as a hard disk, a magnetic disk, a magneto-optical disk, an optical disk, a USB (Universal Serial Bus) memory, or a memory card.

In the shooting mode, for example, the camera unit 926 captures an image of a subject, generates image data, and outputs the generated image data to the image processing unit 927. The image processing unit 927 encodes the image data, which are input from the camera unit 926, and stores the coded stream in the storage medium of the storing/reproducing unit 929.

In the video call mode, for example, the demultiplexer 928 multiplexes the video stream encoded by the image processing unit 927 and the audio stream received from the audio codec 923, and outputs the multiplexed stream to the communication unit 922. The communication unit 922 encodes and modulates the stream, and generates a transmission signal. Then, the communication unit 922 transmits the generated transmission signal via the antenna 921 to the base station (not shown). The communication unit 922 amplifies a radio signal received via the antenna 921, and converts the frequency, and obtains a reception signal. The transmission signal and the reception signal may include the encoded bit stream. Then, the communication unit 922 restores the stream by demodulating and decoding the reception signal, and outputs the restored stream to the demultiplexer 928. The demultiplexer 928 separates the video stream and the audio stream from the received stream, and outputs the video stream to the image processing unit 927 and the audio stream to the audio codec 923. The image processing unit 927 decodes the video stream, and generates video data. The video data are provided to the display unit 930, and the display unit 930 displays a series of images. The audio codec 923 decompresses the audio stream, performs D/A conversion, and generates an analog audio signal. Then, the audio codec 923 provides the generated audio signal to the speaker 924, and outputs audio.

In the cellular phone 920 configured as described above, the image processing unit 927 has a function of the image coding device and the image decoding device according to the embodiments explained above. Accordingly, the amount of codes can be reduced when images are encoded and decoded by the cellular phone 920.

[Third Example of Application: Recording/Reproducing Device]

Figure 30:
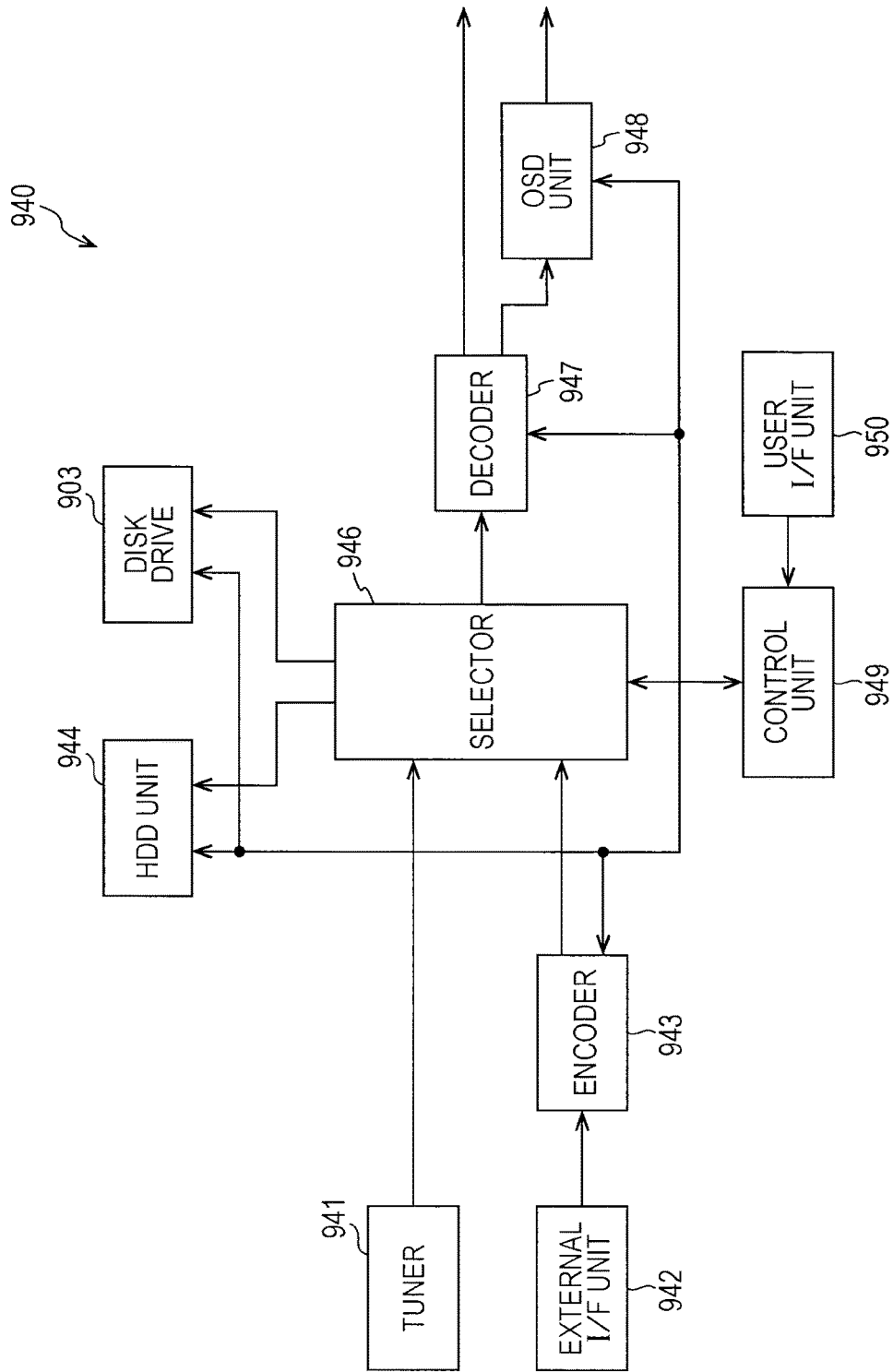
FIG. 30 is a block diagram illustrating an example of schematic configuration of a recording/reproducing device.

FIG. 30 illustrates an example of schematic configuration illustrating a recording/reproducing device to which the above embodiments are applied. For example, the recording/reproducing device 940 encodes the audio data and the video data of received broadcasting program, and records them to the recording medium. For example, the recording/reproducing device 940 may encode the audio data and the video data of obtained from another device, and may record them to the recording medium. For example, the recording/reproducing device 940 reproduces the data recorded on the recording medium using the monitor and the speaker in accordance with user's instruction. At this occasion, the recording/reproducing device 940 decodes the audio data and the video data.

The recording/reproducing device 940 includes a tuner 941, an external interface 942, an encoder 943, an HDD (Hard Disk Drive) 944, a disk drive 945, a selector 946, a decoder 947, an OSD (On-Screen Display) 948, a control unit 949, and a user interface 950.

The tuner 941 extracts a signal of a desired channel from a broadcasting signal received via an antenna (not shown), and demodulates the extracted signal. Then, the tuner 941 outputs the encoded bit stream obtained from the decoding to the selector 946. More specifically, the tuner 941 plays a role of a transmission means in the recording/reproducing device 940.

The external interface 942 is an interface for connection between the recording/reproducing device 940 and external device or network. The external interface 942 may be, for example, an IEEE1394 interface, a network interface, a USB interface, a flash memory interface, or the like. For example, the video data and audio data received via the external interface 942 are input into the encoder 943. More specifically, the external interface 942 plays a role of a transmission means in the recording/reproducing device 940.

When the video data and the audio data received from the external interface 942 are not encoded, the encoder 943 encodes the video data and the audio data. Then, the encoder 943 outputs the encoded bit stream to the selector 946.

The HDD 944 records the encoded bit stream obtained by compressing content data such as video and audio, various kinds of programs, and other data to the hard disk provided therein. When the video and audio are reproduced, the HDD 944 reads the data from the hard disk.

The disk drive 945 records and reads data to/from the recording medium loaded. The recording medium loaded to the disk drive 945 may be, for example, a DVD disk (DVD-Video, DVD-RAM, DVD-R, DVD-RW, DVD+R, DVD+RW, and the like) or Blu-ray (registered trademark) disk.

When the video and the audio are recorded, the selector 946 selects the encoded bit stream which is input from the tuner 941 or the encoder 943, and outputs the selected encoded bit stream to the HDD 944 or the disk drive 945. Further, when the video and the audio are reproduced, the selector 946 outputs the encoded bit stream which is input from the HDD 944 or the disk drive 945 to the decoder 947.

The decoder 947 decodes the encoded bit stream, and generates video data and audio data. Then, the decoder 947 outputs the generated video data to an OSD 948. The decoder 904 outputs the generated audio data to an external speaker.

The OSD 948 reproduces the video data received from the decoder 947, and displays video. The OSD 948 may overlays images of GUI such as menu, buttons, or cursor, on the displayed video.

The control unit 949 has a memory such as a processor for a CPU and the like, and a RAM and a ROM. The memory records programs executed by the CPU, program data, and the like. The program stored in the memory may be, for example, read and executed by the CPU when the recording/reproducing device 940 is activated. The CPU executes the program to control operation of the recording/reproducing device 940 in accordance with operation signal received from the user interface 971, for example.

The user interface 950 is connected to the control unit 949. The user interface 950 includes, e.g., buttons and switches with which the user operates the recording/reproducing device 940, and a reception unit for receiving a remote control signal. The user interface 950 generates an operation signal by detecting user's operation via these constituent elements, and outputs the generated operation signal to the control unit 949.

In the recording/reproducing device 940 configured as described above, the encoder 943 has a function of the image coding device according to the above embodiment. The decoder 947 has a function of an image decoding device according to the embodiments explained above. Accordingly, the amount of codes can be reduced when images are encoded and decoded by the recording/reproducing device 940.

[Fourth Example of Application: Image-capturing Device]

Figure 31:
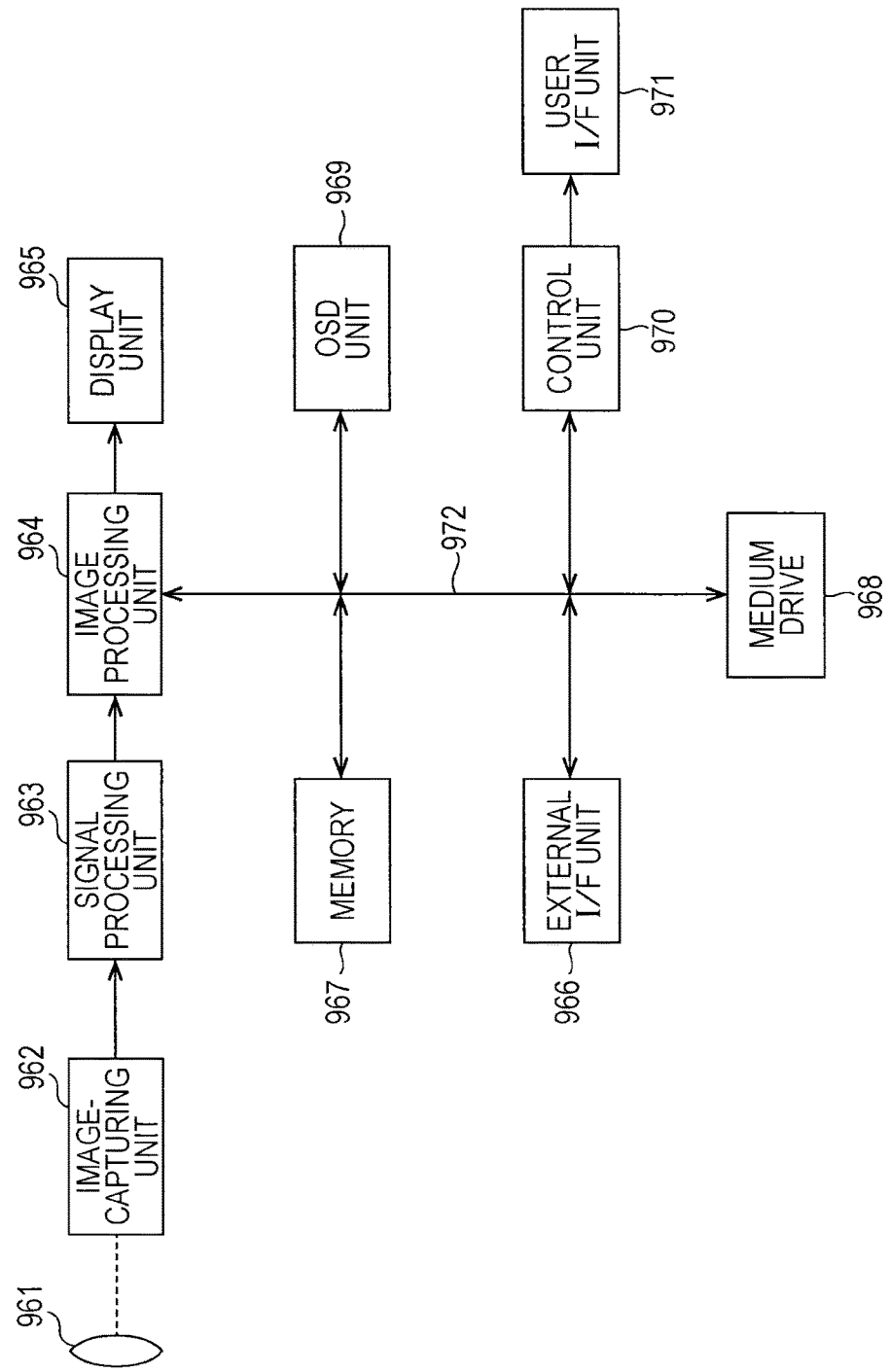
FIG. 31 is a block diagram illustrating an example of schematic configuration of an image-capturing device.

FIG. 31 illustrates an example of schematic configuration illustrating an image-capturing device to which the above embodiments are applied. An image-capturing device 960 captures an image of a subject, generates image data, and records the image data to a recording medium.

The image-capturing device 960 includes an optical block 961, an image-capturing unit 962, a signal processing unit 963, an image processing unit 964, a display unit 965, an external interface 966, a memory 967, a medium drive 968, an OSD 969, a control unit 970, a user interface 971, and a bus 972.

The optical block 961 is connected the image-capturing unit 962. The image-capturing unit 962 is connected to the signal processing unit 963. The display unit 965 is connected to the image processing unit 964. The user interface 971 is connected to the control unit 970. The bus 972 connects the image processing unit 964, the external interface 966, the memory 967, the medium drive 968, the OSD 969, and the control unit 970 with each other.

The optical block 961 includes a focus lens and a diaphragm mechanism. The optical block 961 causes an optical image of a subject to be formed on an image-capturing surface of the image-capturing unit 962. The image-capturing unit 962 includes an image sensor such as a CCD (Charge Coupled Device) or a CMOS (Complementary Metal Oxide Semiconductor), and converts the optical image formed on the image-capturing surface into an image signal which is an electric signal by photoelectric conversion. Then, the image-capturing unit 962 outputs the image signal to the signal processing unit 963.

The signal processing unit 963 performs various kinds of camera signal processing such as knee correction, gamma correction, and color correction on an image signal received from the image-capturing unit 962. The signal processing unit 963 outputs the image data which have been subjected to the camera signal processing to the image processing unit 964.

The image processing unit 964 encodes the image data received from the signal processing unit 963, and generates coded data. Then, the image processing unit 964 outputs the generated coded data to the external interface 966 or the medium drive 968. The image processing unit 964 decodes the coded data received from the external interface 966 or the medium drive 968, and generates image data. Then, the image processing unit 964 outputs the generated image data to the display unit 965. The image processing unit 964 may output the image data received from the signal processing unit 963 to the display unit 965, and may display the image thereon. The image processing unit 964 may also overlay display data obtained from the OSD 969 on the image which is to be output to the display unit 965.

For example, the OSD 969 may generate images of GUI such as menu, buttons, or cursor, and output the generated image to the image processing unit 964.

The external interface 966 is configured as, for example, a USB input/output terminal. The external interface 966 connects the image-capturing device 960 and a printer during printing of an image, for example. The external interface 966 is connected to a drive, as necessary. In the drive, for example, a removable medium such as a magnetic disk or an optical disk may be loaded. A program which is read from the removable medium may be installed to the image-capturing device 960. Further, the external interface 966 may be configured as a network interface connected to a network such as a LAN or the Internet. More specifically, the external interface 966 plays a role of a transmission means in the image-capturing device 960.

The recording medium loaded to the medium drive 968 may be any given removable medium which can be read and written, such as a magnetic disk, an optical magnetic disk, an optical disk, or a semiconductor memory. The recording medium loaded to the medium drive 968 in a fixed manner, and, for example, a non-removable storage unit such as an internal hard disk drive or SSD (Solid State Drive) may be configured.

The control unit 970 has a memory such as a processor for a CPU and the like, and a RAM and a ROM. The memory records programs executed by the CPU, program data, and the like. The program stored in the memory may be, for example, read and executed by the CPU when the image-capturing device 960 is activated. The CPU executes the program to control operation of the image-capturing device 960 in accordance with operation signal received from the user interface 950, for example.

The user interface 971 is connected to the control unit 970. The user interface 971 includes, e.g., buttons and switches with which the user operates the image-capturing device 960. The user interface 971 generates an operation signal by detecting user's operation via these constituent elements, and outputs the generated operation signal to the control unit 970.

In the image-capturing device 960 configured as described above, the image processing unit 964 has a function of the image coding device and the image decoding device according to the embodiments explained above. Accordingly, the amount of codes can be reduced when images are encoded and decoded by the image-capturing device 960.

In this specification, an example has been explained in which various kinds of information such as the parameters and the like of the sample adaptive offset filter are multiplexed into the coded stream and transmitted from the encoding side to the decoding side. However, the method for transmitting information is not limited to such example. For example, the information may not be multiplexed into the encoded bit stream, and may be transmitted or recorded as separate data associated with the encoded bit stream. In this case, the term "associated" means that the image included in the bit stream (which may be a part of image such as slice or block) and information corresponding to the image is linked during decoding. More specifically, the information may be transmitted through a transmission path which is separate from the image (or bit stream). The information may be recorded to another recording medium which is different from the image (or bit stream) (or another recording area of the same recording medium). Further, the information and the image (or bit stream) may be associated with each other in any given unit such as multiple frames, a frame, or a portion of a frame.

The preferred embodiments of the present disclosure have been hereinabove described in detail with reference to attached drawings, but the present disclosure is not limited to such example. It is evident that a person of ordinarily skilled in the art to which the technique of the present disclosure pertains can conceive of various kinds of changes or modifications within the scope of the technical gist described in the claims, and it is understood that various kinds of changes or modifications within the scope of the technical gist described in the claims are also included in the technical scope of the present disclosure.

It should be noted that this technique can also be configured as follows.

(1) An image processing apparatus including:
a setting unit configured to set a type of a sample adaptive offset filter which is common between components of an image;

a sample adaptive offset filter unit configured to apply sample adaptive offset filter to an image which is locally decoded when the image is encoded, in accordance with the type of the sample adaptive offset filter which is set by the setting unit; and an encoding unit configured to use the image, to which the sample adaptive offset filter is applied by the sample adaptive offset filter unit, to perform encoding processing on the image to generate an encoded stream.

(2) The image processing apparatus according to (1) above, wherein the setting unit sets the type of the sample adaptive offset filter which is common to a brightness component and a color difference component of the image.

(3) The image processing apparatus according to (1) above, wherein the setting unit sets the type of the sample adaptive offset filter which is common to color difference components of the image.

(4) The image processing apparatus according to (3) above, wherein the setting unit sets the type of the sample adaptive offset filter which is common to a first color difference component and a second color difference component.

(5) The image processing apparatus according to (4) above, wherein when the setting unit sets the type of the sample adaptive offset filter corresponding to the first color difference component to a band offset, the setting unit sets the type of the sample adaptive offset filter corresponding to the second color difference component to the band offset.

(6) The image processing apparatus according to (4) above, wherein when the setting unit sets the type of the sample adaptive offset filter corresponding to the first color difference component to an edge offset, the setting unit sets the type of the sample adaptive offset filter corresponding to the second color difference component to the edge offset.

(7) The image processing apparatus according to (4) above, wherein when the setting unit sets the type of the sample adaptive offset filter to an edge offset, the setting unit sets a pattern rule of the edge offset which is common to color difference components of the image.

(8) The image processing apparatus according to (7) above, wherein when the setting unit sets the type of the sample adaptive offset filter corresponding to the first color difference component to one-dimensional pattern of the edge offset, the setting unit sets the type of the sample adaptive offset filter corresponding to the second color difference component to one-dimensional pattern of the edge offset (9) The image processing apparatus according to (7) above, wherein when the setting unit sets the type of the offset filter corresponding to the first color difference component to two-dimensional pattern of the edge offset, the setting unit sets the type of the offset filter corresponding to the second color difference component to two-dimensional pattern of the edge offset.

(10) The image processing apparatus according to (4) above, wherein when the setting unit sets the type of the offset filter corresponding to the first color difference component to a type for not applying an offset, the setting unit sets the type of the offset filter corresponding to the second color difference component to a type for not applying an offset.

(11) The image processing apparatus according to any of (1) to (10) above, wherein a color space of the image is in a Y/Cb/Cr format.

(12) The image processing apparatus according to any of (1) to (11) above, further including a deblock filter unit configured to apply deblock filter to the image locally decoded, wherein the sample adaptive offset filter unit applies sample adaptive offset filter to the image to which the deblock filter is applied by the deblock filter unit.

(13) The image processing apparatus according to any of (1) to (12) above, wherein in a case of a same offset as an adjacent coding unit adjacent to a current coding unit, the setting unit sets the offset of the adjacent coding unit as the current coding unit.

(14) An image processing method including:
setting a type of a sample adaptive offset filter which is common between components of an image;
applying sample adaptive offset filter to an image which is locally decoded when the image is encoded, in accordance with the type of the sample adaptive offset filter which is set; and
using the image, to which the sample adaptive offset filter is applied, to perform encoding processing on the image to generate an encoded stream.

(15) An image processing apparatus including:
a setting unit configured to set type information indicating a type of a sample adaptive offset filter which is common between components of an image;
a sample adaptive offset filter unit configured to apply sample adaptive offset filter to an image which is locally decoded when the image is encoded, in accordance with the type of the sample adaptive offset filter which is common to the components of the image;
an encoding unit configured to use the image, to which the sample adaptive offset filter is applied by the sample adaptive offset filter unit, to perform encoding processing on the image to generate an encoded stream; and
a transmission unit configured to transmit the type information which is set by the setting unit and the encoded stream generated by the encoding unit.

(16) The image processing apparatus according to (15) above, wherein the type of the sample adaptive offset filter is common to color difference components of the image.

(17) The image processing apparatus according to (16) above, wherein the type of the sample adaptive offset filter is common to a first color difference component and a second color difference component.

(18) The image processing apparatus according to any of (15) to (17) above, wherein the setting unit sets the type information for each maximum coding unit.

(19) The image processing apparatus according to any of (15) to (18) above further including a deblock filter unit configured to apply deblock filter to the image locally decoded, wherein the sample adaptive offset filter unit applies sample adaptive offset filter to the image to which the deblock filter is applied by the deblock filter unit.

(20) An image processing method including:
setting type information indicating a type of a sample adaptive offset filter which is common between components of an image;
applying sample adaptive offset filter to an image which is locally decoded when the image is encoded, in accordance with the type of the sample adaptive offset filter which is common to the components of the image;
using the image, to which the sample adaptive offset filter is applied, to perform encoding processing on the image to generate an encoded stream; and
transmitting the type information which has been set and the encoded stream which has been generated.

REFERENCE SIGNS LIST

11 Image coding device
26 Lossless coding unit

31 Deblock filter
41 Sample adaptive offset filter
42 Adaptive loop filter
51 Image decoding device
62 Lossless decoding unit
66 Deblock filter
81 Sample adaptive offset filter
82 Adaptive loop filter
111 SAO flag
112 Type setting unit
113 Offset setting unit
114 SAO control information setting unit
115 Offset buffer
116 Filter processing unit
117 Image buffer
141 Type setting unit
151 Y type setting unit
152 Cm type setting unit
161 Syntax write unit
211 Syntax acquisition unit
221 SAO flag reception unit
222 Type reception unit
223 Merge flag reception unit
224 Offset buffer
225 Offset reception unit
226 Filter processing unit
227 Image buffer
241 Syntax acquisition unit
251 Type reception unit
261 Y type reception unit
262 Cm type reception unit

The invention claimed is:

1. An image processing apparatus comprising:
circuitry configured to
determine whether to apply a sample adaptive offset filter to an image that is locally decoded when the image is encoded in accordance with a common parameter based on a sample adaptive offset flag, the common parameter identifying a filter type that is common to both a first color difference component of the image and a second color difference component of the image;
set the common parameter;
apply the sample adaptive offset filter to the image;
use the image, to which the sample adaptive offset filter is applied, to perform encoding processing on the image to generate a coded stream; and
transmit the common parameter, a filter coefficient for each of the first color difference component of the image and the second color difference component of the image, the filter coefficient for each color difference component being independent of each other, and the coded stream.

2. The image processing apparatus according to claim 1, wherein the circuitry is configured to set, as the parameter, information which is made common to first type information indicating the type of the sample adaptive offset filter of the first color difference component of the image and second type information indicating the type of the sample adaptive offset filter of the second color difference component of the image.

3. The image processing apparatus according to claim 2, wherein the circuitry is configured to set, for each maximum encoding unit, a first parameter indicating the type of the sample adaptive offset filter of the first color difference component of the image and a second parameter indicating the type of the sample adaptive offset filter of the second color difference component of the image in such a manner that the first parameter and the second parameter are made common.

4. The image processing apparatus according to claim 2, wherein the circuitry is configured to transmit, as the parameter, a first parameter indicating the type of the sample adaptive offset filter of the first color difference component of the image and a second parameter indicating the type of the sample adaptive offset filter of the second color difference component of the image in such a manner that the first parameter and the second parameter are made common.

5. The image processing apparatus according to claim 4, wherein the circuitry is configured to transmit, as a syntax of the coded stream, first type information indicating the type of the sample adaptive offset filter of the first color difference component of the image and second type information indicating the type of the sample adaptive offset filter of the second color difference component of the image in such a manner that the first type information and the second type information are made common.

6. The image processing apparatus according to claim 1, wherein the circuitry is configured to set, as the parameter, information indicating that the type of the sample adaptive offset filter of the first color difference component of the image and the type of the sample adaptive offset filter of the second color difference component of the image are common and are band offsets.

7. The image processing apparatus according to claim 1, wherein the circuitry is configured to set, as the parameter, information indicating that the type of the sample adaptive offset filter of the first color difference component of the image and the type of the sample adaptive offset filter of the second color difference component of the image are common and are edge offsets.

8. The image processing apparatus according to claim 7, wherein the circuitry is configured to set, as the parameter, information indicating that the type of the sample adaptive offset filter of the first color difference component of the image and the type of the sample adaptive offset filter of the second color difference component of the image are common and are pattern rules of edge offsets.

9. The image processing apparatus according to claim 8, wherein the circuitry is configured to set, as the parameter, information indicating that the type of the sample adaptive offset filter of the first color difference component of the image and the type of the sample adaptive offset filter of the second color difference component of the image are common and are one-dimensional pattern rules of edge offsets.

10. The image processing apparatus according to claim 8, wherein the circuitry is configured to set, as the parameter, information indicating that the type of the sample adaptive offset filter of the first color difference component of the image and the type of the sample adaptive offset filter of the second color difference component of the image are common and are two-dimensional pattern rules of edge offsets.

11. The image processing apparatus according to claim 1, wherein the circuitry is configured to set, as the parameter, information indicating that the type of the sample adaptive offset filter of the first color difference component of the image and the type of the sample adaptive offset filter of the second color difference component of the image are common and are types for not applying any offset.

12. The image processing apparatus according to claim 1, wherein the circuitry is configured such that a color space of the image is in a Y/Cb/Cr format.

13. The image processing apparatus according to claim 1, wherein the circuitry is configured to encode the image in a unit having a hierarchical structure.

14. The image processing apparatus according to claim 1, wherein the circuitry is further configured to
- apply deblock filter to the image locally decoded; and
- apply sample adaptive offset filter to the image to which the deblock filter is applied.

15. An image processing method comprising:
- determining, by circuitry, whether to apply a sample adaptive offset filter to an image that is locally decoded when the image is encoded in accordance with a common parameter based on a sample adaptive offset flag, the common parameter identifying a filter type that is common to both a first color difference component of the image and a second color difference component of the image;
- setting, by the circuitry, the common parameter;
- applying, by the circuitry, the sample adaptive offset filter to the image;
- using, by the circuitry, the image, to which the sample adaptive offset filter is applied, to perform encoding processing on the image to generate a coded stream; and
- transmitting, by the circuitry, the common parameter, a filter coefficient for each of the first color difference component of the image and the second color difference component of the image, the filter coefficient for each color difference component being independent of each other, and the type of the sample adaptive offset filter of the second color difference component of the image and the coded stream which is generated.

* * * * *